United States Patent [19]

Devore et al.

[11] 3,821,703

[45] June 28, 1974

[54] SIGNAL TRANSFERRING

[75] Inventors: Ernest W. Devore, Boulder; Phil H. Hall, Longmont; John W. Irwin, Loveland, all of Colo.

[73] Assignee: International Business Machines Corporation, Armonk, N.Y.

[22] Filed: Dec. 26, 1972

[21] Appl. No.: 318,453

[52] U.S. Cl. .................... 340/146.1 AL, 340/172.5

[51] Int. Cl. .................................... G06f 11/12

[58] Field of Search ......... 340/146.1 AL, 146.1 AX, 340/146.1 F, 172.5, 174.1 A, 174.1 B; 235/61.12 R

[56] References Cited

UNITED STATES PATENTS

| | | | |
|---|---|---|---|
| 3,231,725 | 1/1966 | Davis et al. | 235/153 BB |
| 3,629,824 | 12/1971 | Bossen | 340/146.1 AL |
| 3,639,900 | 2/1972 | Hinz, Jr. | 340/146.1 AL |
| 3,675,200 | 7/1972 | Bossen et al. | 340/146.1 AL |

*Primary Examiner*—Charles E. Atkinson
*Attorney, Agent, or Firm*—Herbert F. Somermeyer

[57] ABSTRACT

In a magnetic recording system or other data signal transfer apparatus, signal blocks of indeterminate length are handled with fixed length code record segments. Enhanced error detection and correction is provided not only on the data bits in each segment, but also on block check bits. When less than the total number of data bits to be transferred is insufficient to fill a fixed length segment, a residual segment is transferred. The residual segment preferably consists of the residual data bits, a check field (CRC) on the data bits as transferred through a buffer system, plus padding bits to make the total number of bits equal to a full length segment. Immediately following the residual segment is a check bit segment which contains a second check (CRC) character. To facilitate checking, a dual modulus counting scheme is employed to determine the number of CRC check bits to be included in the check bit segment. If the number of segments is odd, then an odd number of CRC bytes is transferred. If the total number of segments is even, then an even number of CRC bytes is transferred. Padding bytes make up the remainder of the check bit segment. The odd/even count between the successive segments is also used as a format check.

61 Claims, 28 Drawing Figures

FORMAT LEGEND

B BYTE COUNT-MODULO 32
C CHECK BIT FOR BLOCK CODE
D DATA BIT
F FORMAT BIT POSITION
P PADDING BIT
R BYTE COUNT-MODULO 7
X ODD/EVEN CRC-1 BIT
Y CRC-1 BIT
Z BUFFER CRC-2 BIT

* EXTRA FRAME BIT POSITION
P1-P3' PREAMBLE SIGNAL GROUPS
M1-M2 MARKER SIGNAL GROUPS
R1 RESIDUAL GROUP 1
R2 RESIDUAL GROUP 2
C1-C2 CHECK BIT SEGMENT SIGNAL GROUPS

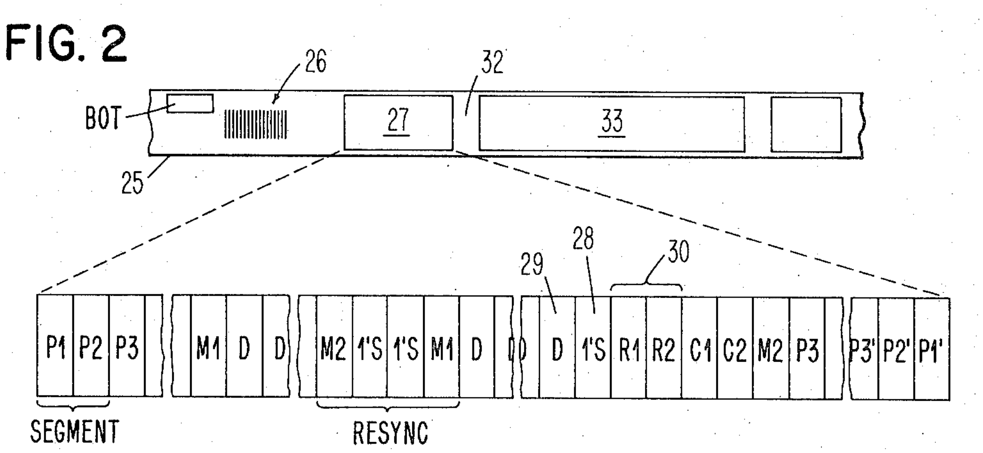
FIG. 2
FIG. 4
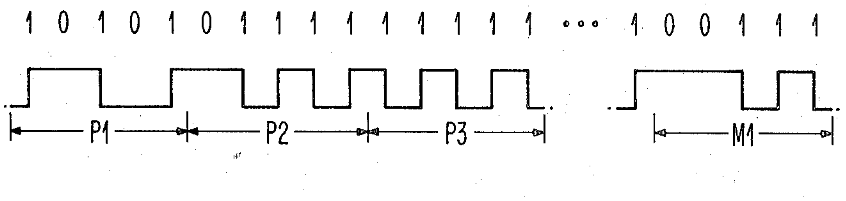
FIG. 5
FULL DATA SEGMENT (D)
| TRACK | GROUP A | | | | | GROUP B | | | | |
|---|---|---|---|---|---|---|---|---|---|---|
| 4 | D | D | D | D | * | D | D | D | C | * |
| 6 | D | D | D | D | * | D | D | D | C | * |
| 0 | D | D | D | D | * | D | D | D | C | * |
| 1 | D | D | D | D | * | D | D | D | C | * |
| 2 | D | D | D | D | * | D | D | D | C | * |
| 8 | C | C | C | C | * | C | C | C | C | * |
| 3 | D | D | D | D | * | D | D | D | C | * |
| 7 | D | D | D | D | * | D | D | D | C | * |
| 5 | D | D | D | D | * | D | D | D | C | * |
| BYTE | 1 | 2 | 3 | 4 | F | 5 | 6 | 7 | C | F |

FIG. 6
RESIDUAL SEGMENT (R=02)

| TRACK | | | R1 | | | | | R2 | | |
|---|---|---|---|---|---|---|---|---|---|---|
| 4 | D | D | P | P | * | P | P | Z | C | * |
| 6 | D | D | P | P | * | P | P | Z | C | * |
| 0 | D | D | P | P | * | P | P | Z | C | * |
| 1 | D | D | P | P | * | P | P | Z | C | * |
| 2 | D | D | P | P | * | P | P | Z | C | * |
| 8 | C | C | C | C | * | C | C | C | C | * |
| 3 | D | D | P | P | * | P | P | Z | C | * |
| 7 | D | D | P | P | * | P | P | Z | C | * |
| 5 | D | D | P | P | * | P | P | Z | C | * |
| BYTE | 1 | 2 | 3 | 4 | F | 5 | 6 | 7 | C | F |

FIG. 7
CRC SEGMENT

| TRACK | | | C1 | | | | | C2 | | |
|---|---|---|---|---|---|---|---|---|---|---|
| 4 | X | Y | Y | Y | * | Y | Y | B | C | * |
| 6 | X | Y | Y | Y | * | Y | Y | B | C | * |
| 0 | X | Y | Y | Y | * | Y | Y | R | C | * |
| 1 | X | Y | Y | Y | * | Y | Y | R | C | * |
| 2 | X | Y | Y | Y | * | Y | Y | R | C | * |
| 8 | C | Y | Y | Y | * | Y | Y | C | C | * |
| 3 | X | Y | Y | Y | * | Y | Y | B | C | * |
| 7 | X | Y | Y | Y | * | Y | Y | B | C | * |
| 5 | X | Y | Y | Y | * | Y | Y | B | C | * |
| BYTE | 1 | 2 | 3 | 4 | F | 5 | 6 | 7 | C | F |

PATENTED JUN 28 1974 3,821,703

SHEET 05 OF 22

READBACK TRANSFERS

PATENTED JUN 28 1974 3,821,703

SHEET 20 OF 22

SIGNAL TRANSFERRING

DOCUMENTS INCORPORATED BY REFERENCE

"Proposed American National Standard—Recorded Magnetic Tape for Information Interchange (1,600 cpi, Phase Encoded)", COMMUNICATIONS OF THE ACM, Vol. 13, No. 11, November 1970, Pages 678–685.

Ambrico U.S. Pat. No. 3,503,059 shows write signal compensation.

Irwin U.S. Pat. No. 3,623,004 shows a deskew/buffer apparatus.

Vermuelen U.S. Pat. No. 3,548,327 shows a data detector.

Morphet U.S. Pat. No. 3,154,762 shows excessive skew.

Andresen et al., U.S. Pat. No. 3,670,304 shows quality detection signal controlled gating for readback signals.

Miller U.S. Pat. No. 3,262,097 shows "deadtrack" handling.

Beausoliel et al., U.S. Pat. No. 3,582,906 shows a channel to I/O controller interface.

Brown U.S. Pat. No. 3,508,194, Sellers, Jr. U.S. Pat. No. 3,508,195, and Sellers, Jr. et al., U.S. Pat. No. 3,508,196 show error detection and correction systems usable with the present invention and referred to in the description of the preferred embodiment.

Irwin U.S. Pat. No. 3,624,637 ('637) shows a digital code to digital code converter usable with the present invention.

Irwin U.S. Pat. No. 3,641,534 ('534) shows a record resynchronization system preferred to be used with the present invention. It also shows preamble, postamble, and marker generation.

Moyer et al., U.S. Pat. No. 3,303,476 shows channel to controller constructions.

Hinz, Jr. U.S. Pat. No. 3,639,900 shows enhanced error correction usable with the present invention.

Bossen U.S. Pat. No. 3,629,824 shows an error detection and correction system usable with the present invention for checking each record segment.

Irwin U.S. Pat. No. 3,654,617 ('617) shows the general arrangement of an I/O controller with which the present invention may be practiced.

Floros U.S. Pat. No. Re. 25,527 shows deskewing apparatus usable with the present invention.

IBM TECHNICAL DISCLOSURE BULLETIN, Vol. 14, No. 4, September 1971, Pages 1,171 and 1172, "Enhanced Error Correction", by M. R. Cannon, shows a data bit detector generating error pointing signals.

IBM TECHNICAL DISCLOSURE BULLETIN, Vol. 14, No. 5, October 1971, Pages 1441–1443, "Format Verification", by J. W. Irwin, shows coding having odd or even number of "one" data bits in code groups.

IBM TECHNICAL DISCLOSURE BULLETIN, Vol. 14, No. 6, November 1971, Pages 1821 and 1822, "Program Generated Recording", by G. H. Edstrom et al., shows program generation of special signals to be recorded.

BACKGROUND OF THE INVENTION

The present invention relates to signal transfer systems and particularly to those signal transfer systems capable of transferring and/or storing records of indeterminate length while using codes requiring fixed length segments. Enhanced error detection and correction is provided with the format.

In digital signal transfer systems, particularly multichannel magnetic record systems, the signal format or arrangements used in the transfer may be different than those used in connecting digital equipment. An example of conversion from equipment to a transfer system code, and vice versa, is shown by John W. Irwin in his patent, U.S. Pat. No. 3,624,637. Further advantages can be obtained by segmenting the record into groups for enhancing error detection and correction properties of the signal transfer. In many data transfer systems, the number of signals being transferred is an indeterminate, i.e., the signal transfer system does not know the number of signals it has to transfer. Signal transfer is terminated upon receipt of a command signal from the supplying or receiving units. When the segments of signals being transferred are incomplete, problems arise in continuing the operation of the error detection and correction circuits, as well as identifying the number of data bits in a given segment. The problems cited above become acute in recording systems having high bit areal densities. That is, as recording densities increase, the probability of signals being in error is also increased. Techniques to compensate for such degradation of data integrity are necessary to maintain successful data processing in systems employing such recording. Such increased recording densities are necessary to accommodate data transfer requirements of newer data processing systems.

SUMMARY OF THE INVENTION

It is an object of the present invention to provide an enhanced signal transfer system capable of transferring a signal record of indeterminate length while using fixed length code segments for enhanced error control.

A further object is to provide an improved multichannel magnetic record system exhibiting enhanced signal transfer properties as well as enhanced and flexible error detection and correction capabilities.

In accordance with the present invention, signal blocks are arbitrarily divided into fixed length portions called "record segments", each segment having a predetermined number of data bits with associated check bits operating on the data bits for error detection and correction. The segment may be transmitted in several parallel channels or in a serial channel using time-multiplexing techniques. While transmitting the signals, a CRC (CRC–1) is preferably generated on all of the segments being transmitted as set forth in U.S. Pat. No. 3,508,194. After transmitting a number of segments of data bits, such that the remaining number of bits is less than a full segment, a residual segment is generated. First, an all-1's group of signals or other end-of-data marker (may be one segment or less than one segment) is transmitted indicating that the previously transmitted data segment is the last full data segment. Then, data bits are transmitted with padding bits sufficient to make a full segment less one group or byte of signals.

Further, two counts may be included each having different modulus selected to enhance format verification, one indicating the number of padding bytes and the other a buffer-related count. The last byte of signals is a buffer CRC check byte (CRC–2) for verifying transfer of signals through a buffer system associated with signal transferring.

In a magnetic tape system, this arrangement is particularly advantageous in that in the read backward, the count signal is first encountered telling the tape readback circuits how many padding bits can be discarded prior to transferring data bits. In other signal transmission systems, other advantages can accrue in an equally similar manner.

Following the residual segment, a CRC segment, or a check bit segment, is generated. The CRC character generated in accordance with U.S. Pat. No. 3,508,194 is recorded a plurality of times in the check bit segment. The error detection and correction code used with the data segment is also used in connection with the CRC bytes. Whenever the segment error detection and correction requires an even or odd number of bits in a segment, the number of CRC bytes can be altered to accommodate this requirement.

In the preferred form of the invention, not only are the bytes in each record segment counted; but also, another modulus is used to count the data bytes being transmitted. It is preferred that one modulus be odd and the other one even. In this manner, by initiating the counting in an offset manner, the total or sum of the count in successive segments of data bits will be alternately odd or even. Such odd or even total can be used in connection with the above-described check bit segment to determine the number of check or CRC bytes to be transmitted.

In addition to the above signal permutations, a preamble and postamble burst of signals may be added. Additionally, in magnetic recording systems, intrarecord resynchronization is preferred to be employed with this format. Such intrarecord resynchronization can be that taught by John W. Irwin in U.S. Pat. No. 3,641,534, particularly the illustration relating to the use of run-length limited codes.

For additional reliability, it is preferred that this invention be practiced with run-length limited coding. By monitoring the number of 1's in a record segment, permitted signal code formats and the like, it is preferred that one set of code groups be included in each segment and that the code groups be made dissimilar. Such action facilitates verifying proper formatting.

Utilization of odd and even counts of different modulus and then comparing the sums for successively having odd and even totals in successive record segments verifies correct transfer of data, padding deletion, and the like. In a magnetic recording system, the larger count modulus can be the number of signal transfer buffers provided in accordance with the relationship of the run-length limited (RLL) code and the actual data bits or data processing code. For example, in a nine-track system, 10 bytes of storage code data may constitute a data segment having seven bytes of data or data processing code. The two moduli are selected in accordance with this relationship and the relative data transfer rates to be employed.

The data block of indeterminate length is terminated by a residual segment and a check bit segment which is demarked from the full data segments by an END DATA MARK preferably consisting of all 1's for one group of data. Novel means are provided for identifying the CRC check bit segment in forward and backward read using the two counts of odd and even modulus.

A variable length block format check is further achieved by verifying that all of the record segments have a predetermined relationship with all of the special segments, such as the preamble marks, resynchronization, residual, and check bit segments.

Format mark identification is determined by voting; that is, M out of N tracks indicate a format irrespective of whether the code in the track not indicating a format is valid or not.

Another object of the invention is providing the record format of a number of bytes less than required to fill a record segment. Special procedures handle such unusual situations. The latter object enhances the invention in that there are no restrictions on record length; that is, the minimum record is one byte, and the maximum record is limited by media or record member length.

In magnetic record systems, it is further advantageous to make the circuitry usable for a plurality of formats. It is a further object of the present invention to provide means for recording an enhanced record format and yet be operable with a minimum of additional hardware and programming for other record formats.

In accordance with another aspect of the invention, improved data recovery is provided by quality-indicating signal (pointer) handling and the manner in which such signals are manipulated with respect to data signals in a given record format. Such pointers use the teaching of the Hinz, Jr., U.S. Pat. No. 3,639,900; hence, this inventive aspect includes improvements over the Hinz, Jr., teaching.

Pointer signals generated in accordance with the Hinz, Jr., patent are compared with the error correction codes described in the specification. If an error is pointed to, the generated pointers are then termed "valid" pointers, i.e., pointers validly point to an actual error condition. Two counting techniques are then employed. First, if after a valid pointer is determined, then if no error condition exists in that given channel or track for a given number of data bytes, the pointer is erased. If, on the other hand, there are repeated errors for a given number of byte positions, the pointer is converted into a so-called persistent pointer; that is, an error condition in a track that persists longer than the normally expected error conditions. If such a persistent error condition is accompanied with other selected conditions, such as a given track signal in an almost-excessive skew condition, then the signal channel or track is deadtracked; i.e., no signals from such track are processed. Such concepts provide improved "windows" for evaluating quality signals and provide an improved input to powerful error detection and correction codes. Such error detection and correction codes form no part of the present invention.

In yet another aspect of the invention, the data segments are treated as units of data bits. Because of differing rates of data transmissions between connected data processing equipment and the recording channels, extensive buffering is employed. One buffer, termed the "main" buffer, accommodates the different rates of signal exchanges in a new and novel manner. Signal exchanges from the readback circuits into the main buffer are in accordance with predetermined lengths of signal byte bursts, while the signal exchanges with the connected data processing equipment are on a byte-by-byte basis. Priority is accorded to such bursts of signal bytes provided. No two successive bursts can be supplied without an intervening transfer of at least one byte to the connected data processing equipment.

The foregoing and other objects, features, and advantages of the invention will be apparent from the following more particular description of preferred embodiments of the invention, as illustrated in the accompanying drawings.

THE DRAWINGS

FIG. 4 is an idealized diagrammatic showing of data representation with idealized recording signals and used to illustrate some of the format code segments used in connection with the FIG. 2 illustration.

FIG. 5 is a simplified breakdown of a full data segment constructed in accordance with the legend of FIG. 3.

FIG. 6 is a similar showing to FIG. 5, but for a residual segment having two bytes of data to be transferred.

FIG. 7 is a showing similar to FIG. 6 but for a check bit segment using cyclic redundance characters generated in accordance with U.S. Pat. No. 3,508,194.

Figure 8:
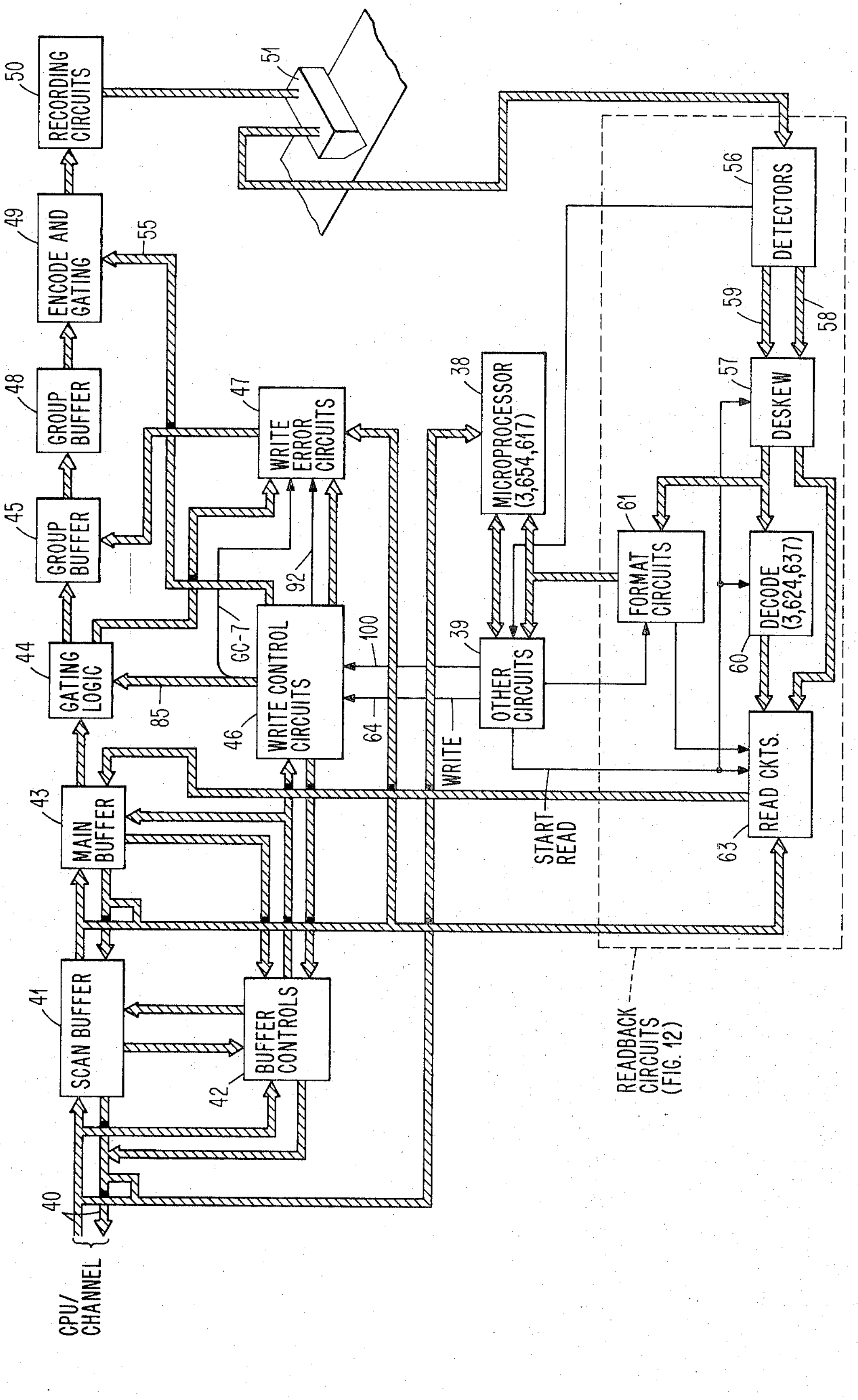

FIG. 8 is a simplified signal flow diagram of apparatus used to implement and illustrate the present invention.

Figure 9:
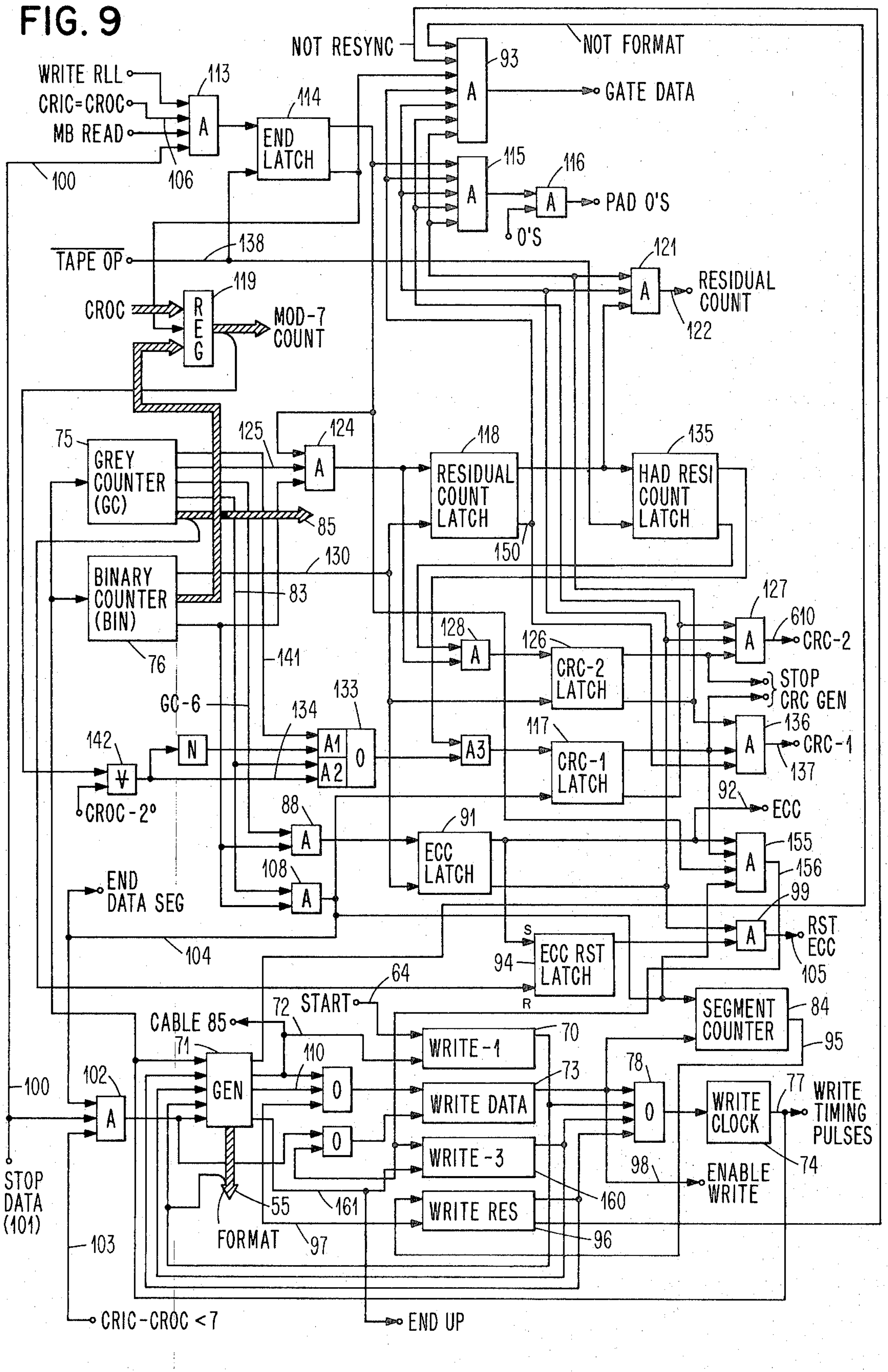

FIG. 9 is a simplified logic flow diagram of a write control system for the FIG. 8 illustrated apparatus.

Figure 10:
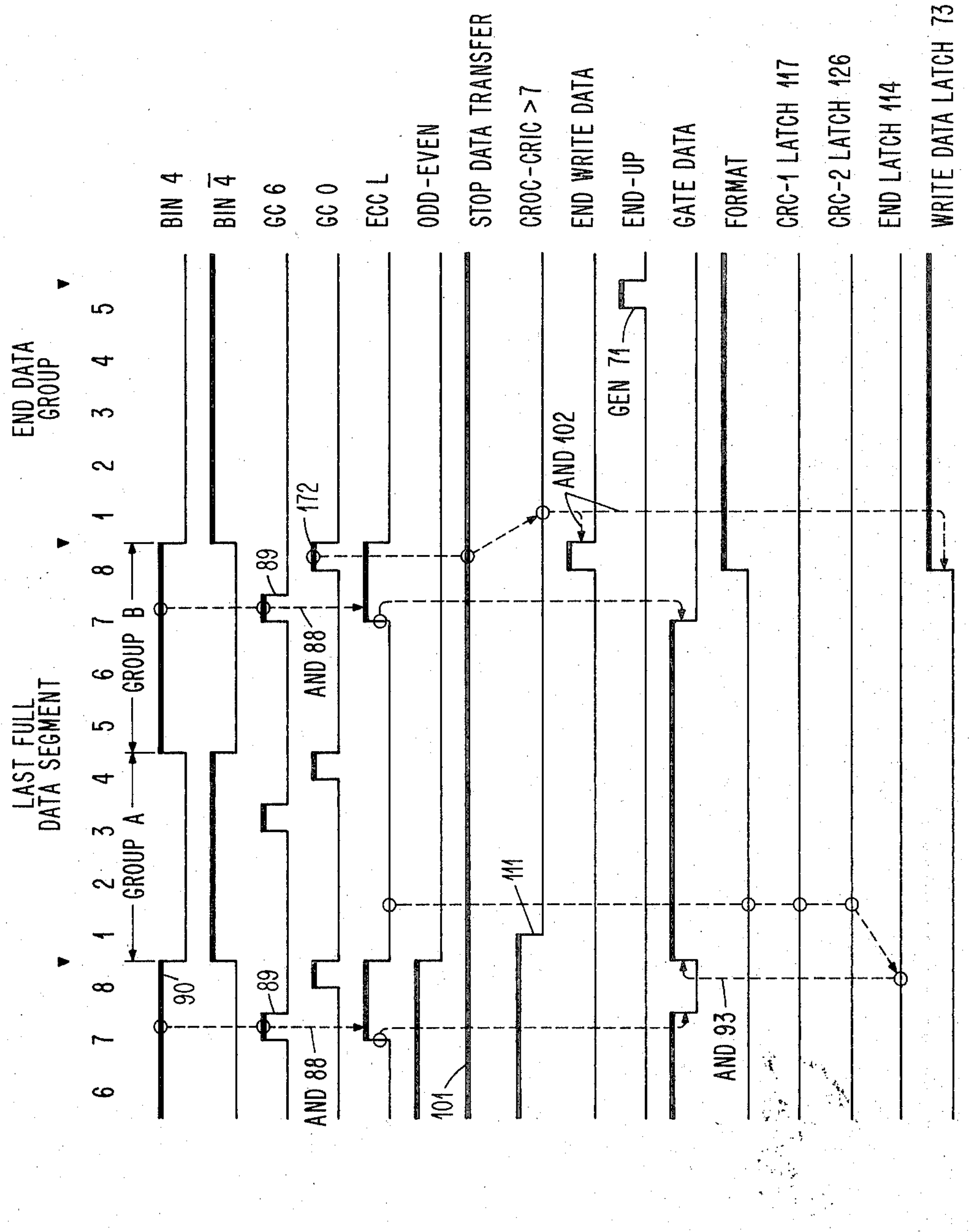
Figure 11:
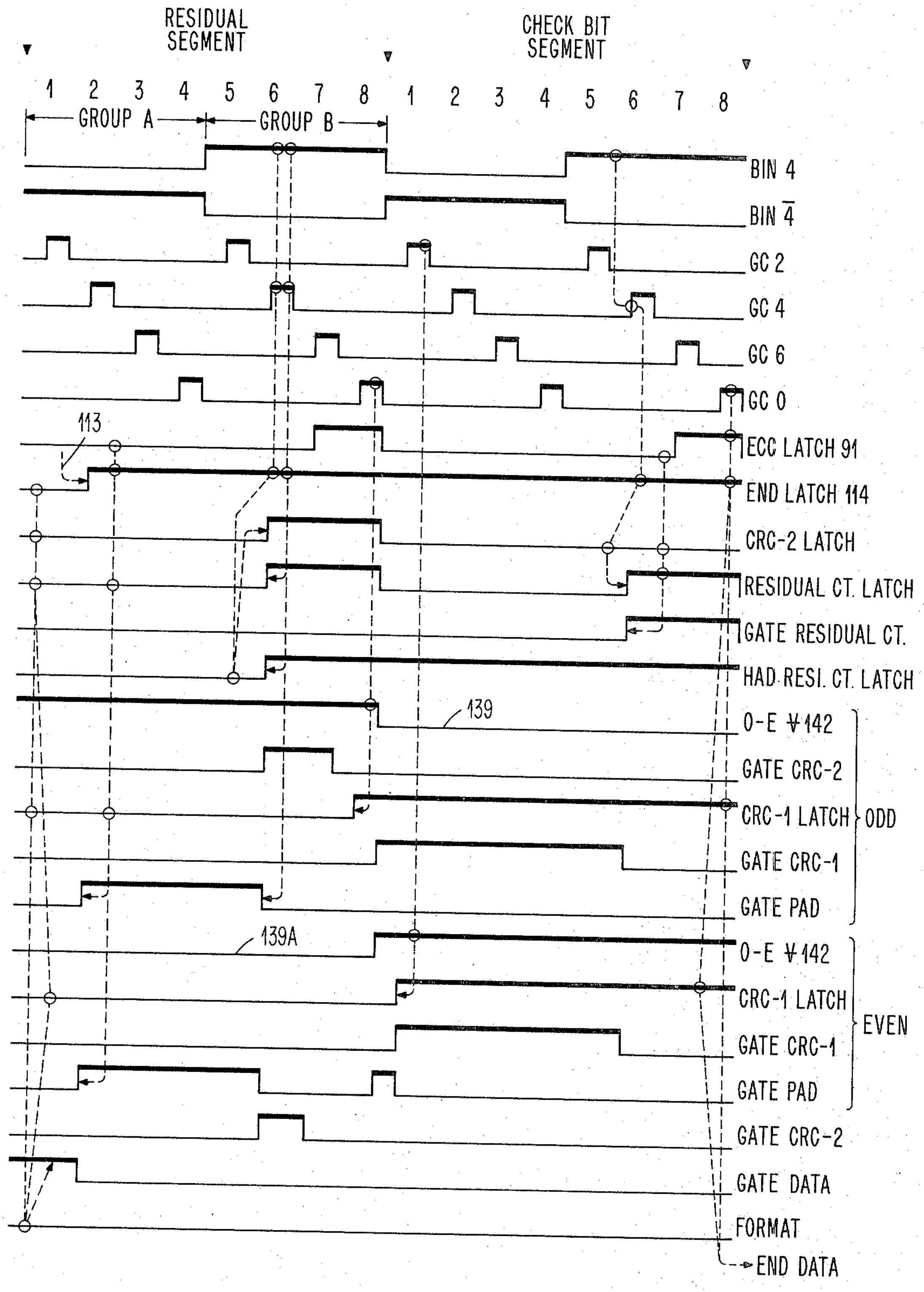

FIGS. 10 and 11 are idealized signal timing diagrams illustrating operation of the FIGS. 8 and 9 apparatus.

Figure 12:
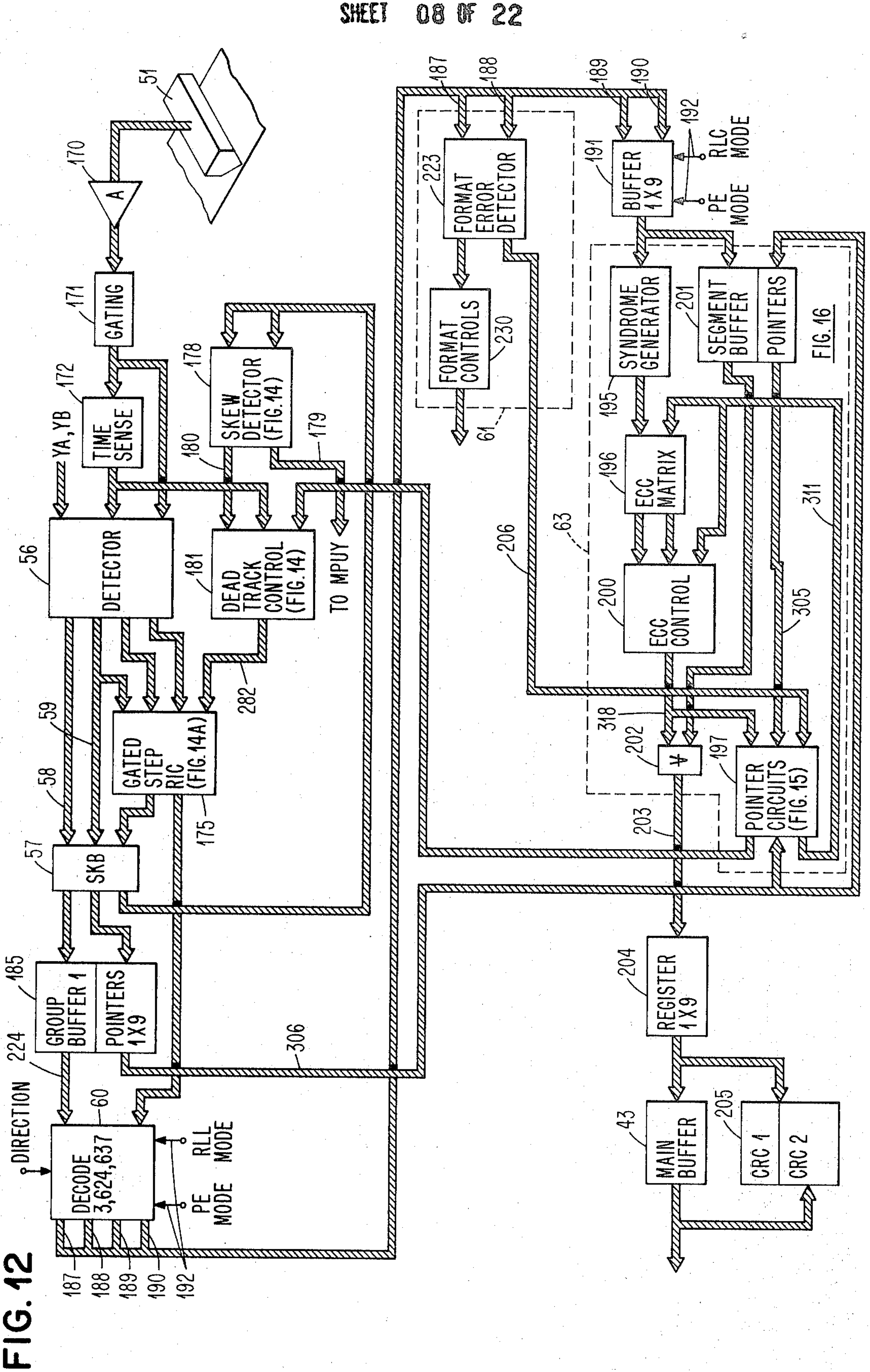

FIG. 12 is a simplified signal flow diagram of readback circuits.

Figure 13:
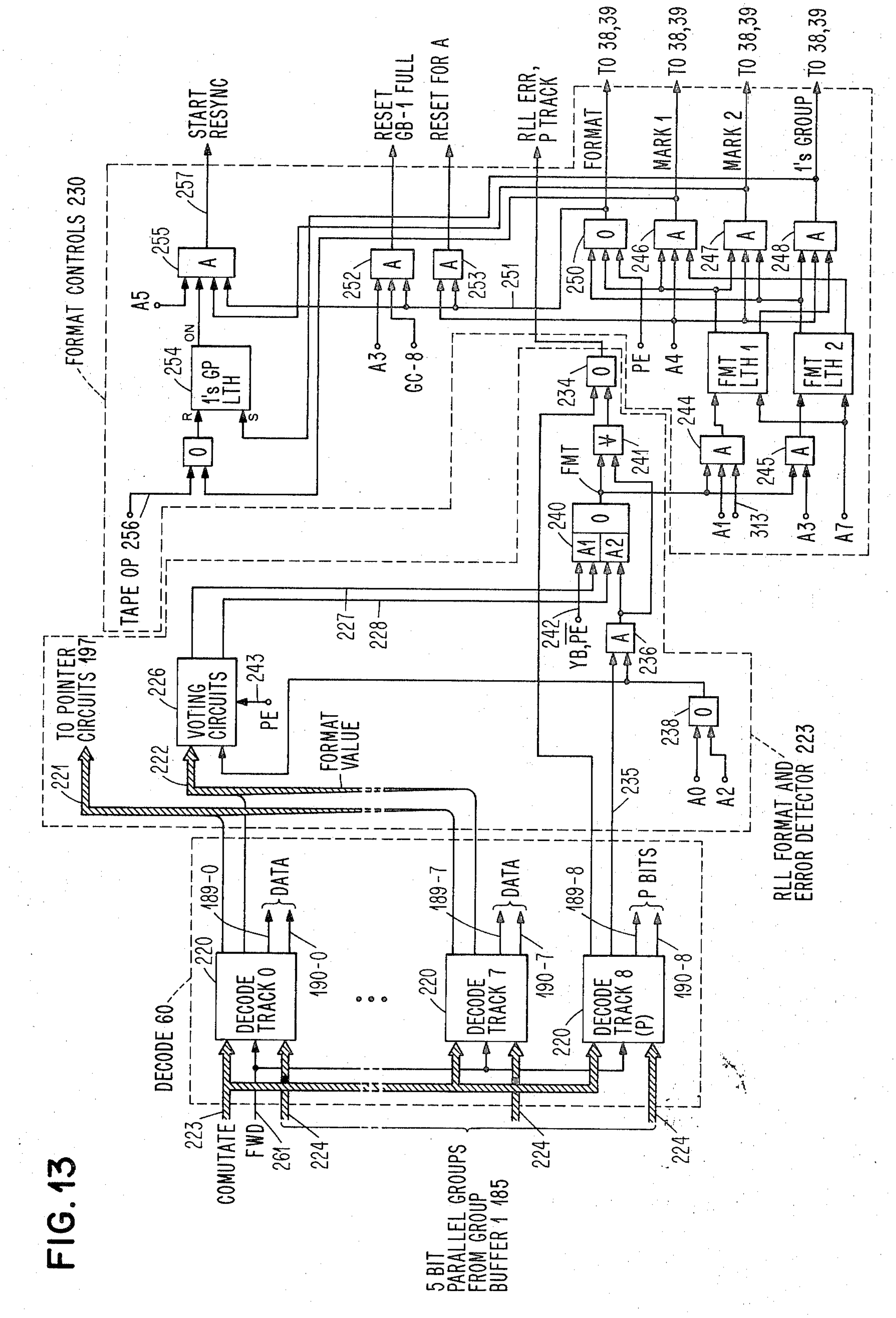

FIG. 13 is a simplified logic diagram of format control circuits 61.

Figure 13A:
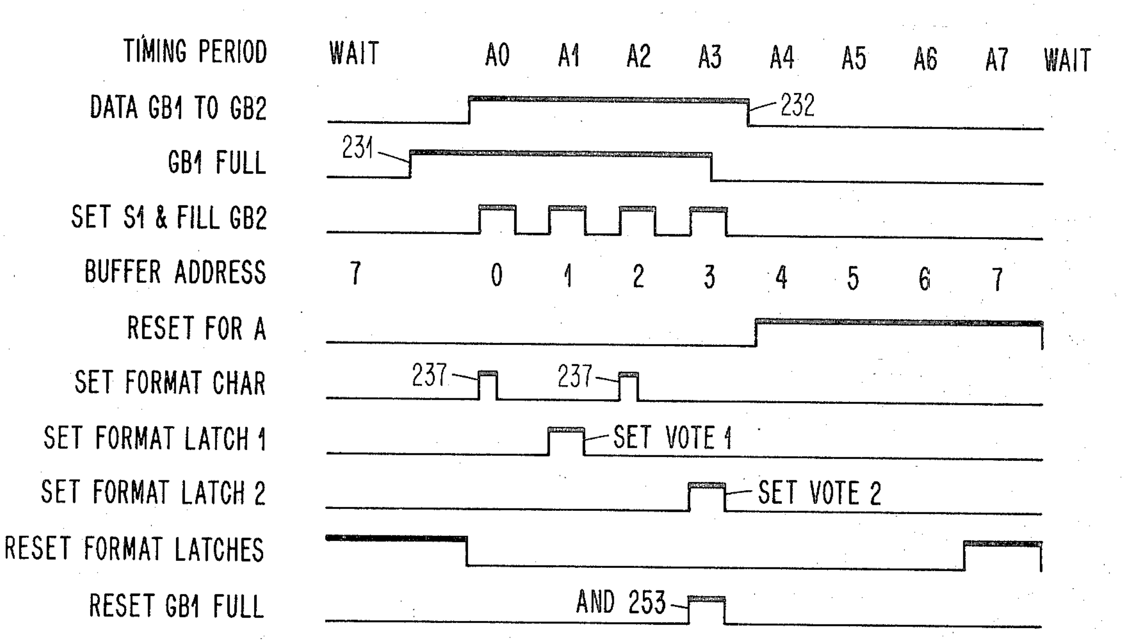

FIG. 13A is an idealized signal chart showing operation of the FIG. 13 illustrated circuits.

Figure 14:
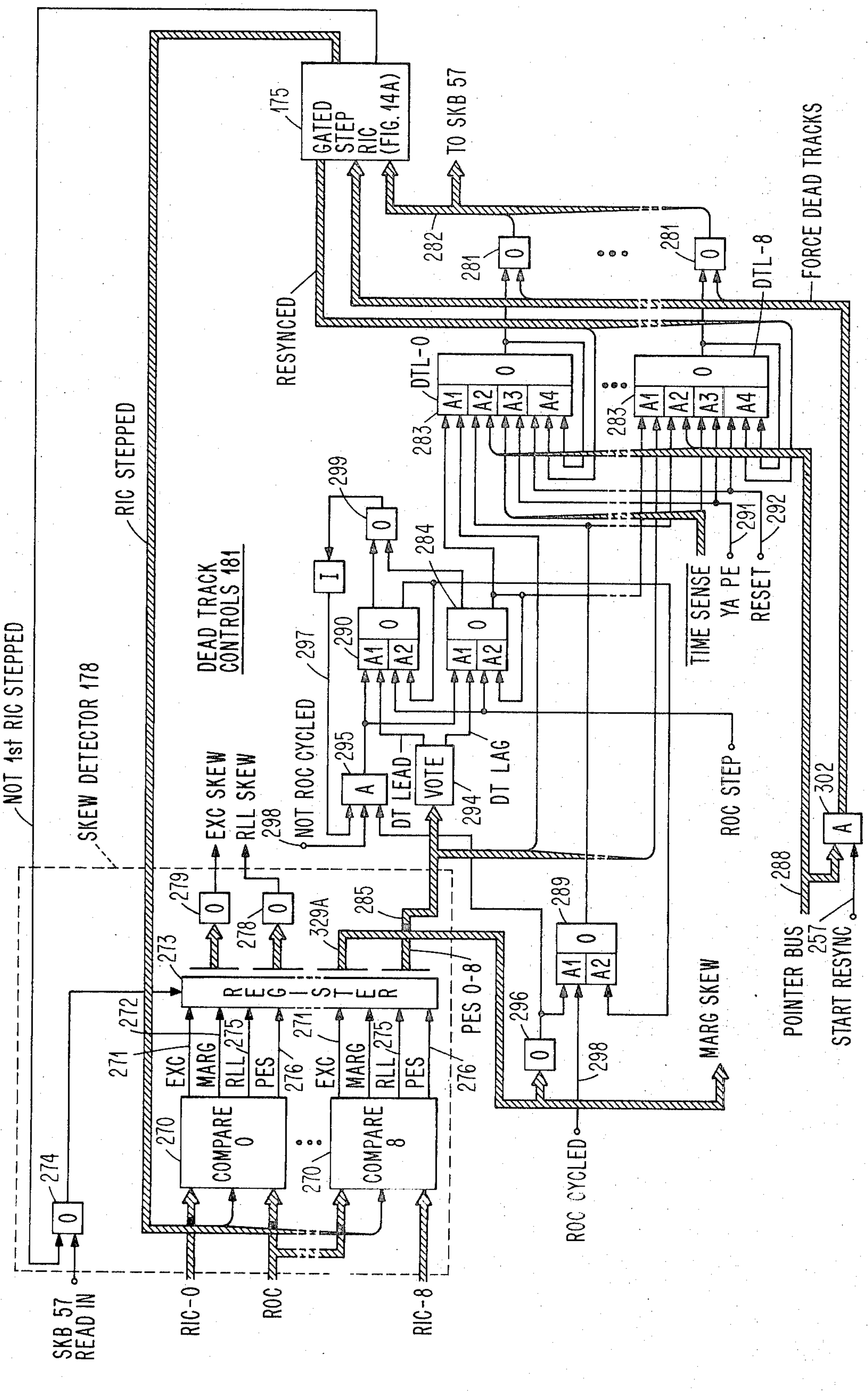
Figure 14A:
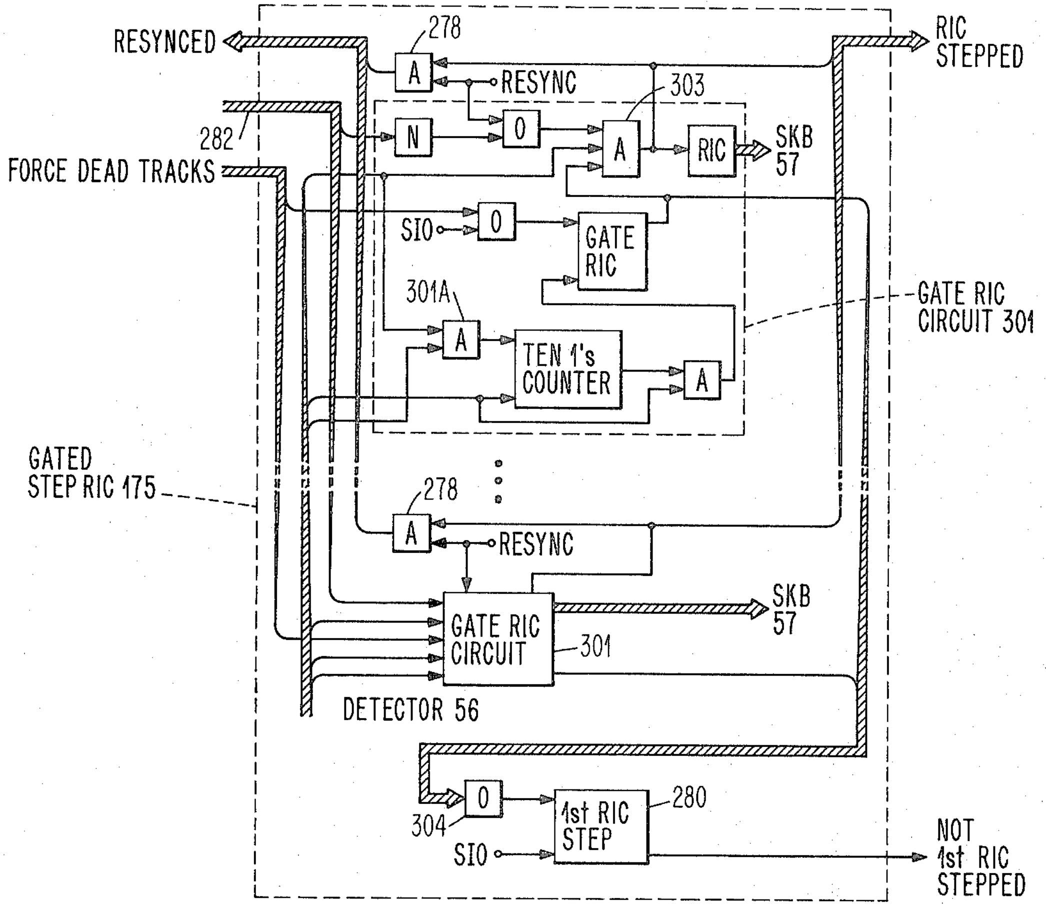

FIGS. 14 and 14A are simplified logic diagrams of skew detection and deadtrack controlling.

Figure 15:
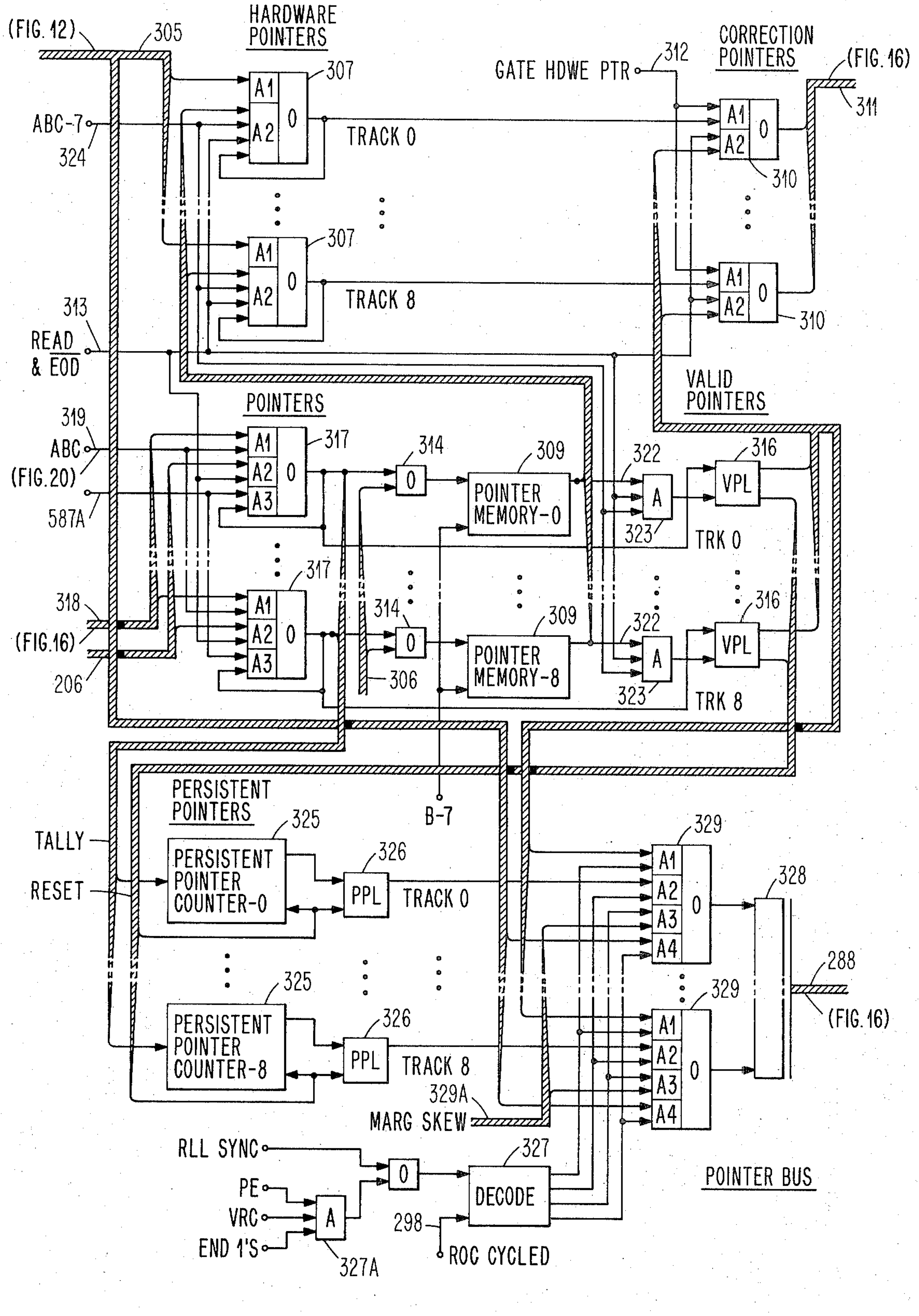

FIG. 15 is a simplified logic diagram of pointer circuits.

Figure 16:
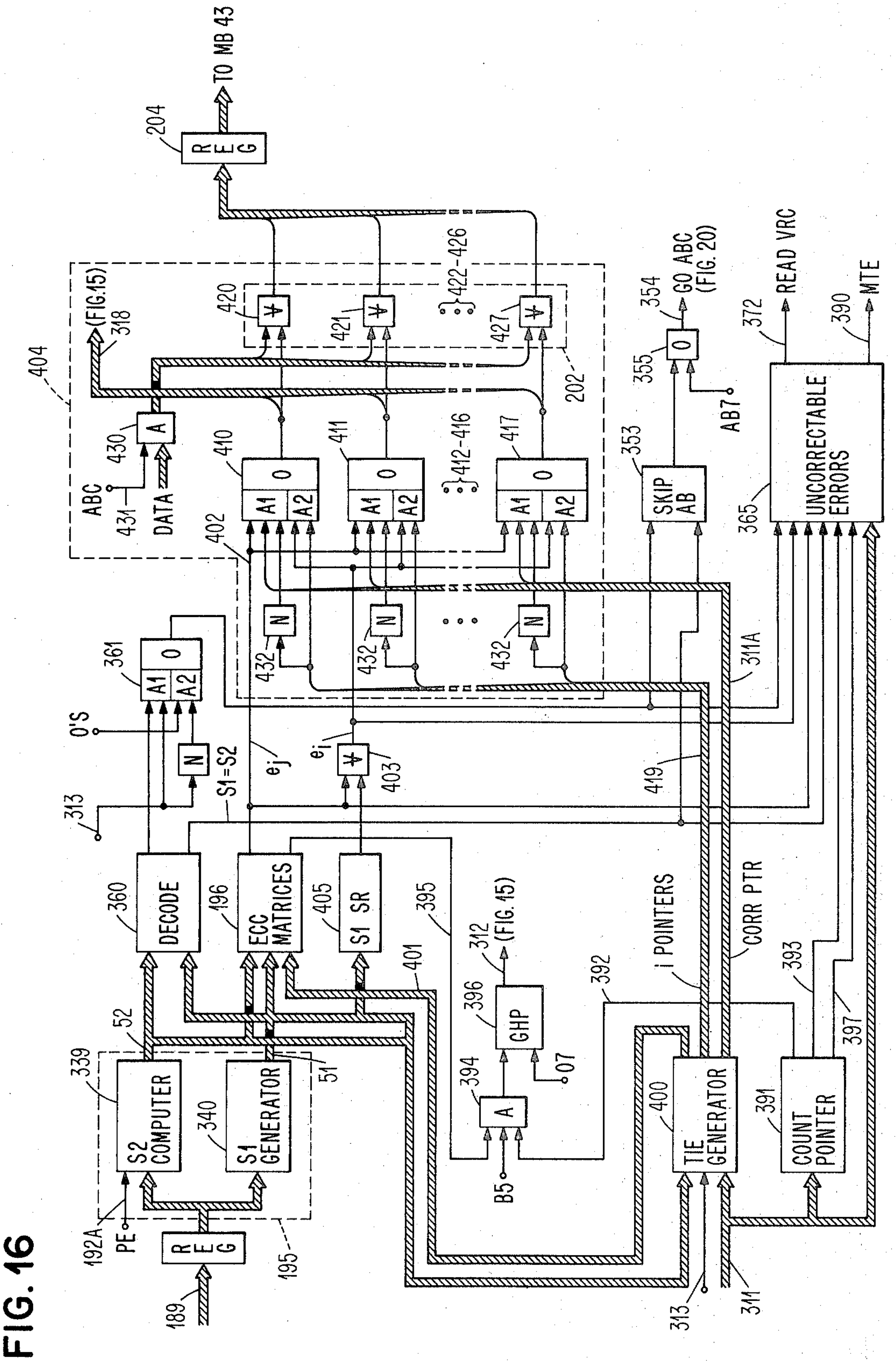

FIG. 16 is a simplified logic diagram of error correction circuits.

Figures 1, 3:
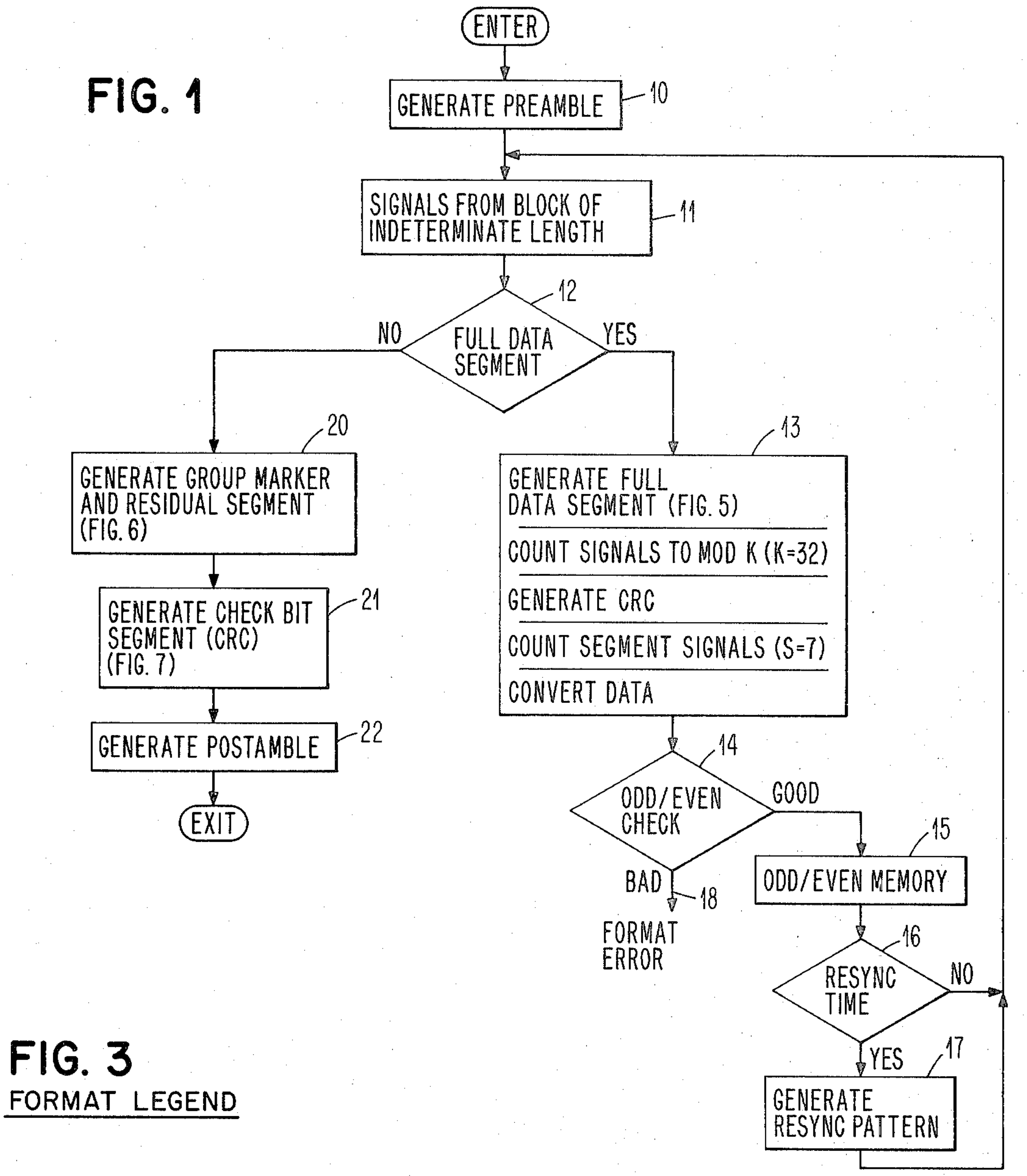
FIG. 1 is a simplified flowchart showing certain aspects of the present invention.
FIG. 3 is a legend illustrating the abbreviations used in the other figures of the drawing.
Figure 17A:
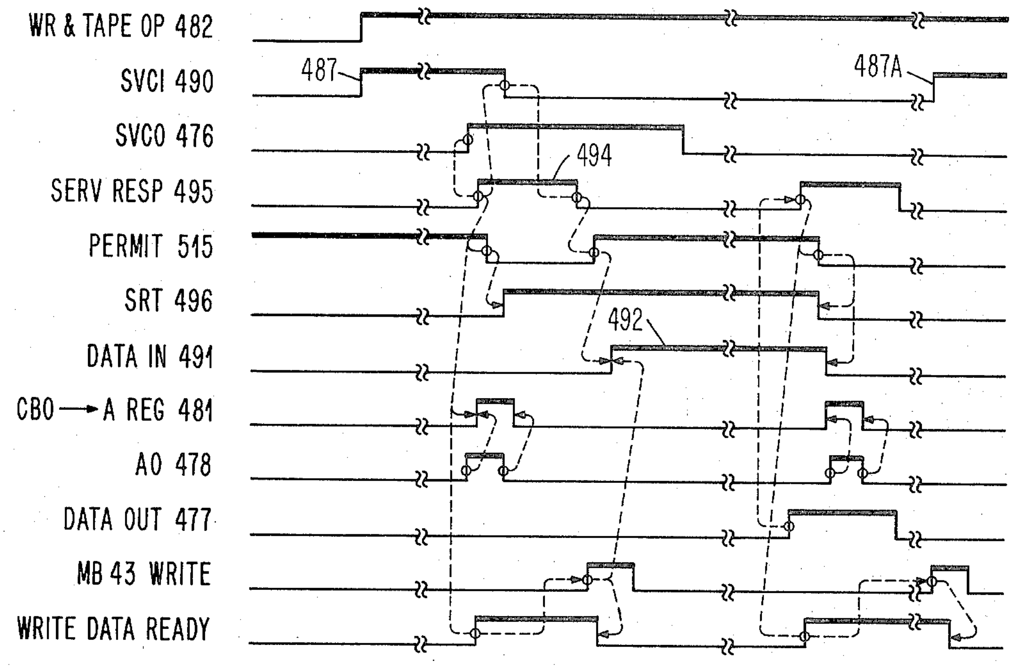
Figures 1, 17:
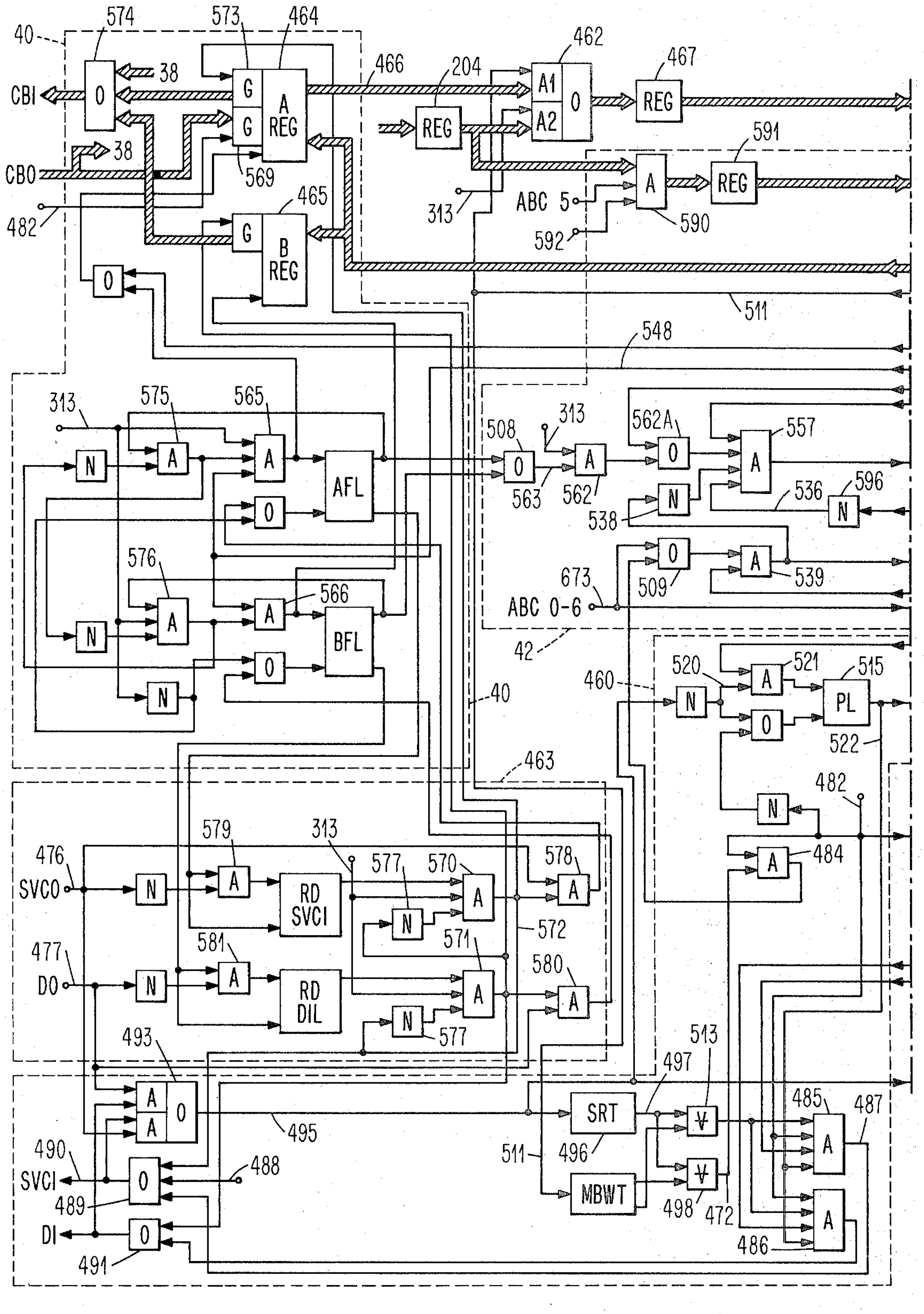
Figures 2, 17:
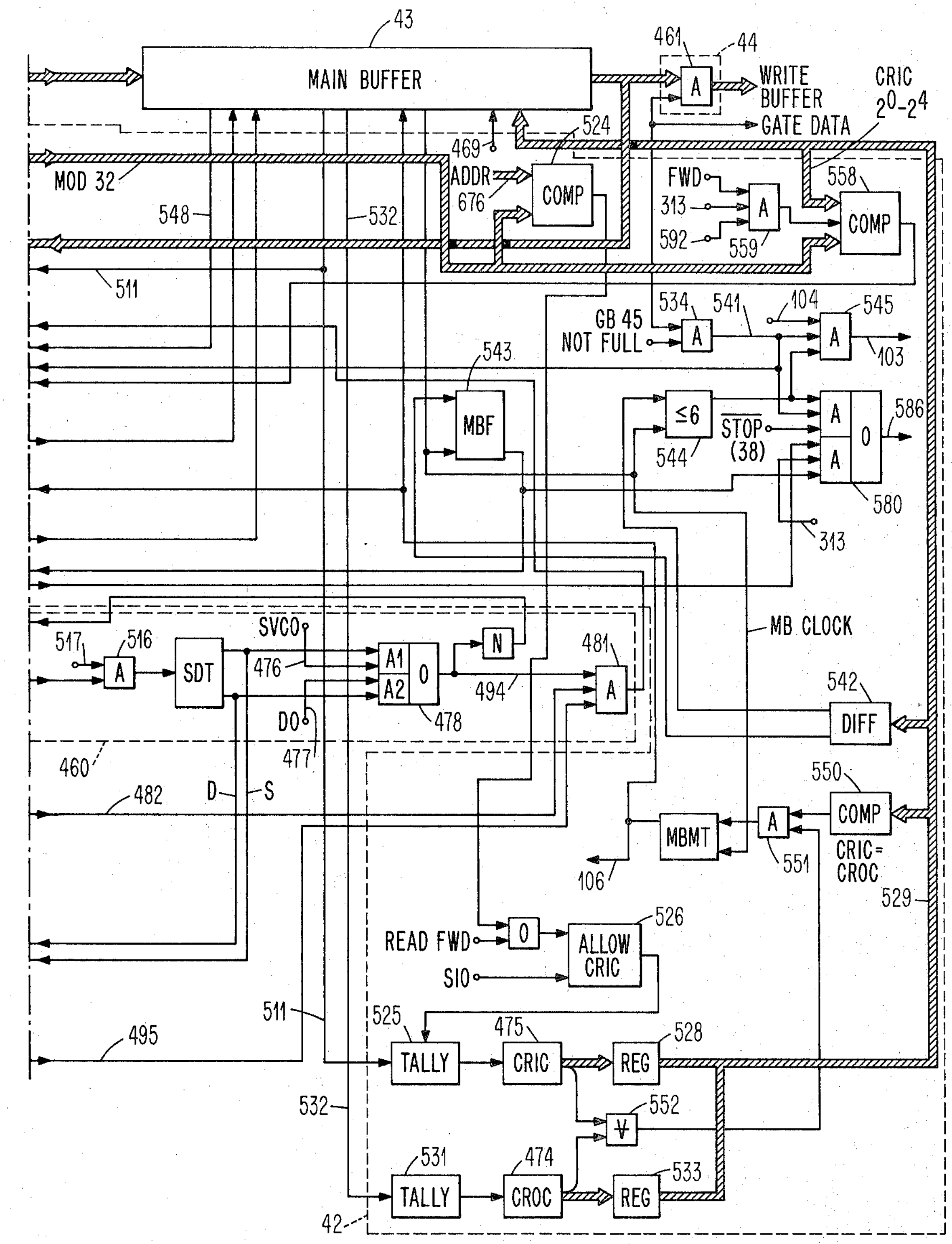
FIG. 2 is a simplified diagrammatic showing of an article recorded in accordance with the present invention and illustrating the preferred signal record format for a data block.

FIGS. 17–1 and 17–2 are a simplified logic diagram of buffer control and channel logic circuits.

Figure 17B:
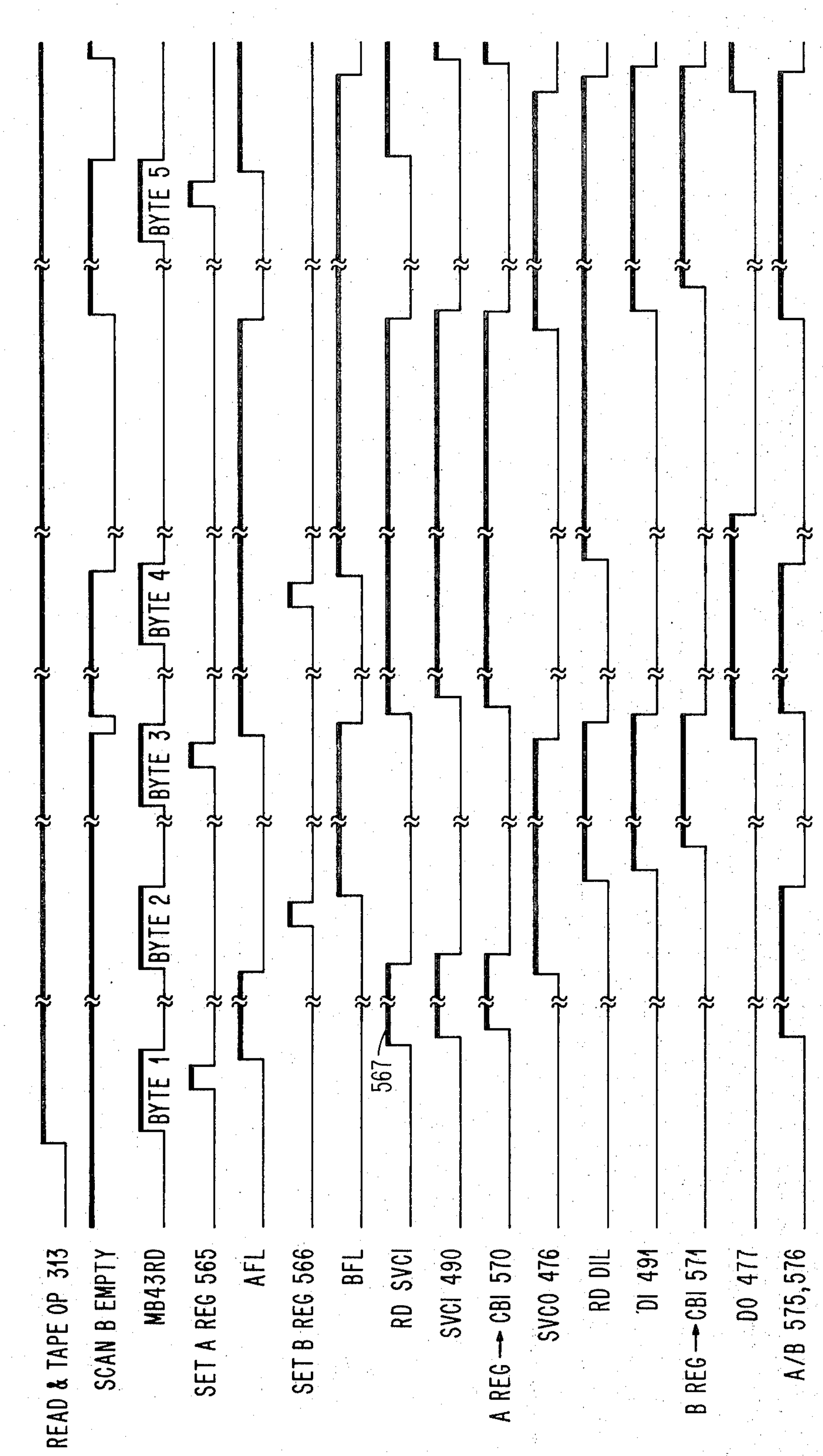

FIGS. 17A and 17B show the timing of the FIGS. 17–1 and 17–2 illustrated circuits.

Figure 18:
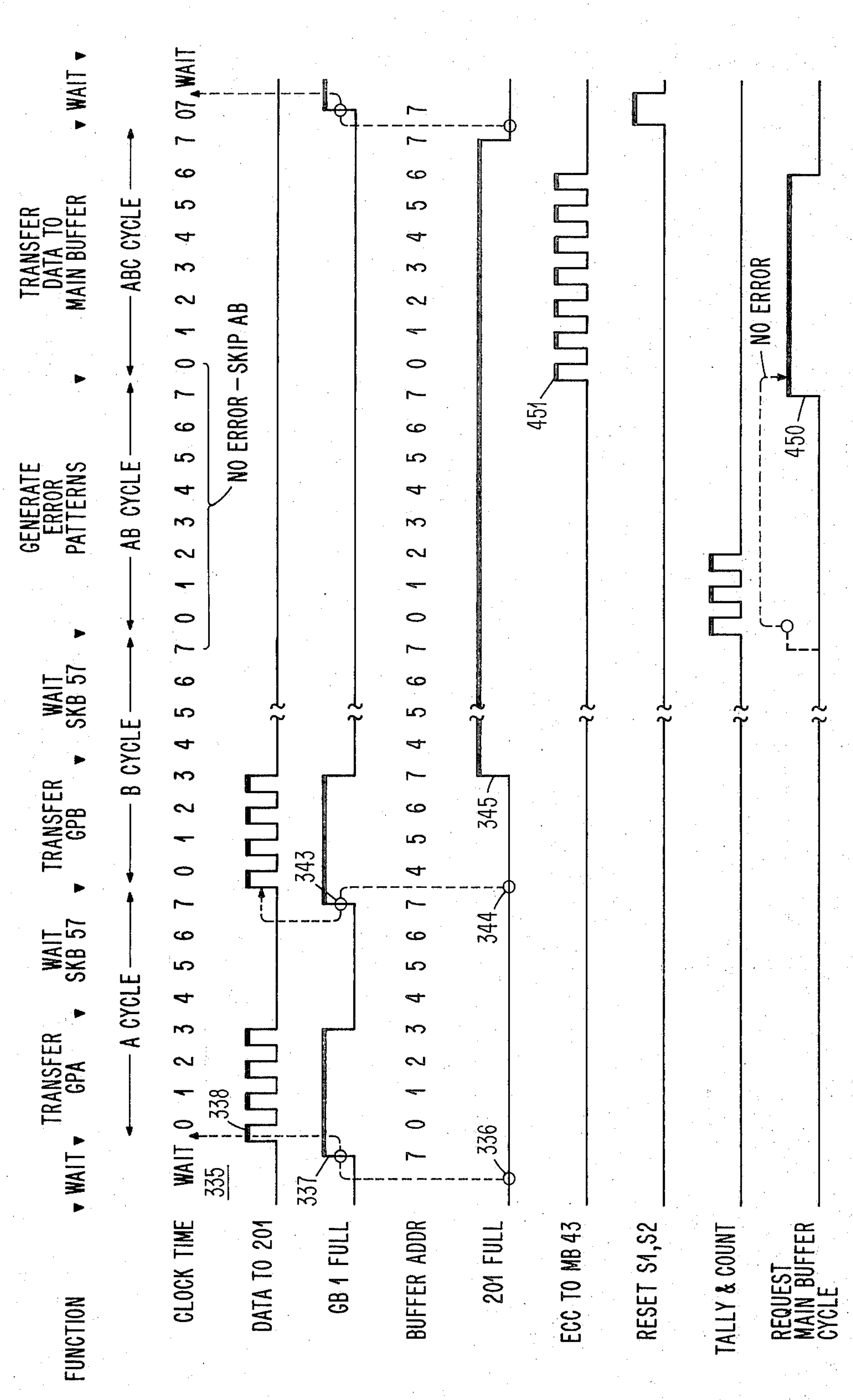

FIG. 18 shows the timing of FIGS. 12, 16, and 17 with idealized signals.

Figure 19:
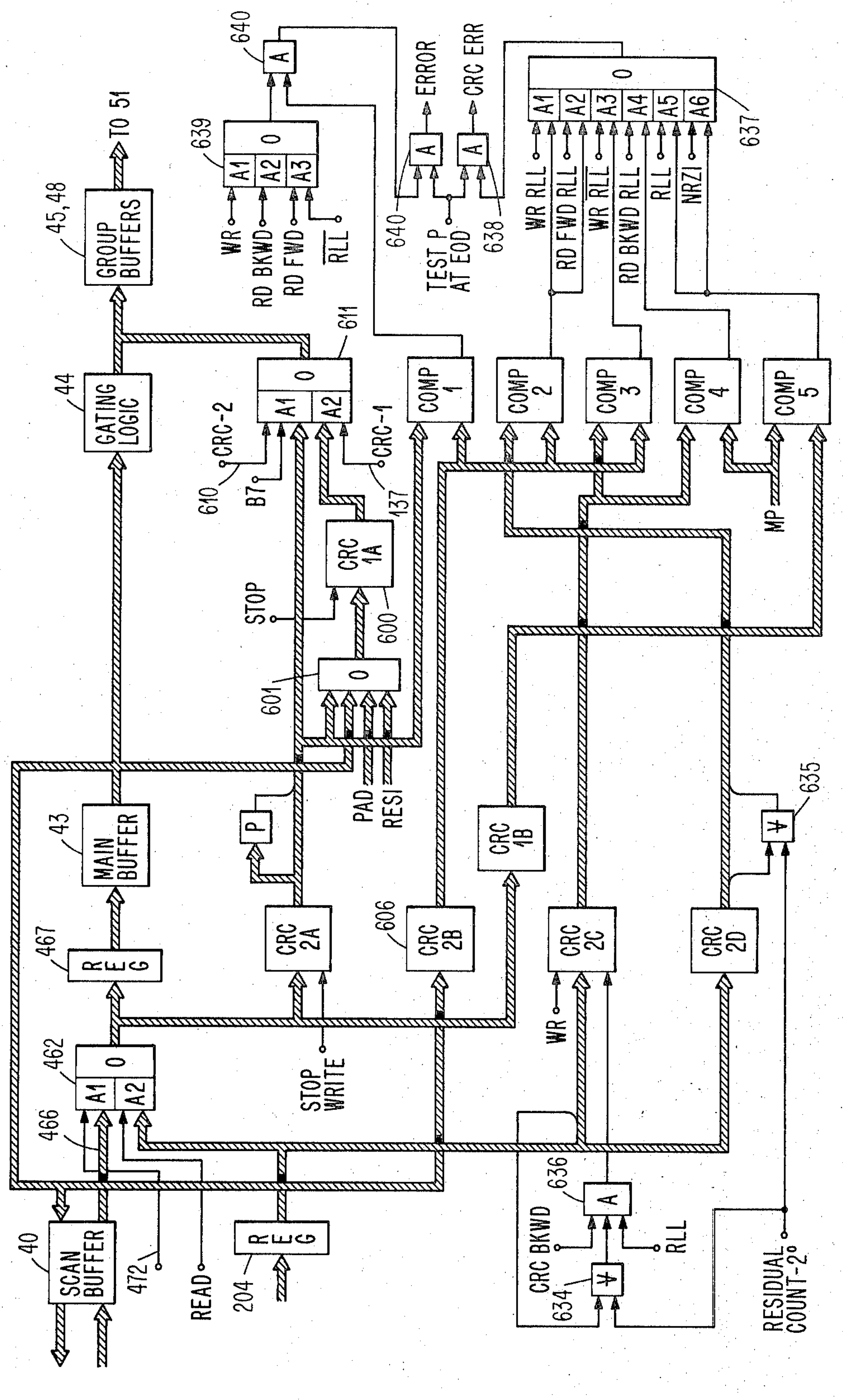

FIG. 19 shows CRC circuits.

Figure 20:
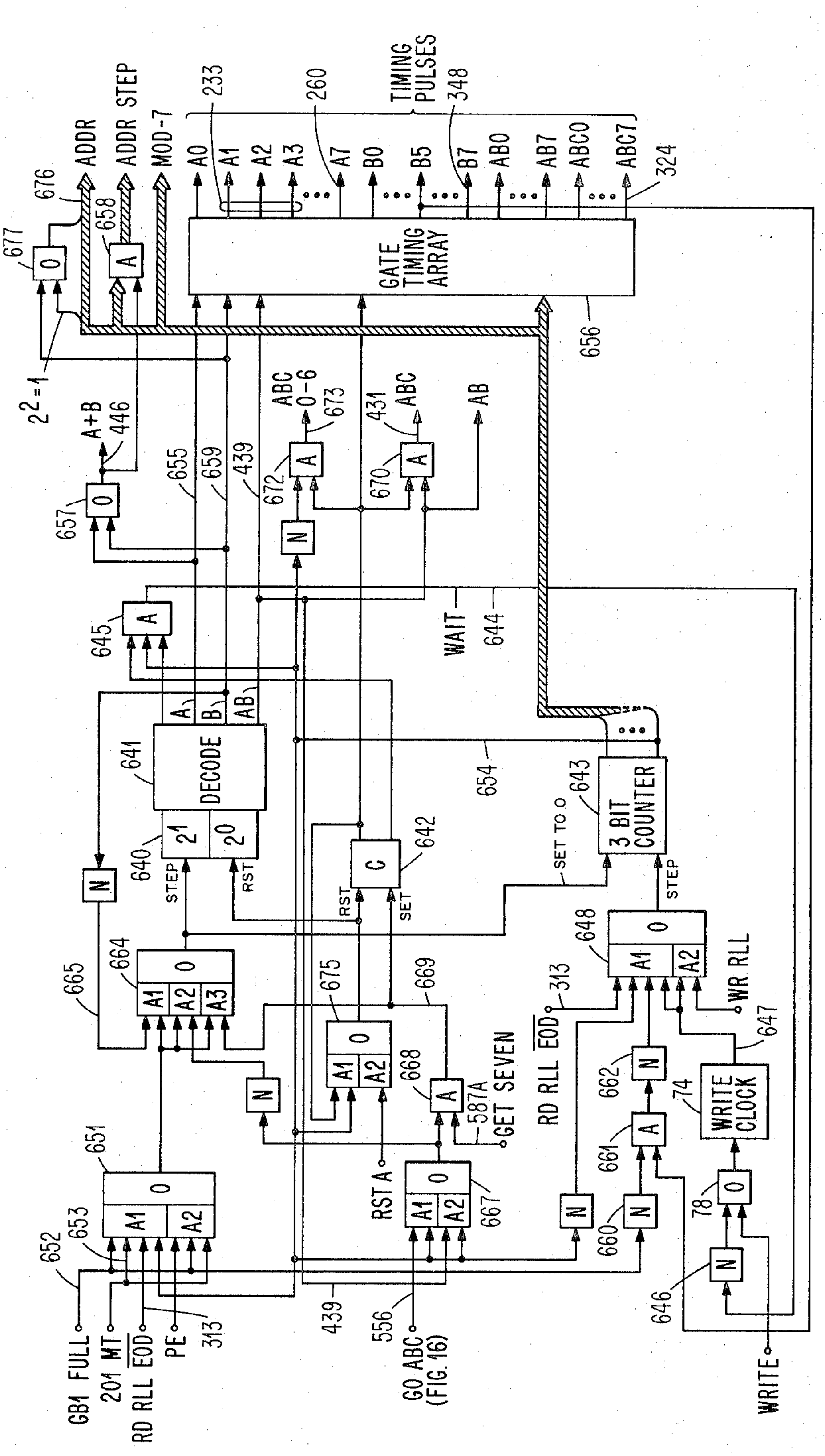

FIG. 20 is a simplified diagram of a timing clock pulse control.

Figure 21:
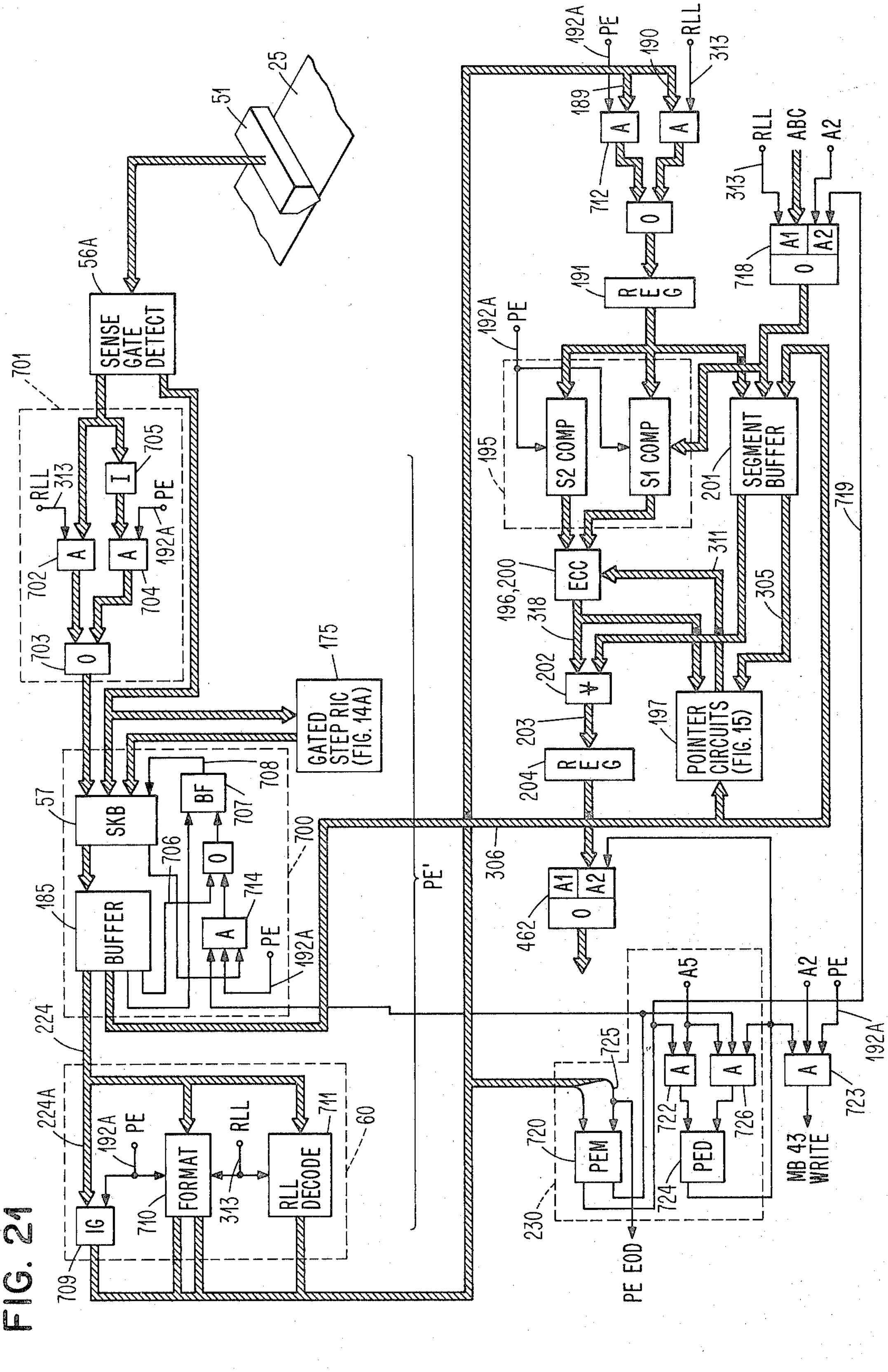

FIG. 21 shows some PE readback circuit connections.

Figure 21A:
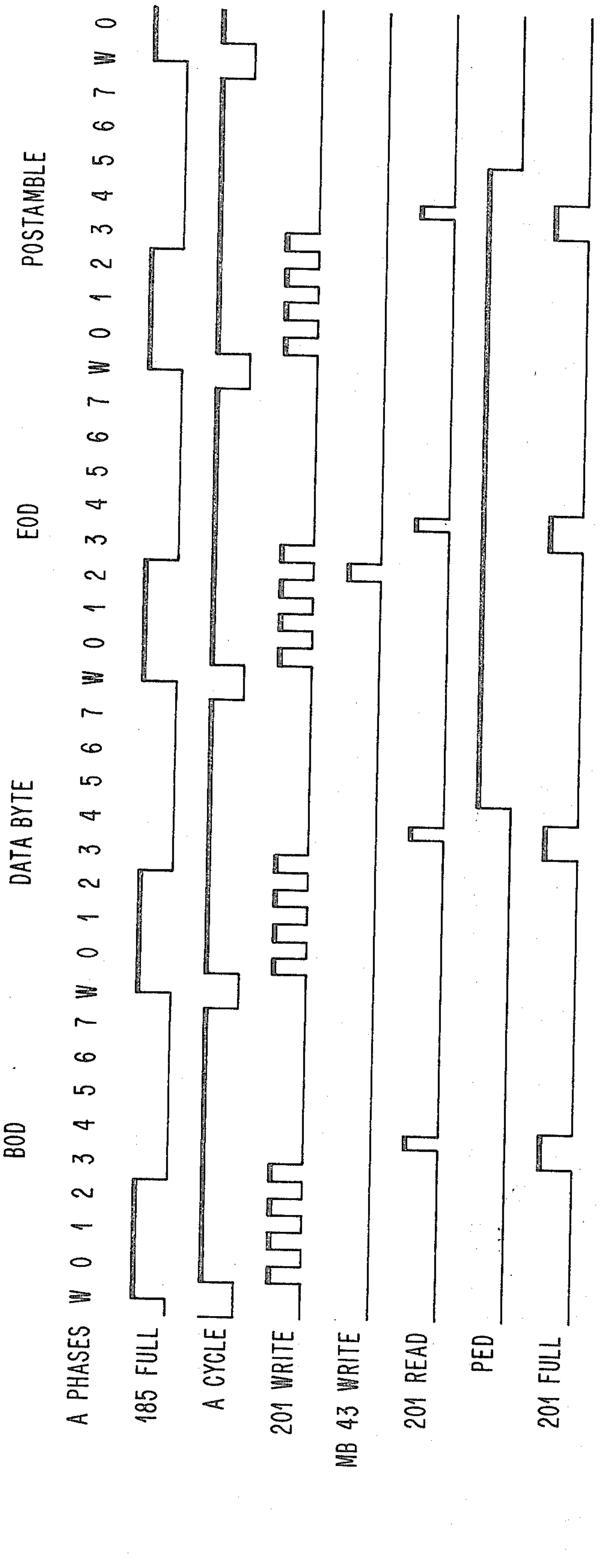

FIG. 21A is a timing diagram for the FIG. 21 illustrated circuits.

Figure 22:
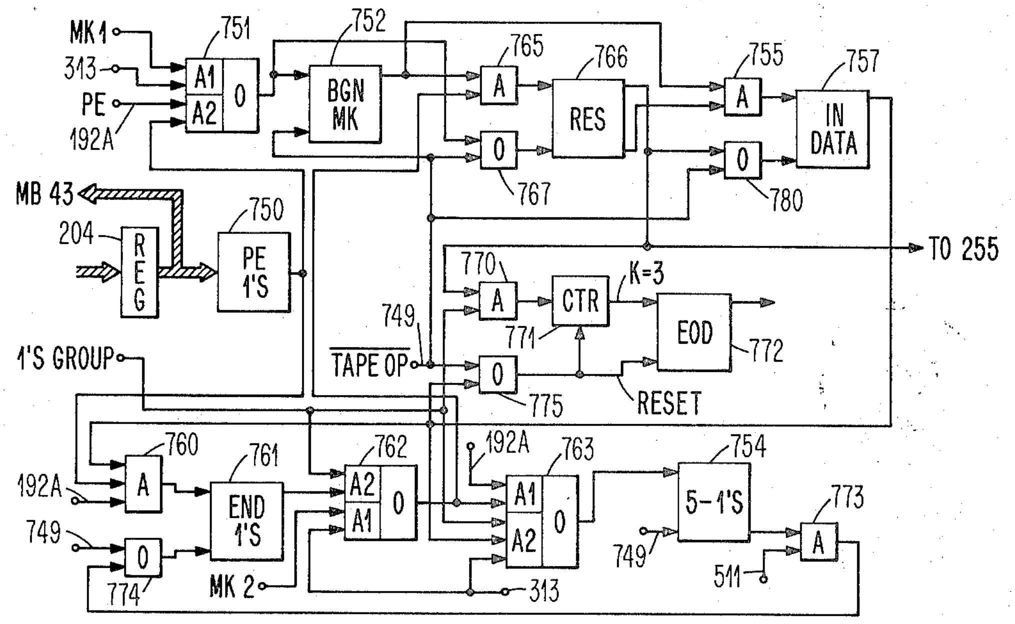

FIG. 22 is a simplified logic diagram showing detection of format marks in plural formats by the same apparatus.

GENERAL DESCRIPTION

Referring now more particularly to FIG. 1, the operation of the invention in its preferred form is described. The description relates to recording data in a multitrack magnetic recording system operable, for example, with the media shown and later described with respect to FIG. 2. In the recording process in a multitrack magnetic media, for example, nine-track ½-inch tape, a preamble or synchronization portion is first generated at 10. Generation of preambles may include a series of synchronizing signals for the readback circuits as well as marker signals denoting beginning of the data. After the preamble is generated, a set of signals from a block of data of indeterminate length is obtained at 11. If a full data segment or seven bytes is obtained, the sequence of operation proceeds from step 12 to step 13 for generating a full data segment. If it is an incomplete data segment, i.e., the last data bytes to be recorded at the end of a data block, then steps 20–22 are performed.

To generate a full data segment, the seven bytes of data are converted into a storage code with added error checking bits. The full data segment is illustrated in FIG. 5. During the generation of the full data segment, signals in the segment are counted to modulus K. In the illustrated embodiment, K is even modulus 32. The significance of the even modulus will become apparent later on. Simultaneously with the generation of a full data segment, error correction signals called CRC are generated in accordance with the teachings of U.S. Pat. No. 3,508,194. Simultaneously, the number of bytes in the segment are counted from 1–7. Notice that the two moduli are odd and even. By starting the counts at the beginning of the data block for modulus K with a 0, successive segments will end with totals of the two counts alternately which are odd and even. This yields an odd/even check ensuring that full data segments are being recorded in the middle of the data block. The odd/even check is illustrated in Table I. The modulus 32 count totals are also examined at the end of each data segment to verify proper format generation. The latter is preferred because it is simpler.

TABLE I

| S Count | Successive K Counts (Hexidecimal) | | | | | | | | | |
|---|---|---|---|---|---|---|---|---|---|---|
| 1 | 0 | 7 | E | 15 | C | 3 | A | 11 | 18 | F |
| 12 | 1 | 8 | F | 16 | D | 4 | B | 12 | 19 | 0 |
| 3 | 2 | 9 | 10 | 17 | E | 5 | C | 13 | A | 1 |
| 4 | 3 | A | 11 | 18 | F | 6 | D | 14 | B | 2 |
| 5 | 4 | B | 12 | 19 | 0 | 7 | E | 15 | C | 3 |
| 6 | 5 | C | 13 | A | 1 | 8 | F | 16 | D | 4 |
| 7 | 6 | D | 14 | B | 2 | 9 | 10 | 17 | E | 5 |
| Segment | 0 | 1 | 2 | 3 | 4 | 5 | 6 | 7 | 8 | 9 |
| Total . | E | 0 | E | O | E | O | E | O | E | O |

Since the first data segment yields an even total, as the odd/even check is even at 14 (FIG. 1), then the odd/even memory is toggled at 15 in preparation for the odd check in Segment 1. If the odd/even check is incorrect, then a format error is indicated at 18.

After the odd/even memory is toggled at 15, additional segments of signals are then obtained at 11 until less than a full data segment is detected at 12. The above-described loop is repeated for recording data except for data in the residual segment.

In addition to recording signals, the present invention also contemplates selective recording resynchronization signals at 16 following the toggling of odd/even memory at 15. Whether or not resync is to be included in the format is checked; if not, step 11 is immediately entered; if yes, a resync pattern is generated at 17 in accordance with the Irwin U.S. Pat. No. 3,641,534 or in accordance with the Cannon patent application Ser. No. 229,214, filed Feb. 18, 1972, and commonly assigned. Other forms of resynchronization may also be used.

The residual segment and the termination of the recording process can occur in two different manners. If the last segment recorded was a full data segment, then the residual segment can either be dispensed with or can contain all padding signals, i.e., all zeroes. If there are less than seven bytes of data to be recorded, a partial segment is recorded with a count field in the residual segment indicating the number of bytes therein, plus a second count field indicating the residual count from the MOD K counter. Two counts taken together are useful during readback for verifying faithful reproduction.

At 20, an END DATA marker group of five all-1's bytes is generated and recorded on the media. The residual segment, such as the one shown in FIG. 6, is also generated and recorded. Following the residual segment, a check bit segment (FIG. 7) is generated and recorded. Then, the record block is terminated by recording the postamble at 22. It is preferred that the postamble and preamble by symmetrical for facilitating forward and backward reading of the record block. The FIG. 1 illustrated flowchart can be implemented by hardware sequences, programmed sequences, or combinations of each. The above-described format generation procedures are generally followed in reverse during readback as is apparent to one skilled in the art and as described herein in FIGS. 9 et seq.

Referring next to FIGS. 2 and 3, an exemplary data format is shown. Media 25 may be ½-inch tape with the usual beginning of tape (BOT) marker. Since ½-inch tape is used to record other formats, such as phase-encoding (PE) and NRZI (non-return to zero-IBM), according to well-known ASA (ANSI) Standards, a special format identification mark (ID) 26 is recorded in a predetermined proximity to BOT. The first block of data signals or record 27 is recorded at a predetermined space downstream from ID 26. Block 27 is shown in exploded view for illustrating the format as used in magnetic recording systems. Whenever the invention is applied to a data communication system, not including a magnetic media or other record member, the preamble, resync, and postamble may be either dispensed with or suitably modified to accommodate system parameters.

Record 27 includes a preamble having preamble groups P1, P2, a series of P3 groups, plus marker group M1. Marker group M1 denotes beginning of data. All portions of the preamble P1–P3 and M1 have like signals recorded in all tracks such as shown for one track in FIG. 4. Each preamble segment has two groups of five-bit signal positions in each of the several tracks. For example, the group of five signals in each track for P1 group in NRZI format is 10101. The alternating 1's and 0's provide a sufficiently long wavelength to enable more accurate beginning of block detection in recording channels where amplitude is inversely related to density than if short wavelengths, as found in the P3 portion, were used. P2, the record preamble group in the first recorded segment, has the data pattern 01111 in all tracks. A combination of P1 and P2 establishes three successive long one-half wavelengths. The P3 portion is the frequency synchronizing burst of several segments having all 1's. This is the minimum wavelength of the record format as used in the illustrative embodiment. The preamble is separated from the data segments D by a group of marker signals sharing a preamble segment with a P3 group. The M1 signal group, 00111, denotes the end of the preamble, as well as end of synchronization burst within the resync portions. The two zeroes represent a maximum length one-half wavelength of the recording system.

The postamble is the mirror image of the preamble. Marker M2 has the data pattern looking from left to right in FIG. 2 of 11100. This is followed by a series of P3 groups for enabling frequency synchronization of the readback clock while reading in the backward direction. Following P3 is a P2' group having the pattern 11110, while P1' has the same pattern as P1.

Following the preamble M1 marker group, data is recorded in a series of full data segments. For example, 158 full data segments may be recorded before a resynchronization (resync) pattern is interleaved among the data segments. Each resynchronization pattern is preceded by an M2 marker signal which denotes the end of the data and the beginning of either a postamble or a resynchronization burst. In the present embodiment, the readback circuits recognize M2 being adjacent a full data segment as the onset of a resync pattern. The end of the data block is identified by an end of data group 28 consisting of a pattern of all 1's adjacent a data segment.

Returning now to the resync pattern, the M2 marker groups (like signals in all tracks) share a record segment with an all-1's pattern such as P3. A second record segment of the resync pattern starts off with an all-1's pattern followed by an M1 pattern, as explained with respect to the preamble. Then, a second group of 158 segments of data may be recorded with subsequent interleaved resync patterns. When the end of data block is reached, the last full data segment, as at 29, is immediately followed by the end of data marker group consisting of all 1's as at 28. Immediately following the END DATA group mark, residual segment 30 has residual groups R1 and R2, as will be later explained with respect to FIG. 6. Following the residual segment is the check bit segment having check bit groups C1 and C2. The check bit segment is immediately followed by an M2 marker signal and the remainder of the postamble as previously discussed.

Immediately following data block 27, IBG (inter-block gap) 32 separates block 27 from downstream data block 33. In a similar manner, all of the other data blocks on media 25 can be so separated. Additional erased portions having a length greater than IBG 32 may be used to separate files or groups of data blocks and span defective recording areas as is well known in the data processing tape recording.

Turning now to FIG. 5, a "full data segment" is shown in diagrammatic form. The track assignments are those used in ASA Standards for Information Interchange Using Phase-Encoded Recording, supra. Each data segment has Group A and Group B signals. Each group of signals consists of five storage code bytes of signals to be recorded, each signal being a transition location using NRZI recording techniques. In Group As the first four bytes contain data signals and check signals. Such data signals represent the data processing code or binary digits received by the recording system from a connected data processing system. As will become apparent, the four bytes of data and the check bits are converted into five-bit storage code values in accordance with the Irwin U.S. Pat. No. 3,624,637. The four digit positions from the four bytes in each of the respective tracks are encoded into the five-bit code, with each code group extending longitudinal of the tape. That is, there is one code group in track 0 for the four data bits shown in track 0, etc. The fifth digit position of the storage code is represented by a letter "F", with the signals represented by the asterisks.

The second data group, or Group B, of a full data segment consists of three data bytes, 5, 6, and 7 plus a byte C of check bits. The parity track, or track 8, contains so-called vertical redundancy check bits. In a similar manner, the fifth storage record signal location F is represented by asterisks showing that the data bits and the check bits have been encoded into the five-bit storage code. It is understood that the full data segment shown as consisting of two groups of signals actually appears on the media as a continuous recorded signal such as shown in FIG. 4.

The error detection and correction code used with the data seqments as represented by the check bits C may be that disclosed by Bossen in U.S. Pat. No. 3,629,824, with the check bits referred to therein geometrically arranged as shown in FIG. 5. Check bytes C1 and C2 of Bossen's code have 16 bits recorded in bit positions marked "C" along track 8 and byte C. Alternatively, of course, any geometric arrangement may be provided; however, for compatibility with phase-encoded recording, as will be discussed later, the illustrated geometric arrangement is preferred. Of course, other error detection and correction codes and geometric arrangements may be used with equal facility. It should also be noted that the encoding of data bits with check bits into run-length limited codes, as shown by Irwin '637, is also suggested by Hinz, Jr., in U.S. Pat. No. 3,639,900.

Next, in FIG. 6, the composition of the residual signal groups R1 and R2 is explained. The number of residual data bytes may vary from 0 through 6. If the last full data segment as detected in step 12 completes the recording of data signals, then the end data signal group of all 1's is followed by a residual segment of all padding bits P, which are preferably all 0's. In such an instance, a residual count field in byte position 7 of the later-described CRC segment (FIG. 7) in track positions 0, 1, and 2 contains all 0's. Hence, that count field in tracks 0, 1, and 2 always represents the number of data bytes contained in the residual segment. In the FIG. 6 illustration, two data bytes are shown as being recorded; hence, binary encoded 2 is contained in this count field. This count enables the later-described readback circuits to dispense with padding bytes 3–6. The second count field in byte position 7 is contained in tracks 3–7, has modulus 32, and is used in connection with the odd/even count referred to with respect to FIG. 1's step 14 and as will be more fully explained with respect to the reliable readback of data signals. Byte 7 of the residual contains check byte of Z's. This byte is based on a CRC code (CRC–2) generated in connection with transferring data bits in but one portion of the signal transferring operation as will become apparent. The other portions of the residual segment are as described with respect to the full data segment.

The check bit segment, or CRC segment, is shown in FIG. 7 using the same format as for FIGS. 5 and 6. The CRC byte generated while recording data segments, the marker groups, and the residual segment contains alternately an odd number of 1's or 0's in accordance with U.S. Pat. No. 3,508,194. The error detection and correction system for each record storage segment is applied to the check bit segment, as well as to the data and residual segments. The characteristics of this code are such that depending on the number of 1's in the CRC byte, i.e., whether it is odd or even in accordance with the odd or even number of segments, the number of CRC bytes recorded in the check bit segment will be odd or even. The characteristics of the segment code require that an odd number of 1's be present in each byte. Accordingly, byte 1 will be either all 0's, plus parity in track 8, or be a CRC–1 byte, whichever is appropriate to make the CRC byte contain an odd number of 1's. Accordingly, the CRC byte, if there is an even number of bytes including byte 1 of the check bit segment, will have an odd number of 1's. However, if the CRC byte contains an odd number of 1's, based upon the generation in connection with the data segments, the all-1's end data mark group, and the residual segment, then bytes 1–6 will be all CRC bytes.

To determine the number of CRC bytes in the check bit segment and to determine the validity of data readback in the backward direction, the count field referred to in the residual segment is recorded in byte 7 of the CRC segment. The check bit byte C contains bits generated in accordance with the above-referred-to Bossen patent for other systems, checking the CRC bytes plus bytes 1 and 7. Track 8, the usual parity track or vertical redundancy check track, will have the proper parity in the CRC–1 bytes whenever an odd number of 1's is in each byte. Accordingly, the check bit segment is correct from an error detection and correction view. If an error occurs in the readback of the check bit segment, the powerful code described by Bossen corrects the CRC1 bytes for more reliably detecting errors in the data and residual segments. Notice this action occurs for reading in either the forward or backward direction.

Having the count field in byte 7 enables the readback circuits to determine the number of CRC–1 bytes in the check bit segment and, hence, more validly and reliably receive the CRC–1 bytes. In the illustrated embodiment, the CRC–1 bytes are not used to point to tracks in error because the Bossen patented code can correct two tracks in error with pointers, as described by Hinz, Jr., in his patent, supra. The CRC–1 bytes verify that the low probability of the Bossen code not detecting an error or miscorrecting an error in the respective segments does not go undetected. This is an important feature of the format for ensuring data integrity

ILLUSTRATIVE EMBODIMENT OF THE INVENTION

Referring next to FIG. 8, an I/O system for a magnetic tape recorder is shown in simplified diagrammatic form, some connections have been omitted for purposes of clarity. Such connections are ascertainable from the description of related figures. It is under control of microprocessor 38 constructed in accordance with Irwin U.S. Pat. No. 3,654,617. Additionally, other known circuits 39 in FIG. 8 are employed for sequencing controller operation in close coordination with microprocessor 38. Circuits 39 perform supervisory functions as described in the Irwin Patent '617. Data is received from and supplied to a data channel or CPU via cables 40, as well as control signals between circuits 39 or microprocessor 38 as more fully described in the Irwin Patent '617, as well as in the Moyer U.S. Pat. No. 3,303,476 and as widely used by International Business Machines in their data processing systems. A scan-in/scan-out (scan) buffer 41 provides communication between cables 40 and main buffer 43 as sequenced by buffer controls 42. The operational arrangement here is not pertinent to the practice of the present invention; however, it is described in detail later for illustrating how the invention can be practiced within a data processing system.

Main buffer 43 preferably has a capacity of about 32 bytes. It is basically a read-in/read-out count-controlled buffer wherein the modulus of the count of a later-described readout counter (CROC) associated with main buffer 43 forms one of the residual counts for odd/even checks. Main buffer 43 not only transfers signals to be recorded from scan buffer 41 through gating logic 44 to group buffer 45 for recording, but also receives data from read circuits 63 to be transferred over cables 40 to a connected CPU. Write control circuits 46 are supervised by microprocessor 38 and circuits 39 to generate the format on media 25 as shown in FIG. 2. FIGS. 9, 10, and 11 detail this recording operation. Write error circuits 47 respond to signals received through gating logic 44 and the write control circuits 46 to generate error correction bits as shown in FIGS. 5–7 and as detailed in the Bossen patent, supra. Additionally, CRC–1 and CRC–2 check bytes are generated, as described with respect to FIG. 19. Four register group buffers 45 and 48 each receive groups of four bytes of data (Group A), or three bytes of data plus a check bit byte (Group B), each byte including an error detecting bit. These group buffers supply the four bytes in byte groups in parallel form to encoder-gating (EG) circuit 49. The encoding portions of circuit 49 are constructed in accordance with the Irwin Patent '637 for converting the four bytes of data into five-bit storage code group values, each code group value lying along one of several tracks on media 25. EG 49 gates signals in a known manner for supplying serially arranged signals to recording circuits 50. Circuits 50 include the usual amplifiers and write compensation techniques, such as shown in Ambrico U.S. Pat. No. 3,503,059, and supply recording signals to transducer assembly or head 51 for recording such signals in tracks along media 25.

For reproducing signals previously recorded on media 25, detectors 56 receive signals from head 51. Detectors 56 include the amplifiers and read compensation, as found in known digital data readback systems. Additionally, detectors 56 generate quality of readback signals as set forth in the Hinz, Jr. patent, supra, and supply same over cable 58 to deskewing apparatus 57, synchronously with data signals supplied over cable 59. Deskew apparatus 57 is preferably constructed in accordance with U.S. Pat. No. 3,623,004 with accommodations being made for the record segment format of the present invention. For example, deskew apparatus 57 may include 32 registers for accommodating about three segments of storage coded signals.

Deskew apparatus 57 supplies signals on a byte-by-byte basis to decode 60, constructed in accordance with U.S. Pat. No. 3,624,637. Quality signals are supplied directly to read circuits 63 as shown in FIG. 12. Decode 60 supplies the decoded signals of four data bytes, or three data bytes plus a check bit byte, to read circuits 63 where they are combined with the quality signals for error detection and correction purposes as detailed in FIG. 16. In the event of an improper five-bit code group being received, decode 60 also supplies a corresponding quality-indicating signal referred to as a pointer. Additionally, format circuits 61 respond to the format groups, mark 1, and mark 2 for starting and stopping data signal transfers and the all-1's byte in five successive bytes to indicate end of data in a record. Circuits 61 supply such detected signal permutations to other circuits 39 and to microprocessor 38 for their supervisory action, as will become more apparent.

Read circuits 63 pass correct data signals in repeated bursts of seven bytes to main buffer 43 for retransmission over cable 40 to a connected CPU (not shown).

The special marker signals, such as M1, M2, and the all-1's byte can be generated in write control circuits 46 (or microprocessor 38) and supplied to encoder and gating circuits 49 over cable 55. In the alternative, they may be supplied through gating logic 44 for encoding in five lengths of five-bit run-length limited code groups. It is preferred that microprocessor 38 generate such special signal groups using known computing techniques and supplying same to circuits 50. The techniques described in the Edstrom et al. article "Program Generated Recording", IBM TECHNICAL DISCLOSURE BULLETIN, November 1971, Pages 1821 and 1822, are preferred to be used in this regard.

A RECORDING OPERATION

Referring next to FIGS. 9, 10, and 11, the detailed operation is described for generating the FIG. 2 illustrated record format. All CPU-initiated operations in the illustrated system, including write (record signals on tape) and read (readback or recover signals previously recorded on tape) are initiated by a CCW (channel control word) in accordance with the Moyer et al. patent, supra, plus Beausoleil et al. U.S. Pat. Nos. 3,336,582 and 3,411,143 and CCW's as shown by King et al. in U.S. Pat. No. 3,550,133. In response to such CCW generated command, other circuits 39 supply a start-write signal over line 64 setting write-1 latch 70. The start-write signal is generated in accordance with the Irwin Patent '534. Write-1 latch 70 actuates preamble/postamble marker generator 71 to generate, through its own sequence controls, the preamble consisting of the P1, P2, P3, and M1 groups. Such preamble generation is shown generally in FIG. 7 of the Irwin Patent '534. Generator 71 differs from the Irwin system to accommodate the different format of preamble, but is well within the scope of one of ordinary skill. In the preferred form, generator 71 is a program of instructions in microprocessor 38 with the signal connections of FIG. 9 being made as taught in Irwin Patent '617, FIG. 37. The preamble signals are supplied successively in byte form over cable 55 through gating circuits 49, thence recording circuits 50. The write-1 signal from latch 70 enables gates (not shown) in logic 44 to pass the cable 55 signals. Upon completion of the preamble, an end-of-preamble signal travelling over line 72 resets latch 70 and stops generator 71, closes cable 55 gates in logic 44 (via cable 85), and simultaneously sets write-data latch 73. Latch 73 then supplies enable write-data signal over line 98 to the data flow portions including buffer logic 42, main buffer 43, gating logic 44, etc., enabling transfer of data signals previously loaded into main buffer 43 (as described with respect to FIG. 17) for generating successive groups of data signals to be recorded on media 25. In preparation for recording upon cessation of the actual preamble signals being supplied over cable 55, the end-of-preamble signal on line 72 continues during generation of marker group M1 such that an appropriate number of signals are transferred from main buffer 43 through gating logic 44 into group buffer 45 to be encoded by circuits 49.

Write clock 74 synchronizes preamble generation and data recording by a pair of timing counter and pulse distributor counters GC (Grey counter) 75 and BIN (binary counter) 76. Clock 74 is enabled via OR 78 by write-1 latch 70, write-data latch 73, write-3 latch 160, or write resync latch 96, to supply write timing pulses over line 77 to all circuits, including generator 71, GC 75, and BIN 76.

The timing afforded by counters 75, 76 is first described with respect to generating the last full data segment of a record. Referring now to FIG. 10, in each data segment the periods during which data bytes are transferred from main buffer 43 to group buffers 45, 48 are enumerated from 1 to 7 with an ECC or check bit byte being transferred to buffer 45 from write error circuits 37 during byte period 8. From the group buffers, bytes 1–8 are encoded by encoder 49. The timing of EG circuits 49 and recording circuits 50 is not detailed in this description, such timing being well within one of ordinary skill.

Each byte period has two parts, part one during which the byte is actually transferred and part two, a command portion, during which register selection and command decoding occur. The parts one are represented by odd counts from GC 75 (GC–1 through GC–7, odd only) and the parts two by the even counts from GC 75 (GC–0 through GC–6, even only). One group of four bytes is transferred during each cycle of GC 75. BIN 76 determines which group in a data segment is being transferred, i.e., Group A consisting of four data bytes and first transferred or Group B consisting of three data bytes plus an ECC byte.

The timing relationships between GC 75, BIN 76, and the byte position in the data segments are shown in the table below, as well as in FIGS. 10 and 11.

| GC 75 Count | 0 | 1 | 2 | 3 | 4 | 5 | 6 | 7 |
|---|---|---|---|---|---|---|---|---|
| Group A Bytes | — | 1 | — | 2 | — | 3 | — | 4 |
| Group B Bytes | — | 5 | — | 6 | — | 7 | — | C |

Byte transfers are in odd GC counts, commands are in immediately lower even-numbered GC counts, and commands for GC=1 are in GC–0; for GC=5 in GC–4, etc. Byte 7 in check bit segment is the residual count byte.

In FIG. 10, BIN–4 and BIN–$\overline{4}$ represent the Groups A and B selection during each data, residual, or ECC segment. During format group generation, write clock 74 (FIG. 9) is inactive leaving BIN 76 at all 0's, such as during the END DATA group in FIG. 10. Accordingly, throughout the present embodiment, all format groups are treated as Group A's, even though successive format groups occur.

In data transfers, for example, in byte period 1, a byte is transferred into group buffer 45, position 1. In the first half of byte period 2 (GC=3), a second byte is transferred into group buffer 45, byte position 2, etc., through byte position 4. This action loads Group A signals into buffer 45 and simultaneously supplies the data signals to later-described write error circuits 47 to generate the ECC or check bits. Buffer 45 then being filled transfers such signals to buffer 48 awaiting calculation of the check byte C. Simultaneously with the translation of the first four bytes of the segment, data bytes 5, 6, and 7 are transferred into group buffer 45 and byte 8 from write error circuits 47 in a similar manner. AND 93 supplies the gate-data signal to logic 44, as will become apparent. Byte 5 is transferred into buffer 45 position (not shown) 1, byte 6 into 2, byte 7 into 3, and byte 8, the error correction byte from circuits 47, is transferred into buffer position 4, while the track-8 bit positions were filled by circuits 47 in group buffer 48 substantially simultaneously with data transfers as will become apparent. One data segment is now ready to be recorded.

The GC–0 pulse on line 83 signifies the end of a group and steps segment counter 84 in the same manner that a byte counter was incremented in Irwin Patent '534, see FIG. 6 of that patent. The tally in counter 84 indicates the number of data groups transferred through buffers 45 and 48 or twice the number of data segments transferred for recording. Since GC 75 is not active during format groups, counter 84 tallies only data, residual, and check bit signal groups. GC 75 supplies the gating logic 44 control signals over cable 85 to commutate main buffer 43 supplied data bytes to buffer 45 byte positions. Such commutation of data signals is so well known it will not be further described.

Binary counter (BIN) 76 is a three-bit counter counting bytes 1–8 of each data, residual, and ECC segment. It is inactive during format group generation. During data segment generation, the most significant digit, 4, indicates the Group A (BIN–$\overline{4}$) and Group B (BIN–4) data transfers as best seen in FIG. 10. For each byte 8, the BIN–4 and GC–6 signals combine to degate data transfer and enable ECC byte transfer. In this regard, AND 88 is jointly responsive to GC–6 signal 89 and BIN–4 signal (see signal tie lines in FIG. 10) to set ECC latch 91 (latch=LTH). ECC LTH 91 being set, supplies a gate-ECC signal over line 92 to circuits 47 and gating logic 44 for transferring the circuits 47 generated ECC byte into group buffer 45, byte position 4, during byte period 8 of each data, residual, and ECC segment. Simultaneously, ECC latch being set, disables AND circuit 93, inhibiting data transfer between main buffer 43 and group buffer 45. The gate-data signal from AND circuit 93, as seen in FIG. 10, results from not-end LTH, not-ECC LTH, not-residual LTH, not-CRC–1 LTH, not-resync, not-format (generator 71), and not-CRC–2 LTH to gate data. Advantages of this "negative" approach to gating data will become apparent from a continued reading.

ECC LTH 91 set and GC–7 pulse are combined in write error circuits 47 to transfer the ECC byte to buffer 45. This action occurs during the first half (GC–7 and BIN–4) of byte period 8 after being commanded during the second half of byte period 7 (GC–6 and BIN 4). Upon ECC byte transfer, the error circuits are reset during both recording and readback. A reset signal on line 105 resets ECC circuits at the end of each data or record segment. The ECC latch signal on line 92 sets ECC RESET LTH 94. Then, AND circuit 99 responds to ECC LTH 91 being reset by BIN–$\overline{4}$ (a new record segment is starting) to reset circuits 63. The beginning of the next segment (GC–1) resets ECC RST LTH 94.

The above-described operation is repeated for each data segment being transferred from cable 40 to media 25. Segment counter 84 tallies the number of segments generated by dividing the number of GC–8 pulses on line 83 by two. Upon reaching a predetermined number of segments, in accordance with Irwin Patent '534, the resync burst should be written. This resync burst can be generated by preamble/postamble generator 71 as shown in FIG. 7 of Irwin '534. Upon detection of a predetermined number of segments having been recorded, counter 84 supplies a resync pulse over line 95 setting write-resync latch 96. This action turns off AND 93 (drops gate data) and enables clock 74, as well as initiating operation of generator 71 to generate a resync pattern in accordance with Irwin '534. Upon completion of the resync pattern, that is, during the generation of marker group M1 as described for the preamble marker M1, preamble generator 71 supplies an end-of-resync pulse over line 97 resetting write-resync latch 96 and again setting write-data latch 73. The end-of-resync pulse is generated in the same manner of the K=34 as shown in FIG. 7 of Irwin '534.

The next group of record segments is then recorded as above described. The write-data enable signal is not only supplied to clock 74, but also to other portions of the data flow over line 98 and also enables segment counter 84 to again count the number of record segments being recorded. The above procedure may be repeated several times during each record, once or not at all if the number of segments does not exceed the predetermined number.

A command out (CMDO) channel command (see Moyer et al., supra) received over cable 40 (FIG. 8) from the controlling CPU instructs microprocessor 38 and circuits 39 to set a stop-data-transfer LTH (not shown) for terminating the data recording operation. Other circuits 39 supply the stop-data-transfer signal 101 (FIG. 10) over line 100 to condition AND circuit 102 for ending the record. AND 102 is responsive to a later-described end-segment signal received over line 103 from buffer control 42, end segment signal on line 104 and signal 101 to actuate generator 71 to generate all 1's end-data signal group (FIG. 2). AND 108 combines GC–8 on line 83 and BIN–4 signal to generate end segment signal for effecting the action during the last command period of a data segment and when there are less than seven data bytes or less than a full data segment to be recorded in main buffer 43 (indicated by line 103 signal). Generator 71 then supplies one group of all 1's over cable 55 for recording. AND circuit 102, when activated (see FIG. 10, end-data signal), also resets write-data latch 73. At this time, clock 74 is disabled preventing further data transfers through gating logic 44. Gate data AND 93 remains enabled until the last data byte has been transferred from main buffer 43 to group buffers 45, 58, i.e., when CRIC=CROC (later described.) Upon completion of recording the all-1's marker group 28, generator 71 sets write-data latch 73 by a setting signal supplied over line 110. End-up pulse is supplied over line 161 to microprocessor 38 and other portions as will become apparent. This pulse signifies that the terminator portion, i.e., residual and ECC segments, plus postamble, is to be recorded and processor 38 should prepare to terminate the recording operation as described in Irwin, supra.

The last full data segment is indicated from the buffer 43 controls by CRIC and CROC having a count difference of less than seven, as at 111 in FIG. 10. This signal is received by AND 102 (FIG. 9) over line 103 from buffer controls as shown in FIG. 17. In the present illustration, the residual count is two (binary 010). AND 102 generates end-write-data signal (FIG. 10) during the last half of byte period 8 of the last full data segment as shown in FIGS. 9 and 10. End-write-data actuates generator 71 to generate the end-data group (FIG. 10) of all 1's in all tracks and simultaneously resets write-data latch 73. This, of course, turns write clock 74 off during generation of end-data group.

Upon generating end-data group, generator 71 supplies an actuating signal over line 110 setting write-data latch 73 for generating the residual and ECC segments as shown jointly by FIGS. 9 and 11.

The first portion of the residual segment is generated as a data transfer as described for full data segments. In the illustration, there are two data bytes to be recorded; hence, the first portion consists of byte periods 1 and 2. Data bytes from main buffer 43 are transferred into group buffer 45, byte 1 and 2 digit positions. After transferring the second byte during the first portion of the second byte period of the residual segment, AND circuit 113 responds to CRIC=CROC (buffer 45 is empty) (line 106 signal), to the stop-data-transfer signal 100, the write mode RLL signal (not shown) received from processor 38 and read buffer cycle signal from buffer controls 42 to set end latch 114. End latch 114 being set signifies that all data received over cable 40 has been transferred into buffer 45. Being set, it degates data AND circuit 93. End latch 114 becoming active also captures the image in binary counter 85 in register 119 for later use as part of the residual count byte. This register also retains the image of CROC at the time the last byte is transferred out of main buffer 43. Register 119 includes special decoding circuits (not shown) correcting an all-1's condition to all 0's. In the event there are no data bytes in the residual data segment, register 119 contains all 1's reflecting transfer of the check bit byte C. It is desired to have the count 0–6, hence, the all 1's is converted to all 0's representing no data bytes in the residual segment.

AND 113 is not timed by GC 75 because the number of residual data bytes after the last full data segment varies from 0–6. Hence, end latch 114 can be set, depending on the number of residual bytes any time from bit period 8 of the last data segment (residual count=0 ) until byte period 6 of the residual segment (residual count=6).

Returning to the illustration of two residual bytes, byte positions 3–6 should now be filled with padding signals, preferably all 0's. To this end, AND circuit 115 generates a gate-pad signal 120 (FIG. 11) for transferring 0's through AND circuit 116 to the GC 75 designated byte registers in group buffer 45. Padding signals are gated whenever no other gating signal is active. That is, AND circuit 115 is jointly responsive to end latch 114 being set to the active condition and the other gating latches 118, 126, 117, and 91 being inactive to gate pad signals. Latches 126, 117, and 91 are gating controls for gating error correction and CRC digits while residual latch 118 gates the residual counts. This automatic pad gating simplifies logic of operation. In FIG. 11, gate-pad signal 120 extends from the middle of byte period 2 to the middle of byte period 6 transferring four bytes of padding signals. This signal is shown twice, respectively, for odd-even data byte counts as will be explained with respect to the check bit segment. Also, gate-pad signal may vary from zero to six in accordance with the number of residual bytes varying from six to zero.

Group B of the residual data segment is transferred by AND circuit 124 setting residual-count latch 118 and CRC–2 latch 126 via AND circuit 128. End latch 114 signifies to AND 124 that the record recording operation is terminating or ending, i.e., the residual or check bit segment is to be generated. Residual-count latch 118 immediately sets had-residual-count latch 135 as a memory during the subsequent ending operations indicating residual counts have been established. Latches 114 and 135 remain set until TAPE OP condition is received over line 138 from microprocessor 38 in accordance with U.S. Pat. No. 3,654,617.

Buffer 45, for the residual segment, receives the CRC–2 check byte during byte period 6. CRC–2 latch 126 is set only when had-residual-count latch 135 is reset with AND 124 supplying its output signal to AND 128. AND 124 will supply a second output signal for the check bit segment which is blocked by AND 128. The CRC–2 check byte, generated as later described, is transferred to buffer 45 by the gate-CRC–2 signal (FIG. 11) from AND 127. AND 127 is activated as shown in FIG. 11 for transferring CRC–2 to register 3 of buffer 45. AND 127 is degated when ECC latch 91 is activated by AND 88. Latch 91 initiates transfer of the ECC check byte as previously mentioned and as detailed later. AND circuit 121 responds to the CRC–2 latch 126 being set to prevent transfer of the residual count (RCT). During the check bit segment transfer, CRC–2 latch 126 is reset permitting such transfer. In those systems not employing CRC–2, the residual count could be recorded in place of the CRC–2 check byte.

At the completion of the residual segment transfer, the binary counter 76 $\overline{4}$ signal resets residualcount latch 118, CRC–2 latch 126, and ECC latch 91 preparing those circuits for generating the check bit segment.

Returning now to residual-count latch 118, AND circuit 124 sets residual-count latch 116 to the active condition for both the residual and check bit segments in accordance with the joint action indicated by FIG. 10 tie lines. AND circuit 124 is activated when binary counter 76 is in the 4 state, GC 75 being in the GC–4 state as indicated by a signal on line 125, and end latch 114 being set. Residual-count latch 118 remains set until reset at the segment ends by the $\overline{4}$ signal of counter 76 on line 130.

Check bit segments are generated in one of two manners, depending upon whether the number of segments recorded through the residual segment is odd or even. In the event the number of segments is odd, that is, the CRC check byte will contain an even number of 1's, an extra byte of padding signals is inserted in byte position 1 of the check bit segment. The CRC bytes are then recorded in byte positions 2–6. The residual count field is loaded into byte position 7, and the ECC check byte is loaded into byte position 8. When the number of segments is even, the CRC–1 bytes are loaded into position 1–6.

Control of the contents of check bit segment byte position 1 is first described when the CRC–1 byte has an odd number of 1's based upon the signals recorded up through residual segment byte position 8. Odd/even-count-totals signal 139 is active during the residual segment indicating that the count is odd. Upon generation of the check bit segment, the count is even requiring a CRC–1 byte having an odd number of 1's in accordance with the above-referenced Sellers, Jr., patent. To this end, AO (AND-OR) circuit 133, A2 portion, is jointly responsive to GC–0 signal on line 83 and the odd/even-indicator signal (active when odd) on line 134 to activate AND circuit A3. A3 is jointly responsive to the just-decoded signal, plus the had-residual-count latch 135 being active to set CRC–1 latch 117. In FIG. 11, signal tie-in shows this AND function action. CRC latch 117 being set enables AND circuit 136 to generate the gate-CRC–1 signal on line 137 gating CRC–1 bytes from circuits 47 through gating logic 44 to group buffer 45 in positions 1–6 of the check bit segment. AND circuit 136 also receives additional inputs from the not-residual-count signal of latch 116 and the not-ECC-latch signal from latch 91.

In the event the CRC–1 byte would have an even number of 1's at the end of the residual segment, a padding byte of signals is incorporated in byte position 1. This makes the number of 1's in the CRC–1 byte odd as required by the ECC used for each segment. In the padding byte, the parity bit position will be a binary 1, i.e., track 8. In this case, odd/even signal 139A is inactive during the residual segment and becomes active upon the onset of the check bit segment. CRC latch 117 is then set in the second portion, i.e., GC–2 portion of byte position 1, as indicated by the FIG. 11 AND function signal tie together 140. To accomplish this action, AND circuit portion A1 of AO 133 is jointly responsive to GC–2 signal on line 141 and the O–E (exclusive OR) exclusive OR circuit 142 output signal 134 to set the CRC–1 latch 117 to the active condition. O–E 142 receives CROC–$2^0$ signal (MOD 32 count) and BIN–$2^0$ signal determining whether the number of data segments is odd or even. The gate-pad signal (FIG. 11) from AND circuit 115 gates all 0's to the buffer 45 position 1. AND 115 is deactivated by CRC latch 117 becoming active at time GC–2. Subsequent to the padding byte being transferred during check bit segment byte position 1, the FIG. 9 illustrated circuitry repetitively supplies the CRC bytes in byte positions 2, 3, 4, 5, and 6. During the second half portion of byte position 6 (GC=4), the gate-CRC–1 signal for either the odd and even number of bytes, is deactivated by residual-count latch 118 being activated. The not-residual-count signal on line 150 becomes inactive deactivating AND 136. Residual-count latch 118 is set as previously described for the residual segment. Accordingly, during the second half of byte period 6, the residual count is gated as a portion of the check bit segment in byte period 7 by AND 121 signal on line 122. ECC latch 91 is again set to the active condition during byte period 7, aopreviously described for recording the ECC byte during byte period 8.

Upon transferring check bit segment byte 8, AND circuit 155 is jointly responsive to ECC latch 91 being set, end latch 114 being set, CRC–1 latch 117 being set, and end data segment signal on line 104 to generate the end-data signal over line 156 as indicated in FIG. 11. End-data signal on line 156 sets write-3 latch 160 and simultaneously resets write-data latch 73. Write-3 latch 160 supplies activating signals to clock 74 and generator 71 to generate postamble signals as described in the Irwin intrarecord resynchronization patent ('534). The postamble consists of the mark-2 signal group followed by the P3, P2', and P1' signal groups. Upon completion of the postamble, an end-up signal is supplied over line 161 resetting write-3 latch 160 and supplying the end-up signal to microprocessor 38 for entering a termination routine as described in the Irwin U.S. Pat. No. 3,654,617.

READBACK CIRCUITS

Referring now more particularly to FIG. 12, the general logic arrangement of the readback system is described with references being made particularly to other figures which detail the operation of certain portions of the readback circuits.

From transducer assembly or head 51, low-level signals are amplified by linear amplifiers 170, one for each of the nine tracks. The amplified signals received by gating circuits 171 are sensed for appropriate amplitude and then gated as hard-limited signals to time-sense circuits 172 and detector 56. The operation of circuits 171 and 172 is shown by Andresen et al. in U.S. Pat. No. 3,670,304. Detector 56 corresponds to data detector 28 of that referenced patent application and is controlled in a similar manner. In addition, detector 56 selects between NRZI, PE, and run-length limited (RLL) coded detection in accordance with microprogram signals YA, YB, received from microprocessor 38 in accordance with FIG. 7 of Irwin Patent '617. Detector 56 can be constructed in accordance with Vermeulen U.S. Pat. No. 3,548,327.

Detected 1's data is supplied over cable 58 to deskewing registers (SKB) 57. For each of the nine tracks, there is also a single line in cable 59 transferring pointer signals or quality signals to be deskewed in SKB 57 along with the data signals. Using the aforedescribed run-length limited coding, there will be five bit positions for each code group or value and a bit position for the quality signal associated with that code value as detected by detector 56. Such quality signals are those described by Hinz, Jr., U.S. Pat. No. 3,639,900 and also as described by Cannon in his article, "Enhanced Error Correction," supra. SKB 57 deskews the data and pointer bits as shown in U.S. Pat. No. 3,623,004 for self-clocking systems (PE and RLL) as well as for NRZI systems.

During the initial portion of reading a record from a magnetic tape, the preamble is first read and detected, but not forwarded through SKB 57. To detect that a preamble is coming to an end, gated step RIC circuit 175 is responsive to a string of 10 1's in any of the tracks to initiate SKB 57 operation. Detected M1 markers are inserted in the respective deskewing buffers for use by format circuits 61.

SKB 57 cooperates with skew detector 178 to detect excessive skew as defined and taught by Morphet U.S. Pat. No. 3,154,762 and as reference in FIG. 14. The Morphet teaching applies to phase-encoded readback and to RLL readback. Upon detection of excessive skew, detector 178 supplies sense data over cable 179 to MPUY in accordance with Irwin '617. Additionally, excessive skew signals are supplied over cable 180 to deadtrack control 181 for initiating deadtracking as shown in FIG. 14 and as generally taught by Miller U.S. Pat. No. 3,262,097. Deadtrack control 181 supplies deadtrack signals to circuits 175 to block transfer of data signals read from a deadtrack. Examination of FIG. 14 will show that skew detector 178 also supplies almost-excessive-skew signals in connection with error correction and detection as will be explained later.

SKB 57 deskews the RLL and PE data in accordance with known deskewing techniques. When one byte of data bits has been assembled in each of the nine tracks, a readout cycle is initiated in SKB 57. A first set of buffers, group buffer 1, GB–1 185, receives one group (five bytes) of deskewed storage coded signals and associated quality signals, or hardware pointers, from SKB 57. Each time GB–1 185 is not full, it sends a request to sKB 57 for a transfer of one byte. SKB 57 automatically responds to fill GB–1 185 in accordance with known data signal transferring techniques. It should be noted that the transfers between SKB 57 and GB–1 are independent of all other transfers in the readback system. It only requires that GB–1 be empty and SKB 57 has assembled and deskewed one group of storage coded signals.

The storage coded signals are then converted from the RLL storage code format to four-bit data processing coded groups, which may include the check bits. GB–1, when full, supplies one group of signals from each of the nine tracks to decode 60. Decode 60 has one decoder for each of the nine tracks conveniently constructed in accordance with U.S. Pat. No. 3,624,637. Decode 60 has four group of outputs. First are the detected format markers, such as M1, M2, and all-1's, which are supplied over cable 187 to format circuits 61 as detailed later with respect to FIG. 13. Second cable 188 transfers signals indicating that an illegal RLL code value has been decoded. This nine signal path cable connects to format detector 61 and eventually provides error signal pointers to error correction circuits 63. The other two cables, 189 and 190 carry decoded data from either the RLL or PE recordings through single-byte buffer 191. The cable is selected in accordance with the control signals received over lines 192 from microprocessor 38. In the RLL mode, the decoded bytes are serially transferred through cable 189 as four byte signal groups.

The detected and decoded format groups result in control signals from control 61 as detailed in FIG. 13. The decoded data transferred through buffer 191 is then processed by error correction circuits 163 as detailed with respect to FIG. 16. For the present, buffer 191 supplies the decoded data on a byte-by-byte basis for each group to syndrome generator 195 which generates S1 and S2 error-indicating syndromes. ECC matrices 196 jointly respond to the S1 and S2 syndromes, plus the data and pointers from pointer circuits 197, to generate error-pointing patterns for ECC control 200. The decoded data from buffer 191 also is transferred through GB–2 201 and is stored there during the error detection and correction operations of syndrome generator 195, ECC matrices 196, and ECC control 200. Exclusive OR circuits 202, one circuit for each track, are jointly responsive to the error patterns from ECC control 200 and the data synchronously supplied from segment buffer 201 to supply correct data signals over cable 203 to ECC output byte buffer 204. Later-described sequence controls (FIG. 20) request seven consecutive write cycles from main buffer 43. At this time, GB–1 201 and ECC control serially and synchronously transfer seven bytes of error patterns and data signals through Exclusive OR's 202 register 204 to main buffer 43 as will be detailed later. These signals are also applied to CRC circuits shown in FIG. 19 and as represented in FIG. 12 by box 205.

Returning now to pointer circuits 197, these circuits receive pointer signals from segment buffer 201 over cable 306 which resulted from detector 56 operation, from the RLL error detector in circuits 61 over cable 206 which indicate an illegal code value, from ECC control 200 indicating that a particular track has been corrected, plus GB–1 185. Based upon these inputs, pointer circuits 197 generate categories of pointers useful in error detection and correction as well as in deadtrack control. Generally speaking, pointer circuits 197 establish hierarchies of quality or pointer signals which, when positively indicating an error, are supplied as such to ECC matrix 196. If an error condition persists, a persistent pointer is generated and supplied to dead-track control 181. In some instances, detector 56 generates pointer errors supplied over cable 59 and thence transferred to buffer 201. This may indicate a possible error condition with detector 56 correctly detecting the data. In such a case, pointer circuits 197 memorize that a pointer has been generated, such pointers are ignored by circuits 196, 200 until an error condition has been verified. This action is described in detail with respect to FIGS. 15 and 16.

Timing of the FIG. 12 illustrated circuits will be described in detail with respect to FIGS. 13–21, and particularly as shown in FIGS. 13A and 18. Readback operations include four types of cycles while processing signals. Each cycle consists of eight steps enumerated 0–7. Each step is divided into first and second portions, a first portion for transferring data signals and a second portion which sets up control circuits for operations in subsequent cycles. Outside of the cycles there are wait periods during which no synchronous signal processing operations occur with respect to buffers, error correction, and the like, even though recording and other readback circuits may be active at this time. Of the four cycles, two cycles (the A cycle and B cycle) transfer, respectively, groups of signals between buffers GB–1 and GB–2, the A cycle transferring Group A of each segment and the B cycle transferring Group B of each segment. Format groups are always transferred during an A cycle. The third cycle, the AB cycle, controls the operation of the error correction circuits shown in FIG. 16. If there are no errors in the data, cycle AB is omitted. If there is an uncorrectable error, the readback operation is stopped. The fourth cycle, ABC, transfers one segment of seven bytes of data signals from error correction circuits 63 over cable 203 to main buffer 43.

FORMAT CIRCUITS AND DECODING

Referring next to FIGS. 13 and 13A, decode 60 and format signal detection and controls are described. Decode 60 is constructed in monolithic logic arrays 220, which not only supply the data output signals respectively over lines 189–0 through —8 and lines 190–0 through —8, respectively corresponding to cables 189 and 190 of FIG. 12, but also includes circuitry for detecting invalid RLL code groups as indicated over cable 221, enumerated as cable 206 in FIGS. 12 and 15, and format code groups over cable 222. Detection of the data bits for the RLL code groups is in accordance with the Irwin U.S. Pat. No. 3,624,637. Phase-encoded data bits are merely tranferred through decode 60 in accordance with known techniques or as later described. Detection of the invalid code value signals is merely a matrix decoder (AND, OR's) which supplies an output signal for all possible code permutations not used in accordance with the format or data code groups. The format values are decoded using known and/or logic matrix or array decoders in integrated circuit form.

The run-length limited coded data value signals (five signals per code value are supplied in parallel from the respective track registers in GB-1 over cables 224 to the respective arrays 220. Decoder circuits for the data are constructed in accordance with FIG. 3 of the Irwin patent '637 wherein five-bit code groups are read in parallel to the second code register. Outputs of the second code register (Irwin) are also supplied to the invalid code detectors, as well as to the format value code detectors. In the case of phase-encoded recording, this will be discussed later in the section entitled "Phase-Encoded Recording". The output of the four-bit code groups in the data processing code, after being decoded in accordance with the Irwin patent supra, is commutated in four steps; i.e., the data bits go in a byte-by-byte basis, one bit from each of the arrays 220, to error correction circuits 63 via buffer 191. The data is commutated byte-by-byte to the buffer 191 irrespective of the operation of the invalid code and format code detector operation. The invalid code value indicator signals travel over cable 221 to cable 206 of FIG. 15 to activate pointer circuits 197 as described later with respect to FIG. 15. The format code value signals go over cable 222 to voting circuits 226. Circuits 226 respond to a majority of the tracks, i.e., output signals from decode arrays 220, to indicate that a format value has been detected to supply a format indicating signal over line 227 to format controls 230. If all arrays 220 supply format value indicating signals, an "all format" signal travels over line 228 to controls 230.

Transfers of data signals to arrays 220 are initiated by a GB–1 full signal 231 (FIG. 13A) generated in accordance with the circuits shown in FIG. 17. This signal indicates that one group of RLL encoded data signals has been stored in GB–1. When signal 231 becomes active, GB–1 is full, the later-described A cycle is initiated by activating signal 232 as explained later. When signal 231 is inactive and no other operations are synchronously proceeding as will be later described, the timing control shown in FIG. 20 is in a wait or inactive mode. As soon as signal 231 becomes active, A cycle is initiated producing timing pulses A0 through A7. The registers in GB–1 are connected via gating circuits within GB–1 (not shown) energizing cable 224 for driving arrays 220. All bit signals stored in GB–1 in the group consisting of five bytes of RLL encoded data are supplied simultaneously to decode 60, i.e., the group is decoded in a parallel manner for all tracks; and decoding occurs so long as signal 232 is active.

Commutation of the four bytes of decoded data signals is timed by signals received over cable 233 from the FIG. 20 illustrated circuits. Such commutation of output registers is shown in the first code output registers of FIG. 3 of the above-cited Irwin patent. Accordingly, RLL encoded data is supplied in five-byte sets to decode 60 and thence commutated byte-by-byte to error correction circuits 63.

The invalid code indicator signals on cable 221 (cable 206 of FIG. 15) and the format value code signals on cable 222 have the same duration as gating signal 232 (see FIG 17). Signals moving through cable 222 are interpreted by voting circuits 226 to enable format controls 230 to ascertain the type of format signal being received, as will be described in detail.

RLL format and error detector 223 not only detects the RLL format values by voting (6 of 8), but also detects an RLL error in the parity track, as well as parity error for phase-encoded readback signals. Since the procedure is handled different for the parity track than for the data track, circuitry is shown for detecting the RLL P-track error. OR circuit 234 passes the RLL error signal from decode track 8 (P track) array 220 to pointer circuits 197. Additionally, the format value signal on line 235 does not form a part of cable 222, but rather is supplied to AND gating circuit 236. AND 236 is selectivley activated to pass the RLL code value during periods A0 and A2 as shown by signals 237 of FIG. 13A. In this manner, there are two votes taken of the format values for the parity track as well as for the code values. OR circuit 238 passes the A0 and A2 timing pulses (from the FIG. 20 apparatus) to both AND 236 and voting circuits 226. Later-described format latches 1 and 2 in controls 230 are activated in subsequent respective cycle periods A1 and A3 for detecting the format groups.

RLL code-value parity error is also detected by the coaction of AO circuit 240 and EXCLUSIVE OR circuit 241, then supplied through OR 234 to pointer circuits 197. AO 240 and Exclusive OR 241 signal an RLL code-value error in P-track whenever line 235 supplies a format value through AND 236 to A2 portion of AO 240 and there is not a majority format-value signal on line 227.

Additionally, AO 240 is used in phase-encoded (PE) recording for detecting the all-0's format characters. In PE mode, data is inverted at this point in the data path so that the all-0's characters appear to the voting logic as all 1's. This detection is activated by the signal received over line 242 (processor 38 generates this signal) indicating PE signals are being read from the media transport. Simultaneously, voting circuits 226 having been modified by the PE signal over line 243 from processor 38 detect all ones to activate AO 240. EXCLUSIVE OR 241 output is degated at the pointer circuits during the PE mode. The operation in the phase-encoded mode is better understood with reference to the later description and FIG. 22.

The format mark groups are detected by format latches 1 and 2 of circuit 230. Outputs of AO 240 are time gated by timing signals A1 and A3 as represented in the set-format-1 latch and set-format-2 latch signals of FIG. 13A. In this regard, AND's 244 and 245 respectively set format latches (FMTLTH) 1 and 2. All format is detected by strobing the vote outputs twice. If either vote indicates format it is considered a format character.

| 1st Vote | 2nd Vote | Type |
|---|---|---|
| 0 | 0 | Not Format |
| 1 | 0 | Mark 1 |
| 0 | 1 | All 1's |
| 1 | 1 | Mark 2 |

It takes the same time for any value to be detected. It should be noted that the format latches are not set unless AO 240 satisfies the voting circuit 226 condition that a format signal is being detected.

In a similar manner, AND 247 responds to both FMTLTH 1 (Format Latch 1) being active and the A4 signal to indicate mark-2 format signal has been detected. The above action indicates that AO 240 is selectively active through the A cycle; that is, at time A1, AO 240 is active during the mark-1 and inactive during A3 time. Note that the A0 and A2 timing pulses passed by OR 238 also time operation of voting circuits 226. Such timing in a detector is well known and not further described.

The signals on cable 222 indicate what the respective format mark is from the respective decode arrays 220, i.e., whether mark-1, mark-2, or all-1's. Continuing, the all-1's group is detected by AND 248 and timing pulse A4 whenever FMTLTH 1 is reset and FMTLTH 2 is active. A format signal is indicated to processor 38 by OR circuit 250 passing signals from either FMTLTH 1 or FMTLTH 2 being activated, i.e., a format code value has been detected by voting circuits 226. Additionally, a format indicating signal travels over line 251 to AND 252 for resetting GB–1 full latch of FIG. 17. Timing pulse A3, conjunctively with GC–8 signal, activates AND 252 to generate this command signal. Similarly, A4 signal is passed by AND 253 for resetting timing control of FIG. 20 to the A condition to repeat an A group cycle. It should be remembered that each format group is independent of the segment organization of the record format. Hence, once a format code group has been detected, the next code group being processed by the readback circuits will be a group A set of signals.

Resynchronization in accordance with the Irwin U.S. Pat. No. 3,641,534 is also initiated by the format indicating signal on line 251. In this regard, the all-1's group signal generated by AND 248 sets the ones group latch 254 for enabling AND 255. AND 255 is jointly responsive to the ones group latch 254 being reset, mark-2 signal from AND 247, and the format indicating signal on line 251 to start resync operations as described in the above-mentioned Irwin patent. It should be noted that in the format, a mark-2 signal indicates the end of a set of data segments. The ones group marker detected through AND 248 followed by a mark-1 value indicates the END of the record in which is postamble is being encountered. Accordingly, ones group latch 254 is reset by tape op, i.e., a new read operation is being started and indicated by the signal on line 256, or the mark-1 group signal from AND 246.

At the end of the A cycle in which the format code value was detected and verified, FMTLTH 1 and FMTLTH 2 are reset by the A7 timing signal received over line 260 from the FIG. 20 illustrated apparatus. This action prepares format control 230 for the next A cycle which again may be a format code value. Note that the resync code groups are all-1's groups. Since they all come after a mark-2, the ones group latch being set blocks the start-resync signal on 257. The ones group resync pulses are handled by the resynchronization circuits (not shown), as shown in the Irwin Patent '534 in the same manner as the burst of ones for phase-encoded intrarecord resynchronization. The detection of resync burst suspends data transfer during the burst, but the FIG. 13 generated signal is not otherwise used in the performance of resync other than initiating deadtracking operations. The FIG. 13 illustrated circuits are not involved beyond the detection of the all-1's groups.

The above-described operations of FIG. 13 are for reading in the forward direction. If the magnetic media system or the signal transmissions always transfer the code groups in the same orientation with respect to time, no additional decoding is required. However, in many magnetic media systems, it is desirable to read both in the forward and backward direction. In this regard, decoder 60 consisting of arrays 220 must have a first set of decode circuits for detecting the code groups in the forward direction and a second set of decode circuits for detecting in the reverse direction. In this regard, the forward signals on line 261 received from processor 38 select a first set of decoders in arrays 220 for decoding the code groups in the forward direction of media motion and a second set of detectors for decoding code groups received when the media is transported in the reverse direction. Output signals from the decode arrays 220 are the same in either direction of relative media motion in the respective transducers.

SKEW DETECTION

Having described transfer of data signals from SKB 57 to ECC 63, the generation of some of the pointers in skew detector 178 and deadtrack initiation by deadtrack control 181 is described. These circuits operate in the asynchronous portion of the readback system, that is, before synchronous transferring on a signal group basis from SKB 57. Accordingly, the four cycles of synchronous timing are not applicable to these circuits. Skew detector 178 is driven by SKB 57 RIC and ROC as described in the Morphet U.S. Pat. No. 3,154,762. Excessive skew is detected in accordance with that patent. In this regard, compare circuits 270, one for each track, compare the RIC and ROC counts of SKB 57 to detect excessive skew (EXC) for RLL readback as indiccated respectively on lines 271. This excessive skew is determined in accordance with the capability of SKB 57; for example, excessive skew may be defined as a skew of three groups of data signals—that is, the most leading track would be three groups of data signals ahead of the most-lagging track.

Similarly, lines 275 respectively carry excessive skew indication for readback of phase encoded (PE) signals which is also used during recording RLL to detect excessive write skew. That is, during read-after-write recording verification, comparators 270 monitor skew and supply a skew-check signal via OR 278 to microprocessor 38. Similarly, excessive RLL readback skew travels through OR 279 to microprocessor 38 as an RLL read skew-check signal. Also, lines 276 carry signals indicating excessive write skew for PE recording. The signals on line 276 also travel over cable 285 for deadtrack determination as will be described.

In envisioning the skew magnitudes involved, excessive RLL read skew (lines 271) may be three groups or 30 record frames or bytes. The marginal RLL readback skew may be at least 25–27 record frames. Lines 275 are activated during RLL recording when the associated RIC leads ROC (mostlagging RIC or readback signal) by 14 data frames. Similarly, lines 276 are activated during PE readback when the associated RIC leads ROC by four or more record frames. The latter number is selected to provide compatibility with the information interchange standard on phase-encoded recording. Based upon the above and following descriptions, it will be seen that the detected skew relationships are used to control errors during readback and recording in accordance with the record format of the media as well as the portion (synchronization or data) of the signal record currently being processed.

Additionally, there are two phases of skew detection. The first is during readback of a preamble or postamble and initial portion of data signal readback, and the second during data readback. The latter follows the Morphet patent teaching while also detailing almost-excessive skew for greater reliability, while the former is an added feature to the described system. These two phases are used during readback of data signals and during read-after-write to verify a proper recording operation.

In addition to detecting excessive skew, compare circuits 270 also detect and indicate marginal or almost-excessive skew. This indication is used both for resynchronization initiation and error correction, as will become apparent. In the illustrated embodiment, almost-excessive skew can be two groups of RLL encoded data between the most-leading track signal and the most-lagging track signal. When such almost-excessive skew exists between any RIC and ROC, an almost-excessive or marginal skew (MARG) travels over lines 272, respectively. These skew indicating signals are temporarily stored in register 273, one bit position being established respectively for each track's indication of excessive (one bit) and marginal (one bit) skew, respectively, to digit positions in register 273. During the first phase of operation, i.e., when the preamble or postamble portion of the record is being read, a continuous signal "not-first-RIC-stepped" from circuits 175 (later described) travels through OR 274 to maintain register 273 in a signal-receiving state. Register 273 may consist of a plurality of phase-hold latches, with the output signal from OR 274 enabling such phase-hold latches to receive signals. Removal of the signal causes the phase-hold latches to maintain the signal state until a new signal is being received, as is well known. In this manner, the output signals from compares 270 are continuously supplied through registers 273 for use by deadtrack controls 181, as will be described.

During the second phase of operation, i.e., during data readback, circuit 175 removes the not-first-RIC-stepped signal and turns control of register 273 to a control signal received from SKB 57. In this regard, 0each time any data readback channel supplies a signal to SKB 57 and that signal has been stored in the deskewing registers, SKB 57 supplies an "end-read-in cycles" signal through OR 274 to momentarily actuate register 273 to receive the output signals from compare circuits 270. Such signals are then maintained until the next signal is read into SKB 57. Accordingly, register 273 signal state is updated each time SKB 57 receives a new signal from any of the readback channels. Generation of the "end-read-in cycle" signal is not described as it forms no essential part of the present invention, and generation of such signals is well known in the art.

DEADTRACK CONTROLS — 181

Deadtrack controls 181 receive the skew information from detector 178, as well as gated pointer signals from circuit 197, to determine deadtracking operations within SKB 57 in fundamental accordance with the Miller U.S. Pat. No. 3,262,097. Controls 181 initiate deadtracking under any one of four conditions as represented by the input signals to the A1, A2, and A3 input AND portions of deadtrack latches (DTL) 283 (one for each track), plus A–O circuit 289. Phase one control of deadtracking depends from the skew of the readback signals during start-up operations, while the remaining conditions are determined during data signal readback. Additionally, limited deadtracking is selectively initiated for resynchronization operations independent of error conditions during data signal readback.

During phase one, deadtrack control DTL's 283 are selectively set by the DT (deadtrack) lag latch 284 or the DT lead latch 290. Phase one extends from detection of beginning of block (BOB) until beginning of data signal readback. During this phase, register 273 is continuously sending the marginal and excessive skew signals to deadtrack controls 181. OR 296 takes any one of the marginal skew signals to activate AND 295 for selectively setting either DT lead latch 290 or DT lag latch 284 in accordance with the analysis of skew by voting circuit 294. These latches then respectively gate deadtrack indicating signals to DTL's 283 in accordance with the then skew conditions indicated by comparators 270.

To set DTL's 283 for initiating deadtracking at the onset of data readback, a lagging condition of a few of the tracks as indicated by deadtrack lagging tracks latch 284 is set by the input A1 portion. This A1 portion combines the skew indication signals received over cable 285 from register 273 with the 6/8 track lead signal to activate latch 284. In this instance, DTL's 283 are respectively set by the skew indicators with a lagging condition (those RIC's having tallies closest to the then tally in ROC). The term 6/8 lead means that at least 6 of 8 tracks (excluding parity) are leading.

On the other hand, when voting circuit 294 indicates that 6 of the 8 tracks (excluding parity) are lagging—that is, there are either one or two extremely leading tracks—then the A1 portion of latch 290 responds to that signal, plus the output signal of AND 295. AND 295 signifies that the skew buffer readout counter has not cycled (still reading the preamble), and reading has not started. The active signal of latch 290 goes to A–O 289, as later described, to selectively set the deadtrack latches 283 corresponding to the most-leading tracks.

In the preferred form, latches 290 and 284 are sensed when the most-leading track has reached the 26th frame or byte from the data. That is, from the marker signal M1, the most-leading track has already read in 26bits of data. A marginal skew signal from any track passing through OR 296 when ROC has not cycled signifies that at least one track has been read to the 26th frame and yet at least one other track has not been read to the end-of-preamble marker signal.

During phase one, whenever readout counter of SKB 57 has stepped, i.e., a full group of data bytes, such as a Group A, has been assembled, a reset signal is supplied to the A2 portions of latches 284 and 290 resetting same. When both latches are reset, the reset signals are supplied through OR 299 to start the read check signal over line 300. The inversion of this signal is supplied as an input to AND 295 which gates the setting input to the two latches. Therefore, anytime the readout counter has cycled, i.e., a full group of data signals has been assembled, phase one skew checking terminates and no test is made. Such a condition shows successful readout from all tracks.

For phase one deadtrack initiation, the line 276 skew indicators are combined with the active output signals of latch 284. During the lead condition, the output signal of A–O 289, which is activated by the output signal of latch 290, is supplied to the A2 portion of all of the DTL's 283. This signal is combined with the gated pointer signals from circuits 197 to set the DTL's. A leading track in error can only be detected by combining the deadtrack leading track latch signal 290 with pointer signals from circuits 197. These pointer signals indicate marginal skew condition in the respective tracks. Accordingly, the pointer signals are not only used for error correction purposes, but also initially determining whether or not one of a given plurality of tracks that are leading or lagging in a deskewing relationship for determining whether or not that track may be in error and should be deadtracked.

During the data readback phase, DTL's 283 are selectively set either by the A2 or A3 input portions, the A2 portions, therefore, being used both during phase one and phase two. The A1 input portion of A–O 289, during the data readback portion, selectively receives the ROC cycled signals over line 298 from SKB 57. That is, each time a group of signals is read from SKB 57, skew conditions are tested. The output signal of OR 296 indicating marginal skew is gated by the ROC cycled signal through A–O 289 to partially activate all of the A2 input portions of DTL's 283. This signal is combined therein with the pointer signals received over cable 288 from pointer circuits 197. The A1 and A2 portions are used both during the RLL mode and the PE mode, during the initiation or the onset of data readback of any record on a magnetic media.

A3 portions of DTL's 283 initiate deadtracking during data readback in the PE mode of operation. These circuit portions are jointly responsive to signals from time sensor 172 indicating loss of signal envelope and the PE mode as indicated by processor 38 over line 291 to supply deadtrack initiating signals over cable 282 to SKB 57. Alternately, pointer signals on cable 288 may activate deadtracking in the PE mode.

Input portions A4 are the reset and hold portion. Each DTL 283 output maintains the latch in its activated state as is well known. Reset signals received over line 292 reset all DTL's 283 upon a resynchronization as effected by the intrarecord resynchronization patent by Irwin, supra, or upon the initiation of reading a record as indicated by processor 38.

Because of resynchronization capabilities of the readback system and the inhibition of deadtrack until excessive skew and a pointer signal on cable 288 indicating an extended error condition during readout, deadtracking is selectively initiated upon the onset of encountering a resynchronization pattern by the reading transducers. In this regard, AND circuits 302 respond to the start resync signal (see Irwin '534) on line 257 to pass persistent pointer signals traveling over cable 288 to OR circuits 281 for initiating limited deadtracking during the resynchronization portion for facilitating resynchronization of the respective readback circuits in accordance with the Irwin patent on intrarecord resynchronization, supra. During limited deadtracking, readback signals are processed through SKB 57; the controls shown in FIG. 14 are merely activated to enable resynchronization of such readback channel. This action ensures that a readback circuit almost reaching a deadtracking situation can be automatically readjusted to proper read-in into SKB 57 in accordance with the actual skew and adjusts its readback VFC (variable frequency clock) by the resynchronization burst as described in said patent. In this manner, deadtracking is delayed until the last possible moment when a marginally operating readback circuit starts to process resynchronization data. The deadtrack initiation makes the VFC of that track more responsive to the resynchronization signal thereby enhancing the probability of the circuit automatically adjusting to the proper mode of operation during the resynchronization sets.

SKB CONTROL

SKB 57 operation is initiated in the gated step RIC circuit 175 (FIG. 14A). Outputs signals from detector 56 supplied to gate-RIC circuits 301 over the 1's line are timed by the detector 56 generated clock signals (not shown) over the clock line to increment the ten-1's counter in each of the respective circuits 301. There is one such circuit for each of the respective readback circuits associated with the various tracks on the media. Each preamble and postamble, as well as resync patterns as previously described, include ten 1's in a row. The ten-1's counter in the respective circuits detects that a mark-1 (read backward) or mark-2 (read forward) signal is about to be detected. If, during a clock time, a 0 is supplied, the ten-1's counter is reset ensuring that only ten successive 1's cause it to overflow to set the ten-1's latch in the respective circuits. Each of the circuits 301 operate in accordance with the readback signal frequency in the respective track. Accordingly, the ten-1's latch in the respective circuits 301 may be set at differing times. Upon being set, each of the respective ten-1's latches supply an activating signal to its respective AND circuit 303 for stepping the RIC (read-in counter) of SKB 57 (for convenience shown as being a part of each of the circuits 301). The ten-1's latch also supplies the activating signal through OR circuit 304 to set first-RIC-step latch 302; that is, the first ten-1's latch in any of the circuits 301 becoming active sets the first-RIC-step latch 302. This latch being set supplies an activating signal through OR circuit 274 to enable register 273 to start receiving the output of comparators 270, as previously described.

AND 303 passes clock pulses derived from the readback signal in a known manner by detector 56 to step each respective RIC for transferring signals into SKB 57 as has previously been referred to. Additionally, the output signals of OR's 281 are inverted and supplied to AND 303 for indicating that the respective track is not being deadtracked. Accordingly, when the respective OR's 281 are supplying a deadtrack indicating signal, the respective AND 303 is disabled preventing the respective RIC from stepping signals into SKB 57. Accordingly, the deadtrack signals are also supplied from cable 282 to SKB 57 to set the readout counter (ROC) to step independent of a given RIC being inactivated. Such deadtracking signal also enables readout from SKB 57 without the signals from a "deadtrack" as shown in Miller, supra.

Circuits 175 are reset each time a start I/O (SIO) signal is presented to the I/O controller by the CPU (not shown). Resetting the circuit merely requires that the first-RIC-step latch 302 and all of the ten-1's latches be reset. The ten-1's counters will be reset by any of the 0's being supplied by detector 56. In this regard, AND 301A is responsive to the not-1 signal and the clock signal to reset the ten-1's counter.

Upon a resynchronization burst being encountered, it will be recalled that a deadtrack may be forced by one of the AND's 302. In this regard, the respective OR 281 passes the deadtrack signal to disable AND 303 upon entering the resync burst. The ten-1's counter is responsive to ten 1's in a row in the middle of the resync burst to again set the ten-1's latch, which has previously been reset by the force deadtrack. Upon receipt from detector 56 in accordance with the Irwin Patent '534, AND 303 becomes enabled again to pass clock signals for again stepping the respective RIC for passing the mark-2 signals occurring at the end of the resynchronization pattern into SKB 57. Upon resync being established, the deadtrack latches 283 are reset by AND's 278 and as shown in the Irwin patent, supra.

During the PE mode, the 40 0's in the preamble or postamble are inserted to 1's to activate the ten-1's counter. Upon detection of the PE marker signal and the ten-1's count, the respective RIC's initiate counting. The apparatus for accomplishing this action has been omitted for brevity.

POINTER SIGNAL HANDLING

Pointers, that is, signals pointing to possible or actual error conditions, include quality-indicating signals. Such signals are generated preferably in accordance with the Hinz, Jr., U.S. Pat. No. 3,639,900. The present invention provides additional pointer signal handling functions which enhance error correction capabilities of the readback signal over and above that taught by Hinz, Jr. While the fundamental principles of the Hinz, Jr., patent have been retained for use with the present invention, the hierarchy of pointer signal handling and gating plus evaluation enhances error correction and control, as will become apparent.

The so-called hardware pointers are readback quality signals referred to by Hinz, Jr. These hardware pointers are generated in detector 56 (FIG. 12) and then supplied over cable 59 to SKB 57. SKB 57 deskews such quality or hardware pointer signals with the data signals received over cable 58. Whenever SKB 57 supplies a group of data signals to buffer 185, the corresponding pointer signals are also simultaneously supplied to a portion of the group buffer called pointers, one pointer bit position for each track corresponding to one group of data signals. These buffered pointer signals are supplied over cable 306 to the pointer portion of segment buffer 201 in error correction circuits 63, thence to pointer circuits over cable 305 as "hardware pointers".

This transfer bypasses the decode operation for the data signals in buffer 185. This action buffers the pointers with the two groups of data signals; that is, possible error conditions in both groups of signals are forwarded along with the corresponding group of data signals in accordance with the Hinz, Jr., teaching. Additionally, the cable 306 signals, in accordance with the Hinz, Jr., teaching that an error condition may be indicated by a low-quality signal after the error actually occurs, are termed "group hardware pointers". These are "look-ahead" pointers.

Referring now to FIG. 15, the "corresponding" hardware pointers in buffers 201 go over cable 305 to hardware pointer A–O's 307, one A–O for each track O–8. As shown, A–O's 307 are connected as a latch which holds the hardward pointers during the processing of one data segment. These latches are reset by timing signal ABC–7, when the corresponding pointer memory counters 309 have counted to zero (or any other reference count), as later described, to indicate prior conditions.

Upon being actuated, A–O latches 307 supply activating signals to correction pointer generator A–O circuits 310, one A–O per track. These circuits supply correction pointers to error correction circuits 63, shown in FIG. 16, over cable 311, one signal path in cable 311 for each of the tracks. The A1 portions of A–O's 310 pass the hardware pointer signals upon receipt of an activating signal over line 312 from error correction circuits 63. The signal on line 312 represents an error condition has been detected by the error correction circuits which require the utilization of pointers. This signal and its meaning will be fully described with respect to FIG. 16.

VAlid pointers (later described) are also gated to correction pointer bus 311 by the respective A2 portions of A–O's 310. A2 portions are activated during a read mode, and end of data (EOD) has not been received as indicated by the signal received over line 313 from microprocessor 38. Note that the valid pointers, i.e., pointers that indicate an error correction has been made corresponding to the pointer condition, are gated as correction pointers irrespective of the request for pointer signals from the error correction circuits.

Hinz, Jr., also teaches that error or low-signal quality conditions also precede the actual data error. To take advantage of this teaching, pointer memory counters 309 remember pointers for eight error-free record segments. This action generates "look-behind" the error pointers. Accordingly, in addition to the pointers from Group 1 buffers 185 (FIG. 12) being supplied to the pointer portion of Group 2 buffer 201, they are also supplied directly to pointer circuits 15 for controlling the pointer memory counters. In this regard, OR circuits 314 pass hardware pointer signals from cable 306 and valid pointer signals from A–O's 317 for resetting the pointer counters to an error-indicating condition. Such resetting action prevents A–O latches 307 from being reset thereby maintaining hardware pointers on a "look-behind" basis. Hence, A–O's 307 can receive the hardware pointers from segment buffer 201 corresponding to the data signals being processed in the error correction circuits 63 or the "look-ahead" pointers on cable 306. To the extent that two groups of signals are processed simultaneously (one segment), the pointer signals in buffer 201 are both "look-ahead" and "look-behind" pointers with respect to data signals in Groups A and B, respectively.

Valid pointers are stored in FIG. 15 illustrated circuits in the respective valid pointer latches (VPL) 316. Any of the latches being set respectively indicate that a pointer signal has corresponded to an actual error correction activity of circuit 63. In other words, the pointers have validly pointed to an actual error condition in which error correction was made or a code error was detected by format circuits 61. VPL's are set to the active condition by the action of A–O latches 317. The A1 portions of the respective A–O's 317 are activated when an error correction has been made by circuit 63 in the corresponding data bit position. ECC track correction signals received over cable 318, respectively, jointly activate the A1 portions when the corresponding data bit is transferred by ECC circuit 63 to data read buffer 204 as indicated by the ABC timing signal line 319. This action will be described in greater detail with respect to FIG. 16.

The A2 portions of A–O's 317 are jointly responsive to the RLL error signal received over cable 206 (FIGS. 12 and 13, same as cable 221) and to the RLL mode and not end of data (EOD) signal received over 313, as previously mentioned with respect to A–O's 310. From the above description, it is seen that the VPL's 316 are set to the active condition in response to any of the hardware or valid pointers supplied as correction pointers over cable 311 resulting in an actual error correction; or upon a "hard error" being indicated by an RLL invalid code character.

The A3 portions of A–O latches 317 are the latch-forming input. While processing each data segment, 9 each A–O latch 317 can be set once to supply a tally signal to persistent pointer counters 325. After the ABC cycle and before the next-occurring A cycle (FIG. 18), the GB–1 full signal 337 (FIG. 18) resets all A–O latches 317; all those latches are then ready to receive pointer signals.

Once a VPL 316 is activated, it will remain active until at least seven data segments have been processed. In this regard, pointer memory counters 309 being reset by a hardware pointer received over cable 306 or the VPL 316 setting signals (A–O 317) passing through OR's 314 maintain a memory of the pointer for a period of seven data segments even though the hardware or RLL pointer condition may have been erased. VPL's 316 are reset whenever pointer memory counters 309 reach a reference state (such as zero) indicating that seven data segments have been processed through the readback circuits without an error condition or a hardware pointer being received. Pointer memory counters 309 respectively supply error-free indicating signals over lines 322 to reset VPL's 316. AND circuits 323 are respectively responsive to signals on the lines 322 and the RLL mode and not end of data signal on line 313 to reset VPL's 316. Resetting is synchronized by the ABC–7 timing pulse received over line 324 from the FIG. 20 illustrated timing circuits.

From the above description, it can be seen that pointer signals can be generated based upon error correction activities with any of the tracks as soon as the error condition is removed. Other track circuits may subsequently generate hardware pointers, valid pointers, and the like. All of this action occurs without dead-tracking any of the tracks, provided excessive skew is not encountered. In this regard, if there is a temporary loss of signal amplitude or an excessive phase shift causing a loss of one or more data bits from a given track, there will be an apparent increase in leading or lagging skew of the track; that is, the corresponding RIC will not be stepped in a synchronous manner with the data frequency on the corresponding track because of such loss. When this occurs, an almost-skew condition will point to the loss of the data bits which is interpreted by the FIG. 14 illustrated deadtrack control circuits for causing deadtracking under certain conditions. By deferring the deadtrack initiation, an increased number of errors can be corrected in that, once the error condition not causing an overly extended burst of errors disappears, the powerful error correction code described with respect to the FIG. 16 illustrated circuits can recover from such errors. Because of such powerful codes, the deadtracking can be safely deferred as opposed to other recording schemes wherein only one track in error can be successfully corrected.

The overly extended burst error condition is indicated by persistent pointers. By arbitrary definition, an extended error condition is defined when the valid pointer exists more than twelve continuous data segments in any given track; that is, VPL's 316 remain set while twelve data segments are being corrected. In this regard, persistent pointer counters 325 step once for each signal received from the respective A–O's 317. That is, each time the ECC circuits 63 correct an error in a given data segment, an activating signal is supplied to set the respective VPL's 316. The same signal steps the respective persistent pointer counters. When A–O latch 317 is set, the transition increments the corresponding counter 325. After time ABC–7, A–O latches 317 are reset by circuits 39 in preparation for the next timing sequence A–O through ABC–7. Upon reaching 12, persistent pointer counters 325 supply an activating signal setting persistent pointer latches (PPL) 326 which indicate extended or repeated error conditions in the respective tracks.

Persistent pointer counters 325 may approach the threshold of twelve continuous data segments in error and still not set the persistent pointer latches 326. In this regard, VPL's 316, when reset, supply an activating signal over lines 327, respectively, which resets persistent pointer counters 325 to the reference or zero condition, as well as resetting persistent pointer latches 326.

The above-described valid pointers and persistent pointers, together with marginal skew pointers, are selectively gated through A–O's 329, thence, driving register 328 to pointer bus 288. The selective gating is based upon the format being read back from the record media and what portion of the recorded signal format is currently being processed. While reading back RLL encoded data signals, at one time or another during the readback of each record block, all three types of pointer signals appear on pointer bus 288. Decoder 327 supplies four phase signals sequentially gating input portions A1 through A3 (not in that order) of A–O's 329, the A4 portion being used for diagnostic procedures beyond the scope of the present disclosure. When reading back RLL encoded data signals during the preamble portion, A3 input portions are selectively activated by decoder 327 to pass the marginal skew indicating signals from cable 329A to pointer bus 288. It may be recalled that the FIG. 14 illustrated apparatus takes the gated pointer signals from pointer bus 288 and selectively uses such signals for deadtracking readback signal channels under marginal skew conditions. Such gated marginal skew signals are then applied to the respective A2 input portions of DTL's 238 of FIG. 14. Accordingly, during the preamble or initializing portions of readback, the marginal skew signals select which readback channels are to be deadtracked.

Once data has been detected and one group of readback signals has been deskewed (ROC cycled), then valid pointer signals from VPL's 316 are gated through the A1 portions of A–O's 329 to pointer bus 288. These valid pointers are then used by the A2 input portions of DTL's 283 for selecting which readback channel is to be deadtracked. Upon encountering a resynchronization pattern, persistent pointers from PPL's 326 are selectively gated through the A2 input portions of A–O's 329 for being applied to the A2 input portions of DTL's 283. In the preferred form, either microprocessor 38 or other circuits 39 predicts when a resynchronization pattern is expected for causing the persistent pointers to be gated. In accordance with Irwin '534, the number of ROC rotations (number of recorder data frames or bytes) interposed between successive resynchronization patterns is preferably fixed, for example, 50 ROC rotations or 1,600 data frames (160 data segments). When 49 ROC rotations have occurred since the last-encountered resync pattern or preamble, the sync input to decoder 327 is activated in accordance with Irwin '617. This action replaces the valid pointers on pointer bus 288 with persistent pointers. Hence, resynchronization of readback channels is initiated by error pointers. By gating the persistent pointers one ROC rotation before resync, even the most-leading signal track will not be resynchronized unless a persistent pointer is present.

When the above-described circuits are used in connection with readback of PE signals, the preamble operations are the same; however, the valid pointers from VPL's 316 are gated to pointer bus 288 during reading the postamble; while the persistent pointers from PPL's 326 are gated to pointer bus 288 during the data readback portion. Gating persistent pointers to pointer bus 288 delays the deadtracking operation initiatable by the respective A2 portions of DTL's 283 until a persistent error condition has been detected in the PE readback signals. For simplicity, the conditions causing the scan-type pointer gating are set forth in the table below:

| ROC CYCLED | SYNC WITH TAPE OP | POINTER BUS | RLL | PE |
|---|---|---|---|---|
| 0 | 0 | HDWE | Diagnostics | Diagnostics |
| 0 | 1 | MARG | Preamble | Preamble |
| 1 | 0 | VALID | DATA | Postamble |
| 1 | 1 | PERS | RESYNC | DATA |

The "ROC-cycled" signal, received from SKB 57 over line 298, indicates that data has been read out at least once from SKB 57 in a given record block of signals. This signal remains active from the marker position M1 or the first all-1's marker of PE until the end-of-record has been detected. During the RLL mode, the RLL-SYNC signal provides the other input to decoder 327. This signal is preferably generated by microprocessor 38. Initially, processor 38 supplies the sync signal until ROC cycles once; it is then deactivated. Additionally, as above described, this signal is activated during the resynchronization patterns. Accordingly, in the RLL mode, persistent pointers are gated through during resynchronization periods.

During the PE readback mode, AND circuit 327A supplies an active signal to decoder 327 corresponding to the RLL-SYNC signal whenever there is a VRC (vertical redundancy check), i.e., an error condition detected by the parity error detection scheme of PE recording and the end-1's, i.e., the last marker signal of PE recording has been detected indicating the postamble is being entered. From examination of the above table and FIG. 15, the timing relationships with respect to the RLL and PE record formats for gating pointer signals to pointer bus 288 can be readily deduced.

The above-described selective gating of pointer signals from other error indicating signals enables the readback circuitry to make greater advantage of the error indications than have been detected during readback. Because the reliability of the readback will increase after the preamble has been read and all of the readback channels have synchronized on the readback signal, various degrees of pointer reliability are desired for controlling deadtracking and error correction. It is also noted that during the PE readback, the deadtracking initiation is delayed by the counting modulus of persistent pointer counters 325. In that application, the persistent pointer counters 325 can have their modulus changed—for example, from 12 to 8—for initiating deadtracking sooner. Of course, in the alternative, eight data segments or eight PE frames may be selected as the persistent pointer criteria. The number selected is a design consideration in the particular data signal readback system.

ERROR DETECTION AND CORRECTION

The error detection and correction system of the present invention employs a plurality of independent, but interacting, error detection and correction codes. It is preferred that the polynomials and the interrelationships of such polynomials with the data bits being processed exhibit bit permuted relationships for enhancing the probability of detecting 100 percent of the error conditions while correcting a high percentage of detected errors. Within the present inventive concepts, any one of a plurality of error detection and correction codes may be employed. The selection of a particular code polynomial and a particular set of companion matrices associated with such polynomial should be in accordance with the error characteristics of the signal transfer system being employed. Considerations should also be employed for making compatability of the circuitry utilized to effect error detection and correction with previous systems. For example, in magnetic media recording systems, parity has been used for years to detect errors in bytes of data recorded transverse to the tape length. In a multitrack system, with track-in-error pointers, such a parity system can correct one track in error. For purposes of economy, it is desired to retain parity systems for transversely recorded data bytes in magnetic tape systems. Such parity is encoded as described for the data segments; hence, will not appear as parity on the tape. When employing the invention in other systems, such a restriction need not be applied. Since the first constructed embodiment of the present invention was in the ½ inch magnetic tape environment, the error correcting codes used with each data segment retained the vertical redundancy check (VRC), or parity, associated with prior ½ inch tape recording systems such as PE and NRZI systems. In this regard, syndrome S1 (later referred to) may correspond to VRC of prior systems. Such selection facilitates constructing a magnetic recorder and readback system which may process signals in either the NRZI, PE, or the present RLL data format with a minimum of additional circuitry. See copending commonly assigned patent application, Ser. No. 306,975, filed Nov. 15, 1972, by A. Patel et al.

Referring momentarily to FIG. 5, which illustrates the arrangement for a full data segment in a nine-track magnetic recording system, check bits to be encoded and recorded along track 8 are the VRC bits referred to above. The check byte in byte position C is based upon a polynomial selected in accordance with the failure modes of associated tracks. The polynomial is also selected such that it can cooperate with the check bits recorded along track 8. In this regard, Bossen U.S. Pat. No. 3,629,824 teaches that selecting the check bits in byte C and the check bits in byte A all from the Galois field $2^B$ with the use of pointer signals as taught by Hinz, Jr., in U.S. Pat. 3,639,900, two tracks in error can be corrected. Use of the Bossen ECC, wherein the track 8 check bits are selected from the Galois field $2^B$, does not necessarily ensure compatability with prior systems; i.e., it may not be a VRC. In a magnetic record tape system, wherein forward and backward reading is employed, it is preferred that the polynomial be of the symmetrical type, such as that used in the cyclic redundancy checks set forth in U.S. Pat. Nos. 3,508,194, 3,508,195, and 3,508,196.

Each data segment has errors detected and corrected by either of the above-referred-to or other suitable error detection and correction codes which are selected in accordance with the teachings by W. Wesley Peterson in his book, ERROR CORRECTING CODES, MIT Press 1961, LC Card No. 61–8797. In addition to the segment error detection and correction, there are two cyclic redundancy checks (CRC's) as taught in the above-referred-to U.S. Pat. No. 3,508,194. Referring to FIG. 7, the check bit byte in byte positions 2–6 is the same CRC as described in U.S. Pat. No. 3,508,194. It is generated based upon the data bits as they are transferred from main buffer 43 to group buffer 45 (FIG. 9). In the present embodiment, the polynomial check bytes in the data segments of FIG. 5 are not checked by this CRC. It is also preferred that this CRC check byte be a symmetrical polynominal as used in standard nine-track NRZI recording. In this manner, the same circuitry, i.e., the same linear shift register, can be used to generate the CRC in the CRC segment as used for nine-track NRZI recording. Because the CRC is so well defined, it will not be further described, it being understood that write error circuits 47 employ such CRC circuitry; and, in addition, read error circuits 63 also employ a similar set of circuits (not shown) for detecting errors in the record block. The interaction of such codes is described with respect to FIG. 19.

Both the CRC and the check bits used for the data segments are preferably based upon symmetrical polynomials. In processing large amounts of data, it has been observed that a small number of miscorrected errors from a data segment is not necessarily detected by the CRC check byte. The reason for this is the mathematical operations on the data are sufficiently similar that the undetected errors reside in the same portions of the relative error detecting fields of the two polynomials. Accordingly, it is desired to vary the relationships between the polynomials and the data in the data segments with respect to the CRC polynomials and ECC polynomial to take a greater advantage of the redundancy of the check bits. This variation is referred to as track-polynomial rotation or scrambling. Any permutation may be selected in accordance with failure mode analysis and particular ECC characteristics. Any selection is suitable and not pertinent to the practice of the present invention.

While the interrelationship of CRC–1 and the ECC codes is enhanced by this track-polynomial rotation, less than 100 percent of miscorrections and errors in large amounts of data may still not be detectable by that combination. So, in addition, a second CRC, CRC–2, which uses the same polynomial as CRC–1 (no limitation thereto intended), but having a different track-to-polynomial relationship, i.e., a further polynomial rotation, provides added redundancy. Further enhancement is provided by assigning a different subset of data signals in the record to CRC–2 than was assigned in CRC–1. For example, CRC–1 during recording, is driven by the data and padding signals as transferred to group buffer 45. CRC–2 on the other hand can be driven only by the data signals. The readback portion decode 60 supplies all of the data signals plus the padding signals to read error circuits 63. Readback circuits 63 separate the padding signals from the true data signals. The CRC interactions are described with respect to FIG. 19.

The data segment error detection and correction is further described with particular references to FIGS. 16 and 18. FIG. 18 illustrates the timing relationship for a read forward of all signal transfers through circuits 63. Read forward means the tape is moving in the same direction as it moved during recording. Read backward means the tape is moving in the direction opposite from the direction of motion during recording. All described readback operations are read forward.

Readback is timed by four timing cycles (FIG. 18); A cycle, B cycle, AB cycle, and ABC cycle. The A cycle transfers Group A and format groups from five register GB–1 185 (FIG. 12) through decode 60 to segment buffer 201 via register 191. B cycle transfers the Group B data signals through decode 60 into segment buffer 201. Syndrome generator 195 may generate S1 and S2 during these transfer cycles. Upon completion of such transfers, segment buffer 201 contains one data segment, together with the ECC bits as shown in FIG. 5. At this time, syndrome generator 195 has detected whether or not there are any errors in the data segment. If there are not errors, the AB cycle is omitted with the timing directly entering the ABC cycle which transfers data signals from segment buffer 201 through EXCLUSIVE OR's 202, thence to main buffer 43. If errors are detected, and are correctable, then the AB cycle is performed for error correction calculations (error patterns are generated). Upon determining which bits are in terror (error pattern), ECC control 200 actuates EXCLUSIVE OR's 202 during the ABC cycle to selectively change ones and zeroes of the data bits from buffer 201 during the transfer to main buffer 43; that is, which bits to correct is determined during the AB cycle, while the actual correction is performed during signal transfers in the ABC cycle. If more than two tracks are in error, either the readback operation may be aborted or single TIE operations may be employed. In this situation, CRC–1 and CRC–2 are relied upon to detect possible uncorrected errors.

Since the operation of the error correction circuits and buffer transfer circuits is usually designed to be faster than the maximum data transfer into SKB 57, there is usually a wait period 335 (FIG. 18) before an A cycle is initiated. During this period of time, there is no signal transferring between SKB 57 and main buffer 43. Each A cycle is initiated by the circuitry of FIG. 20, as will be later described; however, for the present description wherein segment buffer 201 is empty as at 336 and GB–1 185 is full as at 337, an A cycle is initiated. It may be remembered that decode 60 has its output signals commutated on a byte-by-byte basis for four bytes. The four data bytes are transferred during periods 0–3 of the A cycle by data transfer pulses 338, which are the same pulses supplied over cable 233 to decode arrays 220 of FIG. 13. GB–1 185 full signal remains active until the last byte, i.e., the fourth byte, of Group A is transferred during period A3. Note that GB–1 185 has five 9-bit registers which simultaneously supply 45 signals to decode 60. Operations are timed by the 4-byte decoded signal transfer from decode 60 to register 191. Since the A cycle is already initiated, periods 4–7 constitute a wait period for SKB 57 to assemble Group B signals. Also, period A7 may be followed by a wait period (not shown). In FIG. 18, the buffer addresses referred to are the register addresses for segment buffer 201.

Turning now to FIG. 12, register 191 receives one byte of data and transfers it to syndrome generator 195 (FIG. 16). Syndrome generator 195 may have S2 computer constructed similarly to the S2 computer 339 shown in the Bossen U.S. Pat. No. 3,629,824. This computer calculates error syndromes (error including track-in-error indicators) in accordance with the selected polynomial represented by the check byte in byte position C. The same bytes are supplied to generator 340 for generating the S1 syndrome. In Bossen, the VRC of previous systems is not used, while in Patel, supra, the VRC of previous systems is used. Hence, in A cycle, the A group signals are processed by circuits 63 to partially calculate S2 and S1 for the record signal segment.

Steps 4–7 are wait steps, with period 7 being maintained until Group B has been assembled by SKB 57.

Let it be assumed that A cycle has reached period A7. GB–1 full signal becomes active again at 343 while segment buffer 201 remains not full at 344, it being remembered that GB–2 has the capability of storing one data segment including the check byte before becoming full. This coaction initiates the B cycle. FIG. 20 apparatus switches from A to B as will be described. During periods 0–3 of the B cycle, the four decoded bytes of data from decode 60 are transferred into registers 4, 5, 6, and 7 of the segment buffer from the five registers 0–4 of the GB–1 buffer. GB–1 full signal remains active until the completion of the transfer of the last byte of data. B periods 4–7 are wait periods allowing ECC circuits 63 to detect error conditions in the data segment.

Since one data segment has been transferred into segment buffer 201, the segment buffer full signal becomes active at 345 as will be described in more detail with respect to FIG. 20. Segment buffer address in the B cycle is changed from 0–3 to 4–7 by adding the B cycle signal in with the addresses for forcing the $2^2$ digit position to a 1. Accordingly, as later described, the segment buffer address 4–7 is repeated twice during the B cycle.

The fifth period of the B cycle is an interleaved wait period for pointer generation. The pointers are combined with S1 and S2 for error correction purposes as set forth in Hinz, Jr., supra. Pointer generation can be in a fixed delay determined by circuit design parameters beyond the scope of the present description. Timing periods B6–B7 are not used for any function in connection with the present invention.

The AB cycle is entered automatically unless it is aborted by skip AB circuit 353, for example. Circuit 353 responds to an error-free condition (such as S1=S2=0) to supply GO ABC signal over line 354 to the FIG. 20 illustrated timing controls. Depending upon the error correction code selected for use with the present inventive apparatus and methods, the AB may be omitted under certain error conditions, the description of which is beyond the present disclosure. The second entry into ABC is from the AB cycle indicated by timing signal AB–7 traveling through OR circuit 355 to line 354.

It is also preferred that a selected error correction code also be capable of indicating uncorrectable errors, that is, errors existing beyond the code's correction capability. Circuits 365 receive several inputs as shown in FIG. 16 but not described and employ logic dependent on the selected error correction code to indicate such errors by supplying signals over lines 372 and 390 to microprocessor 38. Since the logic functions and arrangements are error code dependent and not a part of the present invention, they are not described.

Before proceeding into the detailed description of the error correcting circuit operation, a brief overview of the error correction code is given. The error correction code operates on all record segments; each full data segment such as shown in FIG. 5, each residual data segment as shown in FIG. 6, as well as each CRC or check bit segment as shown in FIG. 7. In all instances, the error correction code operation is identical. Each segment consists of bytes 1–7, a check bit byte with a parity or other check bit symbol in track 8. Alternatively, the rectangular data arrangement could be considered as consisting of nine bytes, one byte along each track, and each byte having eight bits or all signals in but one track. For the purposes of the present discussion, the byte orientation usually found in nine-track magnetic recording systems is used. Because of the failure mode of magnetic media, errors usually occur along a given track. The selected error correction code, such as the codes referred to herein, should have the capability of identifying tracks in error (TIE's), with or without pointers as taught by Hinz, Jr., supra.

During readback, two error syndrome bytes S1 and S2 are generated. If these syndromes are both zero, an error-free condition exists in the record segment. Under unusual circumstances, there may be sufficient errors that the syndromes will be zero even though multiple errors occur. Under such circumstances, the CRC, referred to later, detects and indicates such an unusual error condition. The percentage of undetected errors by the codes used for each of the data segments is selected to be relatively small, i.e., much, much less than a fraction of one percent of the errors (note that the percentage is of the errors, not of the data bits being processed).

The error correction process may generate signals representing one TIE (track in error). Then, the detected number of pointers, which have been described with respect to FIG. 15, are combined in accordance with Hinz, Jr., supra, to indicate more than one TIE. From such information, error correction is directed to a set of circuits which then controls an EXCLUSIVE Or screen or mask to convert bits in error to corrected bits which are then inserted into register 204 for transmittal to main buffer 43. Some of the signals generated in connection with the TIE's, as well as to the number of pointers, are transmitted to other circuits previously described to detect the fact of no errors or to detect an uncorrectable error.

Correction pointers generated in the pointer circuits of FIG. 15 travel over signal paths in cable 311 to TIE generator 400 which generates TIE indicator signals. Cable 401 carries these signals to ECC matrices for combining such TIE signals with S1 and S2 signals in accordance with the selected ECC. See Bossen, supra. The correction pointers on cable 311 also drive the correction circuitry 404 via cable 311A, as will be described.

The following description is a simplified explanation of how bits in error may be corrected. For a rigorous discussion, see either Bossen, supra, or Patel, supra.

The syndrome S1 and S2 signals respectively travel from S2 computer 339 and generator 340 to matrices 196 wherein they are combined with the TIE signals to generate binary error patterns $e_i$ and $e_j$.

The eight-bit $e_j$ error signal pattern is supplied to the error correction circuitry 404 for activating such circuits to correct bits in those tracks corresponding to TIE's indicated by the correction pointers. The $e_j$ signal also goes to Exclusive-OR circuit 403 for being combined with S1 on a serial basis as S1 is stepped through shift register 405. This generates the $e_i$ error pattern.

When $e_j = 0$, (0 or 1 error) Exclusive-OR 403 passes the $e_i$ pattern thereby selecting $e_i$ signals for actuating error correction circuits 404. The $e_i$ error pattern is combined with the circuit 400 supplied $i$ pointers in A–O's 410-417 to generate error correcting signals. On the other hand, when $e_j = 1$, Exclusive-OR 403 is activated to complement the $e_i$ error pattern, one error pattern bit for each segment byte 0–7. In error correction circuits 404, the $i$ correction pointers on cable 419 selectively combine with the just-described $e_i$ error pattern for generating error correcting signals in each of A–O's 410–417. Inverters 432 degate the corresponding A1 input portions of A–O's 410–417 whenever the $i$ pointer is a "1". The $j$ pointers point to error locations by combining the cable 311A correction pointers and the S2 syndrome signals on cable 52. The S2 syndrome signals and the correction pointers (indicating track-in-error) are combined as described by Bossen, supra, or in the alternative as described by Patel, supra. The error correcting signals also travel over cable 318 to the FIG. 15 illustrated pointer circuits.

Turning now to error correction itself, A–O's 410–417 (one for each track 0–7) respectively responds to the $e_j$ and $e_i$ 8-bit patterns and the pointer signals on cable 311A, the $e_i$ signals received over cable 419 to correct errors in each record segment. To this end, EXCLUSIVE OR circuits 420–427 (202 in FIG. 12) are jointly responsive to the A–O's 410–417 supplied error correcting signals, respectively, and the data bits from segment buffer 201 passed by AND circuits 430 to supply corrected data signals through register 204 to main buffer 43. AND circuits 430 are actuated to pass data signals by the ABC cycle, the ABC timing signals on line 431. The $e_j$ and $e_i$ patterns initiate a correction action whenever a "1" is present. For example, $e_j$ = 0000001; only one bit is corrected. The parity track signals are not corrected by the described apparatus. Separate correction circuits (not shown) may be employed or parity generated from the corrected data bits, as desired.

At the end of the ABC cycle, as will be more fully described with respect to FIG. 17, a waiting period is initiated as indicated at 335 in FIG. 18 at the left-hand portion thereof. At the onset of this wait period, an additional pulse period 07 can be added to the above-described A, B, AB, and ABC cycles to reset all circuits to a reference state. This reset action prepares the circuits for detecting and correcting errors in the next received data segment. Additionally, for each error, the pointer counters for the respective tracks of FIG. 15 are stepped. In the event there is no error condition, the history respective track counters are advanced; and if there is an error condition, the persistent pointer counter is stepped for defining persistent pointers. Additionally, the S1–S2 circuits in 195, as well as latches 395 and 393, are reset by a reset ECC signal (07).

The above abbreviated description relates to error detecting and correcting action for each full data, residual, and check bit segment. Additionally, the CRC actions are more fully described later with respect to FIG. 19.

In the event circuits 195 indicate more than one TIE and cable 311 does not carry two correction pointer signals, hardware pointers are requested at B5 by a signal on line 312 which travels to the FIG. 15 illustrated circuits. Count pointer circuit 391 determines the number of pointer signals received over cable 311. Circuit 391 can be a decoding circuit array yielding two output signals, one on line 392 indicating the number of pointer signals is other than two and a second on line 393 indicating three or more pointer signals — a possible uncorrectable error condition. The first signal on line 392 is compared with the detected multiple track error condition signal on line 395 from matrices 196 at time B5 by AND circuit 394. If multiple errors are indicated and there are two correction pointers, AND 394 is inactive to indicate a readily error correctable condition. No hardware pointers are gated. When there is one correction pointer signal, the particular selected code cannot correct the multiple track error — it needs two correction pointers. Then, AND 394 sets GHP (gate hardware pointer) latch 396 to send the line 312 signal. This action is an attempt to find two pointer signals to enable error correction activity. If there are three or more correction pointers, the particular selected code also cannot correct the errors — it needs two and only two pointer signals for multiple track error correction. Gating the hardware pointers may enable two pointers to be used. That is, the hardware pointers indicate present possible error conditions — thereby gating the hardware pointers adds pointer signals to the history and persistent pointer signals from FIG. 15.

Depending on design choices in circuits 365, the line 393 signal indicating three or more error pointer signals may abort the read operation, effect a single TIE correction, or other error handling action as may seem appropriate. It is to be understood that the above description is greatly simplified, the description being only that complete to show a relationship between error correcting operations and operations performed by the inventive apparatus and methods.

BUFFER CONTROLS

Buffering in the illustrated embodiment centers around main buffer 43 (also considered as a channel buffer), a count-in/count-out register-type buffer well known in the computing arts. In buffer controls 42, the input counter is termed "CRIC" (channel read-in counter) 475, and the output counter is termed "CROC" (channel readout counter) 474. CRIC 475 controls all inputs to main buffer 43 during both writing or recording, as well as in readback operations. TAPE OP signal from microprocessor 38 on line 469 enables all circuits in MB 43 to operate. During recording, CRIC cooperates with write service logic circuits 460 to step data from scan buffer 40 into successively addressed registers in main buffer 43. CROC steps data from successively addressed registers in main buffer 43 through AND circuits 461, which constitute a portion of gating logic 44 of FIG. 8. AND circuits 461 are controlled by the gate-data signal received from AND 93 of FIG. 9.

During a readback operation, register 204 (also shown in FIG. 12) supplies signal bytes in bursts of seven through a set of A–O's 462 to main buffer 43 under control of CRIC. CROC, in cooperation with read service logic 463, transfers signals from successively addressed main buffer registers to scan buffer 40 for transmittal over channel bus-in (CBI), in accordance with the Beausoliel U.S. Pat. No. 3,582,906.

Buffer controls 42 include priority circuits favoring write into main buffer 43 over readout. Buffering capacity in scan buffer 40, main buffer 43, and group buffer 45 is balanced to provide similar capability for signal transfer during either reading or writing. Scan buffer 40 and main buffer 43 accommodate the burst of seven delays for enabling maximum data transfer rates on read. The residual counts, MOD 7 and MOD 32, control termination of readback transfers ensuring only data bytes are transferred to channel bus-in.

First, a write operation is described, including the transfer of data signals from CBO (channel bus-out) through scan buffer 40, thence to main buffer 43 under control of write service logic 460. Transfers from main buffer 43 are controlled by buffer control 42 in conjunction with group buffers 45, 48, and write format circuits 46. The terminator portion (residual and check segments) of each data block is controlled by CRIC 475 and CROC 474 through the other logic circuits of buffer controls 42. During read, transfer of error corrected signals from register 204 continues through A–O's 462, main buffer 43, and scan buffer 40 under joint control of buffer control 42 and read service logic 463.

For a write data transfer, assume that the initial selection of the controller has been made in accordance with the Moyer et al U.S. Pat. No. 3,303,476, the control unit has been conditioned by establishing a recording or write mode of operation and is prepared to exchange data signals with a connected CPU in accordance with Beausoliel U.S. Pat. No. 3,582,906.

Scan buffer 40 has two buffer registers A and B respectively denoted by numerals 464 and 465. A register 464 receives signals from CBO and thence transfers such received signals over cable 466 through A–O's 462 to buffer write register 467. B register 465 is not used during the write operation. Register 467 retains one byte of data for recording in main buffer 43 for a short period of time to accommodate circuit delays.

BUFFER WRITE CYCLE

A REG 464 is first loaded from CBO; then a write cycle is requested from main buffer 43 by write service logic 460. The buffer 43 write cycle includes readout of A REG 464 to register 467, while simultaneously permitting the write service logic 460 to request the next byte of data. These actions are repeated until completion of the write. Write service logic 460 initiates a buffer write cycle by sending write-data-ready signals over line 472 to main buffer 43 causing it to transfer A REG 464 signals to register 467 and to store the contents of register 467 at the buffer register address indicated by CRIC REG 473. CRIC REG 528 receives the input register number count or address from CRIC 475 each cycle just before CRIC 475 is incremented. Because of this relationship, CRIC REG 528 may have a count of one less than the contents of CRIC 475.

The write-request signal on line 472 is initiated by write service logic 460 responding to the connected CPU that the data on CBO has been stored in A REG 464. That is, the connected CPU/channel supplies either an SVCO (service out) or a DO (data out) signal in accordance with U.S. Pat. No. 3,582,906, respectively, over lines 476 and 477. These signals, when activated, initiate transfer into scan buffer 40 and upon initiation of a buffer write cycle, to register 467 and thence to main buffer 43.

The above-described write signal transfer follows after the initial selection has been completed and a recording operation has been commanded. Processor 38 responds as described in Irwin '617 supplying a signal indicating a write mode and that the control unit is tape operational (TAPE OP) and in write status. The TAPE OP signal, on line 482 and as indicated in FIG. 17A, activates write service logic 460 by partially enabling AND circuits 481, 484, 485, and 486. These four AND circuits enable write service logic 460 to sequence transfers between the CBO portion of cable 40 and main buffer 43 in response to channel-supplied out tags SVCO and DO. Simultaneously with activating the write and TAPE OP signal, processor 38 supplies SVCI signal 487 (FIG. 17A) over line 488. This SVCI signal travels through OR 489 to the SVCI line 490. During recording a block of signals, all subsequent SVCI signals 487A are supplied by AND 485, as will be described later. The initial SVCI 487 is always initiated by programs in microprocessor 38 for lodging the first request for a data byte in order to start write service logic 460 into the later-described sequences. At this time, the I/O control unit awaits transmission of the first byte of data over CBO portion of cable 40 with a coincident control or tag signal SVCO.

The connected CPU or channel responds to SVCI by sending one byte of data over CBO and simultaneously sending SVCO over line 476. Upon receiving SVCO over line 476, A–O 493 responds to SVCI active and SVCO active to generate service response pulse 494 traveling over line 495 to toggle SRT (service response toggle) 496 to the active state. SRT 496 memorizes and indicates whether the write signal transfer is under DO–DI or SVCO–SVCI control. This action stimulates write service logic 460 to transfer the byte of data on CBO into A REG 464, thence into MB 43. The service response pulse also resets the permit latch (PL) 515 to properly sequence the next in tag, SVCI or DI, as selected by the SRT 496 signal state.

Service response pulse 494 switches SRT 496 (service response toggle) from the inactive to the active state for supplying an output signal on line 497. With SRT 496 active and MBWT inactive, Exclusive-OR 513 is deconditioned (no active output signal is being supplied), thereby blocking AND's 485 and 486. Accordingly, SVCI from AND 485 and DI from AND 496 are inhibited. During this time, the CBO signals are lodged in A REG 464. AND 481 gates CBO signals to A REG 464.

Exclusive-OR 498 initiates transfer of the lodged signals from A REG 464 to MB 43. Exclusive-OR 498 is jointly responsive to SRT latch being active and the MBWT latch (main buffer 43 write cycle tally) being inactive to supply write data ready signal 499 over line 472 to buffer control 42 requesting that main buffer 43 be made available for receiving a byte of data to be recorded. Priority circuits in controls 42 defer any requests for data transfer from main buffer 43 to group buffer 45 for any buffer write cycle requests.

Write and TAPE OP signal on line 482 activates gates 573 to pass the signals on CBO to A REG 464.

SRT 496 and MBWT being in opposite stable states generate write data ready signal via Exclusive-OR 498. This signal also activates AND 484 jointly with the write and TAPE OP signal to send a write cycle request signal via OR 509 to AND 539 for MB 43. AND 539 is activated to pass write cycle request signal only when MBF (main buffer full) latch 543 (later described) is reset. Main buffer 43 receives the write data ready signal and responds by sending acknowledge signal MB43WR over line 511 indicating main buffer 43 has received write cycle request signal. MB 43 has its own internal clocking system (not shown) constructed in accordance with known memory system designs. MB 43 emits the MB43WRR signal at the onset of its internal clocking cycle for transferring the A REG 464 signal contents through A–O's 462 to MB 43 input register 467. This action is accomplished by MB43WR activating the A1 portions of A–O's 462. A REG 464 is now free to accept the next byte from CBO. Main buffer 43 stores the signals in REG 467 in a register in MB 43 indicated by CRIC REG 528. Additionally, MB43WR signal triggers MBWT from the inactive to the active state. This action in write service logic 460 removes the write data ready signal from Exclusive-OR 498 while simultaneously activating Exclusive-OR 513 indicating that the next byte may be requested from the channel by supplying DI through AND 486 and OR 491. This action is indicated by the arrow extending from MB43WR signal to the leading edge of DI signal 492.

In the above-described instance, SVCI 487 being received from processor 38 in fact is removed by processor 38 in response to receiving SVCO. The programs in processor 38 are timed to allow the above-described circuits to receive the byte of data before SVCI is inactivated. In subsequent transfers, AND 485 supplies the SVCI signal and inactivates same in response to Exclusive-OR 513 removing its active output signal.

Write service logic 460 alternately activates AND 486 to supply data in (DI) and AND 485 to supply SVCI. Permit latch (PL) 515 and its input logic respond to the service response signal 494 and A–O's 478 analysis of the service tag signals to partially enable service response AND's 485 and 486, respectively, to activate either SVCI or DI for such data signal exchanges with the channel.

The analysis of the SVCO and DO signals is further controlled by AND 516 responding to the processor 38 generated "DI-DO enable" signal received over line 517 to pass the permit latch 515 signal to SDT latch. The line 517 signal indicates that the channel interface uses the SVCI, DI, and SVCO, DO signals. With AND 516 disabled, only SVCI and SVCO signals are used. The control signal on line 517 may be under microprocessor 38 program control, or from a plug, pinboard, etc., indicating the type of transfer tag signals required.

AND 516 passes permit latch 515 signal from line 522 to toggle SDT (SVCI-DI-trigger) between the S and D states, respectively indicating SVCI and DI signal exchanges. Initially, SDT is set to the S state in preparation for the first service response from the previously mentioned SVCI generated by processor 38. This signal toggles SDT to the D state after SVCO has been received, such that the A2 portion of A–O 478 passes the DO signal received over line 477 to AND 481 for the next succeeding data cycle. Upon the next channel-supplied service response, i.e., DO, SDT triggers to the S state enabling the A1 portion of A–O 478 to pass SVCO signal received over line 476. In this manner, the proper service response from the channel travels through A–O 478 to AND 481 for transferring CBO signal contents to A REG 464 and initiating transfer of the received byte to MB 43.

Additionally, A–O 478 supplies the inversion of its gated service response signal 494 to selectively set permit latch (PL) 515. In this regard, AND 521 jointly responds to the not service response signal on line 520 and the not A–O 478 signal to set PL 515. PL 515, being set, indicates that the out tag (SVCO or DO) corresponding to the next in tag (SVCI or DI) has become inactive so that the SVCI or DI in tag signals can be activated as indicated by the gating inputs to AND 485 or 486. PL 515 remains set until the next service response 494 occurs. Thus, PL 515 active output signal, supplied over line 522, enables AND's 485 and 486 to generate the SVCI or DI tags according to the state of the SDT latch.

The AND 481 output signal transfers data signals on CBO into A REG 464. This action represents the AND function combination of the write and TAPE OP signal on line 482, the output signal of A–O 478 as above discussed, and the service response signal on line 495.

The above-described circuit operations are basically asynchronous; that is, circuit delays, etc., determine the timing relationships. DC couplings, for example, between SDT and AND 481 are maintained as long as the input DC signals exist. Accordingly, the timings shown in FIG. 17A are somewhat idealized and do not reflect variations in circuit delays, access delays to main buffer 43, and the like. These circuit timings are selected to accommodate signal rise, fall, and transfer times on CBO, as is well known in the circuit design arts.

From the above description, it is apparent how the data service portion for the second byte operates, that is, the DO/DI and service response, in order to transfer the second byte of data through A REG 464 to MB 43. AND 486 operates with in tag signal DI in the same manner that AND 485 operates with SVCI. These two AND's are constructed such that when the input portions are satisfied, then the corresponding in tag is activated.

The above description for transferring data bytes into main buffer 43 assumes no intervening transfer of data signals from main buffer 43 through gating circuits 44 as described with respect to FIG. 9. In the event bytes are being transferred from main buffer 43 for recording, such buffer read cycles are interleaved between the above-described write cycles, the write into MB 43 having priority. Write service timings insure that write cycles never occur on successive cycles, therefore allowing read cycles to be interleaved. Buffer controls 42 handle the priority of the write-read MB 43 transfer, as well as coordinating operation of main buffer 43 with the FIG. 9 illustrated write circuits and the FIG. 12 illustrated readback circuits. Additionally, the handling of the residual data bytes is determined by buffer control 42; that is, the last byte of data transferred from main buffer 43 during the readback operation to scan buffer 40 for retransmittal to CBI is determined by buffer controls 42 in accordance with the content of the residual counts referred to above.

MAIN BUFFER CONTROL 42

Successive addresses in main buffer 43 for receiving bytes of data to be recorded from write REG 467 are tallied in CRIC (channel read-in counter) 475. Tally CRIC control 525 (a gating network) during a write operation is responsive to MB43WR signal received over line 511 from MB 43. Line 511 is active for each main buffer 43 write cycle so that each byte written into main buffer 43 increments CRIC 475. In the illustrated embodiment, CRIC is a five-digit binary counter for counting from 0 to 31 for the 32 register buffer 43. Each write cycle, just prior to the time CRIC is incremented, the five-bit count or register address is transferred to CRIC REG 528 which holds the count until the next byte of data is transferred to main buffer 43. CRIC REG 528 supplies the register address over cable 529 to main buffer 43 as the address at which the next byte of data is to be written. CRIC may also be incremented by each AND 481 signal, for example. Tally CRIC 525 is a gate passing the line 511 signal whenever allow CRIC latch 526 is active. Latch 526 is active during read forward at all times. During read backward, compare circuits 524 indicate that the received MOD 7 count from register 591 and the MOD 7 address signals received over cable 676 are equal; allow CRIC is set.

The register addresses of main buffer 43 for readout purposes, i.e., transfer of data bytes to be recorded from main buffer 43 to group buffer 45, are determined by CROC (channel readout counter) 474. CROC 474 is incremented under control of tally CROC circuit 531, another gating network. Tally CROC 531 is responsive to MB 43 read cycle pulses (MB43RD) on line 532 to increment CROC 531 each time a byte is transferred under control of the FIG. 9 illustrated apparatus and as read out from main buffer 43. The read cycle pulses from main buffer 43 are generated internally in MB 43 in accordance with known memory operations for monolithic semiconductive memories. In this regard, it should be noted that the initiation of the counts in CRIC and CROC are closely coordinated. For example, during initial selection, both counters can be initialized to an all-0's condition. This all-0's condition is then captured, respectively, in the CRIC REG 528 and CROC REG 533 which hold the addresses of all-0's, respectively, for read-in and readout of main buffer 43 for the first byte of data to be recorded. Then, during such transfer, CRIC and CROC are respectively incremented as just described. If main buffer 43 is full as indicated by the difference between the CRIC and CROC counts, the contents of A REG 464 cannot be written into main buffer 43 and must be held until a register is read out. The full condition of MB 43 is detected by difference circuit 542 and held in MBF (main buffer full) latch 543. MBF 543 is held to the set condition by difference circuit 542 until CROC is advanced. Clock pulses (not shown) from a clock (not shown) continually attempt to reset MBF 543 for enabling AND 539 to send a write request to MB 43.

MB 43 TO GB 45 SIGNAL TRANSFERS

Data transfers from MB 43 to the FIG. 9 illustrated write or group buffers 45, 48 are in bursts of bytes via gating logic 44. In FIG. 17, gating logic 44 is shown as a set of AND's 461 controlled by FIG. 9 illustrated circuits. Buffer controls 42 initiate transfer from MB 43. Group buffer 45 includes control circuits (not shown) generating a full (all registers full) and a not-full signal, in any well-known manner. The not-full signal (GB 45 $\overline{\text{FULL}}$) is gated via AND 534 by the gate data signal from the FIG. 9 illustrated circuits to line 541. The gated GB 45 $\overline{\text{FULL}}$ signal passes through OR 562 thence AND 557 to send a read buffer request signal to MB 43. AND 557 is enabled to pass GB 45 $\overline{\text{FULL}}$ by the not write cycle request line from inverter 538 and the CRIC not equal CROC signal from compare circuit 550 via the MBMT latch and inverter 596 received over line 536. Priority is assigned to the signal transfer from A REG 464 to MB 43 via NOT or inverter circuit 538 which inhibits AND circuit 557 from passing any read request signals to main buffer 43. A REG 464 being full corresponds to AND 539 being active. In this regard, it will be remembered that transfers of data from write REG 467 into main buffer 43 will not occur until after the MB43WR signal has been supplied over line 511 to write service logic 460. Timing of the various circuits should be such that this first transfer, the size of main buffer 43, and the transfer through scan buffer 40 balance such that there are no interruptions or overruns of signal data transfers.

END OF RECORD

The initiation of the record terminator occurs when less than seven bytes to be recorded remain in MB 43. This situation is indicated by the difference in tallies in CRIC and CROC. To this end, difference circuit (subtractor) 542 receives the output signals from CRIC and CROC REG's 528 and 533 and compares same. If the difference between CRIC and CROC counts is greater than six, a full data segment resides in main buffer 43. Whenever difference circuit 542 detects six or fewer bytes of data in main buffer 43, difference circuit 542 then sets "six-or-less" latch 544 initiating generation of the terminator portion of the data record. The activating signal from latch 544 travels over line 103 to the FIG. 9 illustrated apparatus actuating generator 71 to generate the all-1's end of data marker group, as well as initiating transfer of residual bytes into group buffers 45 and 48, together with the padding bytes, as previously described. AND 545 supplies the line 103 signal whenever latch 544 is set, AND 534 indicates GB 45 is not full, and the FIG. 9 circuits indicate end of a data segment on line 104. MBMT latch sends a signal over line 106 to the FIG. 9 circuits signifying that all data has been transferred from MB 43; this action enables padding bytes to fill the residual segment as described with respect to FIG. 9.

To set MBMT, the contents of CRIC REG 528 and CROC REG 533 are compared by compare circuits 550. If equal, an activating signal is supplied to AND circuit 551. It will be recalled that the CRIC and CROC REG's can be one step behind the counts in CRIC and CROC. Accordingly, even though CRIC and CROC REG's may show an equality, the buffer may not truly be empty. Accordingly, the lowest digit positions of CRIC and CROC are supplied to Exclusive-OR circuit 552 to determine whether or not there is an inequality between these two lowest digit positions thereby signifying that MB 43 readout cycle has not been completed. When completed, Exclusive-OR 552 completes the activation of AND 551 for setting MBMT latch, thereby supplying the MBMT signal over line 106.

Latches 544 and MBMT are used solely for controlling the terminator portion of the data record. A recurring clock pulse from MB 43 resets latches 543, 544, and MBMT upon the start of each MB 43 read or write cycle. A pulse signifying start of a memory cycle operation is generated in accordance with known techniques.

READBACK SIGNAL TRANSFERS

The control of transfer of readback signals from buffer register 204 through main buffer 43, scan buffer 40, to CBI is jointly controlled by buffer controls 42 and read service logic 463. CRIC and CROC step the addresses of main buffer 43 similarly to that described for the write operation. In this case, however, CRIC steps up to seven times for enabling main buffer 43 to receive seven consecutive bytes through register 204, while CROC is stepped on a byte-by-byte basis for data transfers through scan buffer 40 to CBI. The seven bytes (0–6) of data transferred into main buffer 43 occur during the ABC cycle shown in FIG. 18 and controlled by the FIG. 20 illustrated circuits. This action synchronizes the operation of circuits 63 with that of buffer controls 42 and main buffer 43. Circuits 63, when desiring to transfer the burst of seven, supplies the ABC 0–6 signal (FIG. 16) over line 673 through OR 509. AND 539 passes ABC 0–6 signal on line 673 to AND 557 only when MBF indicates MB 43 is not full. As described for the write or recording operation, AND circuit 557 determines priority between the write request from the FIG. 16 circuits and the read request from read service logic 463 in scan buffer 40.

AND 557 is further responsive to compare circuit 558 indicating no compare between the modulo 32 count from FIG. 20 (as will be described) and five lower digit positions of CRIC REG 528. Compare 558 is active only during the terminator portion as controlled by AND 559. AND 559 responds to a read forward signal from microprocessor 38, read and TAPE OP on line 313, and end of data signal on line 592 to activate compare 558. That is, comparator 558 supplies an AND circuit activating signal during all times except when the modulo 32 count and CRIC (five bits) compare when the residual and check bit segments are being read back.

Upon seven bytes of data being transferred from circuits 63 to main buffer 43, the ABC 0–6 signal becomes inactive (FIG. 20) to enable transfers of data bytes accumulated in main buffer 43 to scan buffer 40. ABC 0–6 inactive signal removes the enabling signal from AND 539; thus, enables AND 557 to pass buffer read request signals. NOT circuit 538 responds to the inactive signal of AND 539 to partially enable AND circuit 557. Because the burst of seven data bytes occurs during the ABC cycle, pulses 0–6, there is a break in the request (time ABC–7 plus wait period thereafter) enabling at least several bytes of data to be transferred from main buffer 43 to scan buffer 40 before the next timing period ABC 0–6.

To initiate a transfer to scan buffer 40 from MB 43, AND 562 jointly responds to A REG or B REG not being full signal received over line 563 from AFL (A REG full) latch or BFL (B REG full) latch via OR 508. Either AFL or BFL being reset generates the line 563 signal. AND 562 passes the line 563 signal through OR 562A to AND 557 for generating an MB 43 read request during readback mode. Main buffer 43 acknowledges the request for a read cycle from AND 557 by supplying an MB43RD signal over line 532. This signal pulse passes through tally circuit 531 to increment CROC 474 as described above. MB43RD pulse signal (FIG. 17B) switches the MB 43 supplied signals between A and B REG as main buffer 43 supplies successive bytes of data and as shown in the timing relationships in FIG. 17B. The MB43RD timed signal on line 548 passes through AND's 565 or 566 to alternate between the A and B REG's.

AND's 565 and 566 respectively supply register setting signals to A REG 464 and B REG 465 to gate the MB 43 supplied data signals by gates (not shown) within the registers and simultaneously set latches AFL and BFL. The AND's 565 and 566 are alternately successively actuated by AND's 575 and 576, respectively, in response to the then signal states of AFL and BFL latches during the readback mode, as can be readily ascertained by examination of the drawing. In addition to supplying the line 563 A or B REG empty signals, AFL and BFL latches supply coordinating control signals to read service logic 463 for use in control-unit-to-channel communication control.

READ SERVICE LOGIC

Coordination between the channel, scan buffer 40, and main buffer 43 is handled by the read service logic 463. Again, asynchronous logic circuits are used to permit maximum data transfer rates from scan buffer 40 to CBI. The operation is described with respect to a service-in/data-in configuration as was done for recording. The first initial main buffer 43 read cycle sets AFL through AND 565. The A REG full signal partially enables AND 579 in read service logic 463. If SVCO signal 476 is inactive, AND 579 sets RD SVCI latch. RD SVCI being set supplies an enabling signal to AND 570. AND 570 jointly responds to such activating signal, the signal on line 313, plus AND 571 not being active to supply an SVCI signal over line 572, to OR 589, and line 490 connected to an I/O channel (not shown). Since it is desired that the first byte of data be transferred from the A REG, SVCI is activated before DI. Hence, when line 490 SVCI is activated, A REG 464 must begin supplying data signals through OR circuits 574 to CBI in order to be fetched by the CPU or I/O channel (not shown). This function is performed by gates 573 activated by the output of AND 570.

Read service logic 463 alternates between the RD SVCI latch being set and the RD DI (read DATA IN latch) being set as shown in FIG. 17B. AND's 570 and 571 cooperate as a latching set of AND's to ensure that either SVCI or DI is sent at one time. In this regard, inverter circuits 577 transfer the outputs of the AND's to the opposite inputs as shown. Both the DI and SVCI latches have identical input circuits.

Read service logic 463 controls AND's 565 and 566 for coordinating setting and resetting AFL and BFL with DO and SVCO. AND 578 responds to SVCI being active and SVCO being active to reset AFL and thereby removes the SVCI signal after A REG 464 signal contents have been transferred to CBI. In a similar manner, AND 581 sets RD DI latch in response to the B REG becoming full. From this it can be seen and from examination of FIG. 17B, the asynchronous timing provided by read service logic 463 and the scan buffer empty signal on line 563 coordinate the operation for a maximum data transfer rate between main buffer 43 and CBI.

It may be recalled that with respect to the description of FIGS. 16 and 18, upon occurrence of an error correction, additional time is required to correct the data bits being transferred to main buffer 43. In other words, there may be a substantial period of time wherein no data bytes are being transferred from circuits 63 to main buffer 43. Then, suddenly, a large number of data bytes will be transferred, causing the possibility of overrun; i.e., CBI cannot receive the data signals as fast as they are being supplied because the capacity of main buffer 43 may be temporarily overtaxed. In this regard, MBF (main buffer full) latch 543 in buffer controls 42 partially enables AND/OR 580 to supply a sense data bit to microprocessor 38 over line 586 indicating overrun condition, i.e., data has been lost. In this regard, MBF 543 supplies an activating signal to AND 539 for preventing additional write cycles until MB 43 is not full. Remember, MBF 543 is reset at the beginning of each buffer memory cycle and set by circuit 542 when CRIC REG = CROC REG. If the cycle is a read, then CRIC REG ≠ CROC REG. Other circuits for overrun detection may also be used.

As mentioned before, the two residual counts are used to control proper readback of signals from the magnetic media. The MOD 32 count corresponds to the number or count in CROC REG 533 upon the completion of reading a data record; that is, the data transfer controlled by read service logic 463 must stop when the tally in CROC REG 533 equals the MOD 32 count contained in the residual count byte. In a similar manner, during read backward, data transfer through read service logic 463 must start when the MOD 7 count in the FIG. 20 illustrated register matches that of the residual MOD 7 count field; that is, the number of data bytes in the residual data frame as recorded in the media should match that of the actual data transferred to main buffer 43. The MOD 7 count field "initiates" the transfer of data bytes into buffer 43; then the MOD 32 residual count "checks" that it was properly initiated. The residual count field byte containing both the MOD 7 and MOD 32 count fields, when received in REG 204, is gated by AND's 590 to residual byte register 591. Timing pulse ABC–5 from FIG. 20, jointly with the processor 38 signal on line 592, indicating that the check bit segment is being processed, passes the residual count field byte to register 591. Register 591 supplies the MOD 32 count field signals to comparator 558 wherein it is compared with the CROC REG 533 signal contents. When a comparison is made, a deactivating signal is supplied to AND 557 preventing further read cycles from being initiated in main buffer 43 thereby inhibiting further transfer of any signals that may have been written into the buffer. In other words, the last data byte should have been transferred when the two counts are equal. MBMT is set deactivating AND 557 to prevent further data transfers to CBI by read service logic 463.

Referring again to allow CRIC latch 526, the function of compare circuits 524 is most significant on read backward. That is, during read backward, the initially received padding bytes from a residual segment should be discarded. This is done by forcing CRIC not to advance when such padding bytes are being received; i.e., all padding bytes are lodged in register 0 of MB 43. The first data byte transferred into main buffer 43 from circuits 63 is then overlayed into register 0 for subsequent readout to the I/O channel. Main buffer 43 will not read out any padding bytes since the numerical contents of CRIC equal the numerical contents of CROC; i.e., MBMT latch is active. However, when the appropriate number of padding bytes has been read, as indicated by the MOD 7 count received from register 591 equalling the addressing supplied by the FIG. 20 illustrated circuits over cable 676, the first data byte is inserted into MB 43. Compare 524 then sets allow CRIC latch 526 to the active condition. The allow CRIC signal then enables CRIC to advance such that the next subsequent data bytes are lodged into register 01, et seq. MBMT latch is reset as previously described to allow buffer readout requests to activate MB 43.

The allow CRIC latch 526 may be reset for each SIO or whenever TAPE OP is supplied to the channel by microprocessor 38. Note that allow CRIC 526 is always set whenever reading is performed in a forward direction.

It may be recalled that the MOD 32 count terminates the read operation in either direction of motion. In a similar sense, the MOD 7 count initiates readback in the backward direction.

CRC CIRCUITS

The two CRC's, CRC–1 and CRC–2, are used both during recording and readback operations. FIG. 19 shows the connections in simplified form of CRC elements for effecting CRC error detection during both recording and readback operations. In fact, the elements are shared between the two operations; hence, the circuitry of CRC 205 shown in FIG. 12 also forms a part of the write error circuits 47 of FIG. 8. The error correcting code ECC is not shown in FIG. 19 for simplifying the presentation. Elements of the data transfer path are shown for more clearly illustrating the functional interrelationships, those elements bearing the same numerals as used in other figures. Additionally, CRC elements verify proper circuit operations during both recording and readback.

The various circuits shown in FIG. 19 are used for multiple purposes. Some of the circuits are used both for generating check bit residues to be recorded with the data and/or to be used verifying appropriate proper readback of data from the tape, respectively, during the record or readback modes and also to verify proper hardware operation. Inspection of the table below will show these relationships:

| CRC CIRCUITS | RECORDER MODE | USAGE |
|---|---|---|
| 1A | Record RLL, NRZI | Generates Check Bit Residue |
| 1B | Read RLL, NRZI | Checks Recorded Check Bit Residue |
| 2A | Record RLL | Generates Check Bit Residue |
| 2C | Read Backward RLL | Checks Recorded Check Bit Residue |
| 2A 2B | Record — ALL | MB 43 Operation |
| 2A 2B | Read Backward—ALL | Do. |
| 2A 2B | Read Forward—RLL | Do. |
| 2B 2C | Record PE, NRZI | Read After Write (Verifies Recording) |
| 2B 2D | Record RLL | Read After Write (Verifies Recording) |
| 2B 2D | Read Forward RLL | Check Recorded Check Bit Residue |

Note that MB 43 operation is verified for read forward RLL separate from all other checks. The reason for this is that the data in the residual and check bit frames is loaded into MB 43 before it is known whether or not such subsystem internal data and control signals are present. That is, the length of the record is unknown; hence, it cannot be determined until after the data has been loaded into MB 43 until after it actually has been transferred. In the read backward mode, the location of such control signals is known and can be inhibited from transfer to MB 43. The term NRZI indicates recording in the American Standard NRZI 9-Track format. That recording and readback mode is not described herein. It is listed on the table to show applicability of the FIG. 19 illustrated circuits for a third record format.

During an RLL recording operation, CRC–1A and CRC–2B circuits generate check bit fields or residues based upon data signals transferred from main buffer 43 to group buffer 45. CRC–1A circuits also receive the pad bytes received in accordance with the FIG. 9 illustration. CRC–2A circuits, on the other hand, generate the CRC–2 check bit field based upon the data bytes transferred from A–0's 462 to main buffer 43 (without the pad bytes). CRC–2B circuits generate a second CRC–2 check bit field based upon the data bytes transferred from main buffer 43. Accordingly, any difference between the two CRC–2 check bit fields (CRC–2A and CRC–2B circuits) indicates an error condition in main buffer 43.

During RLL readback, of course, a complementary connection is made to ensure proper matching of the CRC–1 and CRC–2 check bit fields generated during readback with respect to those recorded with data signals. During RLL record, CRC–1A circuits 600 receive data bytes from main buffer 43 via OR's 601. The output of gating logic 44 could be routed directly to OR's 601.

During RLL record, while generating the RLL terminating portion under control of the FIG. 9 illustrated circuits, both the CRC–1A and CRC–2A check bit fields are gated to group buffer 45. CRC–2A from circuits is first gated in the byte seven position of the residual data segment. AND circuits A1 of A–0's 611 pass the CRC–2A check bit segment in joint response to the B7 timing pulse from the FIG. 20 illustrated apparatus and the gate CRC–2 signal from AND 127 of FIG. 9, as received over line 610 from write circuits 46. Check bit field of CRC–2A also goes through OR's 601 into CRC–1A circuits 600. The CRC–1 check bit field generated by CRC–1A circuits 600 travels through group buffer 45 for recording the check bit segment, as above described. To this end, the gate CRC–1 signal received over line 137 from the FIG. 9 illustrated apparatus opens AND 611 to repeatedly supply the CRC–1 check bit fields to group buffer 45.

CRC–2A circuits and the CRC–2B circuits 606 are used during the phase-encoded readback mode for verifying proper MB 43 buffering operations. Firstly, during the RLL mode, the data bytes from register 204 travel through AND-OR's 462 to CRC-1B; that is, the data bytes are on the "media side" of main buffer 43 in the same manner as the original CRC–1 check byte field was generated on the "media side" of main buffer 43 during recording. CRC–2B receives the data bytes as transferred from main buffer 43 to scan buffer 40.

Operation of the CRC circuits is in accordance with U.S. Pat. No. 3,508,194. In selected instances, CRC–2B and CRC–1B, the residue and the data being checked are both inputted to the CRC circuit. Upon completion of readback, a predetermined reference or match pattern remains. This match pattern (MP) drives compares 4 and 5 to determine proper readback. In the other instances, each of the compares 1–3, two generated residues are compared for equality. If equal, no error; if unequal, an error is indicated.

Recorded CRC–2 residue has its parity position numerical content changed in accordance with the MOD 7 residual count being odd or even. Accordingly, CRC–2C and CRC–2D circuits have associated Exclusive-OR's 634 and 635 for accommodating this change. Exclusive-OR 634 jointly responds to the $2^0$ bit position of the recorded MOD 7 residual count and the parity bit position (track 8) of the CRC–2 recorded byte to input the correct binary value to CRC–2C. AND 636 allows this action to affect CRC–2C only during backward read in the RLL mode. Exclusive-OR 635 modifies the CRC–2D generated residue in accordance with the above rules for compare with the CRC–2B supplied residue based upon the recorded CRC–2 residue.

AND-OR 637 selectively gates the compare results in accordance with the CRC table above to AND 638. AND 638 gates a CRC ERROR signal to microprocessor 38 in response to the test error signal from microprocessor 38 at EOD. Such signal is then forwarded to a connected CPU (not shown) as part of final status. Errors detected by compare 1 are forwarded to microprocessor 38 during write mode, read backward, or read forward and $\overline{\text{RLL}}$ (see A–0 639) by AND's 640.

FIG. 19 and the above logic description have avoided description of detailed timing of the CRC circuits. That is, each CRC circuit includes input gating (not shown) timed in a known manner for entering the signals checked by such circuits in accordance with the illustrated format and the CRC table. These timing control circuits have been omitted for simplifying the presentation.

TIMING AND SEQUENCE CONTROL

Referring now more particularly to FIG. 20, the generation of cycles A, B, AB, and ABC is described in simplified flowchart form. The cycle controls reside in a modified three-bit counter consisting of two-bit counter 640 with decode 641, plus C latch 642. When counter 640 is in the all-0's state, C latch 642 is reset, and three-bit counter 643 is in the seven state, wait signal 335 (FIG. 18) travels over line 644 from AND circuit 645. Wait signal 335 disables clocking circuits used to step sequences A through ABC. In the present embodiment, write clock or oscillator 74 of FIG. 9 provides the timing for readback operations. When AND 645 supplies wait signal 335 through inverter circuit 646, thence OR 78, write clock 74 is disabled. When AND 645 is inactive, inverter circuit 646 activates write clock 74 to supply timing pulses over line 647 to A–0 648. A–0 648 selectively gates the timing pulses, as will become apparent, to step three-bit counter 643 through its eight states, 0–7.

Operation of the FIG. 20 illustrated circuits is initiated by A–0 651. The A1 input portion initiates one timing cycle in joint response to GB–1 185 being full and segment buffer 207 being not full, respectively indicated by signals from those buffers on lines 652 and 653, and as previously described with respect to FIG. 18, together with the processor 38 signal on line 313 and the three-bit counter 643 count-equals-seven signal on line 654. A1 then supplies a step pulse to counter 640 incrementing it to a 01 state indicating the A cycle of FIG. 18. This action corresponds to and indicates implementation of the signal conditions at numerals 336, 337, and 338 in FIG. 18. AND 645 removes the wait signal thereby enabling write clock 74 to supply stepping pulses to three-bit counter 643. Simultaneously with stepping counter 640, the stepping pulse from A–0 651 also sets three-bit counter 643 to the all-0's state for generating sequence pulse A0. Precise timing of the timing pulses from clock 74 will vary as it has a resynchronous delay therein to ensure full energy timing pulses to be supplied to A–0 648. Such resynchronous delays are so well known they will not be further described.

Decode 641 responds to the counter 640 01 count condition to supply an A cycle indicating signal over line 655 to gate-timing array 656. Gate-timing array 656 combines the A signal with the three-bit counter 643 output timing pulses to generate pulses A0 through A7, as is well known in the data processing arts. Additionally, A signal travels through OR circuit 657 to be combined with the later-described B signal to supply an A or B signal over line 446. Additionally, the A or B signal on line 446 enables AND circuits 658 to supply address step signals 0 through 7 to the FIG. 13 illustrated apparatus and also for address selection in GB–1 185 and segment buffer 201 as referred to with respect to the description of FIG. 12.

A–0 648 passes the write clock timing signals from line 647 whenever three-bit counter 643 is not in the seven state, and the readback control signal on line 313 indicates run-length limited readback and end of data has not been detected. The A2 portion is used during recording of RLL data to step the readback circuits in a read-after-write recording verification. In such an application, write clock 74 must continuously run with A–0 648 blocking the timing pulses. Alternately, two separate oscillators or clocks are provided.

Upon completion of the A cycle as described with respect to FIG. 18, counter 643 again reaches the seven state, supplying its deactivating count-7 signal over line 654. This degates A–0 648 preventing further stepping of counter 643 until A–O 651 again steps counter 640. This action corresponds to the wait period of FIG. 18 at timing period A7. Again, when GB–1 185 is full and segment buffer is not full, as shown at 343 and 344 of FIG. 18, a second stepping pulse leaves A–O 651 incrementing counter 640 to 10 and resetting counter 643 to 0's. Decode 641 then supplies the B signal over line 659 to gate-timing array 656 for combination with the timing pulses from counter 643 for generating pulses B0 through B7. A–O 648 is again activated to pass write clock 74 timing pulses to step counter 643.

From FIG. 18, it will be remembered that B5 is also a wait period for hardware pointers or quality signals to be used with error correction. Such pointer signals travel with associated data readback signals from SKB 57 to GB–1 185. Therefore, the wait at B5 continues until GB–1 185 signals over line 652 it has received the data and pointer signals. NOT 660 inverts the line 652 signal to activate AND 661 with the B5 signal for degating A–O 648 via NOT circuit 662. When line 652 carries the GB–1 full signal, AND 661 is degated to end the B5 wait period.

At the end of the B cycle, at B7, depending upon the syndromes supplied by S2 computer 339 and parity generator 340, either the AB cycle or the ABC cycle is entered. The AB cycle, error correction signal generating cycle, can be entered irrespective of the ability of main buffer 43 to receive seven bytes of data. On the other hand, if the ABC cycle is to be successfully entered, main buffer 43 must have at least seven registers available for receiving data bytes through register 204 from the error correction circuits. If seven registers in main buffer 43 are not available, an overrun error is signaled by alarm circuits (not shown). By design choice, the ABC cycle may not be inhibited thereby allowing the ABC cycle to transfer seven bytes with any overrun being detected elsewhere.

A–O 664 controls cycle stepping and initiation to accommodate the above requirements. The A1 input portion is jointly responsive to the A–O 651 step pulse and the NOT–B signal on line 665 to allow stepping counter 640 to the A and B cycles as described above. The A2 portion of A–O 664 is jointly responsive to the A–O 651 step pulse and a later-described signal indicating not going to the ABC cycle to supply a step pulse to counter 640. This step pulse does not travel to C latch 642, leaving that reset. Accordingly, decode 641 responds to the binary 11 count state of counter 640 to supply an AB pulse over line 439 to gate-timing array 656 for generating timing pulses AB–O through AB–7 and also supplying the AB signal to FIG. 16.

The ABC cycle must be entered either from the B cycle or the AB cycle. A–O 667 determines when the ABC cycle should be entered. It is responsive to the GO ABC signal on line 556 from FIG. 16 to supply an activating signal to degate the A2 portion of A–O 664 as well as partially enable AND circuit 668 in preparation for the ABC cycle. The A2 portion of A–O 667 is jointly responsive to the AB signal on line 439 (error correction signal generation cycle) and the three-bit counter 643 equal to seven to supply the ABC activating signal. AND 668 inhibits initiation of the ABC cycle until main buffer 43 is ready to receive seven bytes of data. In this regard, buffer controls 42 supply a "get seven" signal over line 587A (FIG. 17) to enable AND 668 to supply a stepping pulse for initiating ABC cycle over line 669. For a design choice mentioned above, AND 668 is dispensed with to allow ABC cycle irrespective of main buffer 43 operation.

The ABC stepping or initiating signal sets C latch 642 and simultaneously completes the activation of the A3 input portion of A–O 664 to step counter 640 from the B state (10) to the AB state (11). Counter 640 in the 11 or the AB state and latch C being active indicates the ABC cycle. AND 670 combines the AB signal on line 439 and the C latch 642 active signal to supply an ABC signal over line 431 to circuits in FIG. 16. Additionally, ABC timing pulses 0–6 transfer data from segment buffer 201 to error correction Exclusive-OR circuits 202 (FIG. 16 Exclusive-OR's 420–427), thence to register 204 and main buffer 43. The ABC 0–6 indicator signal on line 673 is generated by AND 672 in response to the C signal on line 674 and the NOT–7 signal generated based upon the counter 643 K=7 signal. The latter may be replaced by the gate-timing array timing pulses ABC 0–6.

At the end of the ABC cycle, FIG. 20 circuits are reset to enable a new A cycle to be initiated. A–O 675 A1 portion is jointly responsive to C latch 642 active signal on line 674 and counter 643 K=7 signal on line 654 to reset C latch 642 and counter 640. Not shown in FIG. 20 are some of the cooperative relationships and sharing of the circuitry in the write mode. For example, three-bit counter 643 can be binary counter 76 of FIG. 9. Two counters are shown for simplifying the presentation. Also not shown is generation of a "BA 07" resetting pulse. Such a resetting pulse can be generated by activating a single-pulse generator by an ABC–7 timing pulse.

The buffer addresses used in A and B cycle described with respect to FIG. 18 are also generated by three-bit counter 643. It will be remembered that each group of data signals is transferred during timing periods 0–3 respectively of the A and B cycles. The data bytes transferred during A0 through A3 reside and are stored in buffer registers having addresses 0–3. However, during the B cycle, the four data bytes being transferred should be fetched from and stored in buffer registers having the addresses 4–7 and be transferred cycle cycles pulses 0–3. Three-bit counter 643 supplies its signals as the buffer address over cable 676 to the FIG. 17 illustrated apparatus. Additionally, the digit position binary value $2^2$ is supplied to OR circuit 677. OR circuit 677 combines the B signal on line 659 with the three-bit counter 643 signal $2^2=1$ to provide the addresses 4–7 during the first four cycles 0–3 of each B cycle. The $2^2$ bit position of counter 643 equals 0. By supplying the B signal through OR 677, it appears as a 1 and, hence, the addresses are shifted from 0–3 to 4–7.

PHASE-ENCODED OPERATIONS

The present invention permits extensive duplicate usage of circuitry, both during recording and readback between the RLL modes of recording and readback and the phase-encoded (PE) modes of recording and readback. Generally, one byte of PE data is treated in a manner similar to one group of RLL data signals. It will be recalled that the format signal groups of RLL will process while using only the A cycle of the timing control. In a similar manner, during PE readback, only the A cycle is used, each A cycle capable of transferring one PE of PE data signals. In a similar manner, during recording, each byte of PE data to be recorded is treated in the same manner as a group of RLL signals. That is, the various group buffers are controlled such that one byte of data is stored therein in one of the registers indicating that the buffer is full. As described with respect to FIG. 19, CRC action not only checks the RLL operation, but also the PE operation even though none of the CRC residues are recorded along with the PE signals. Additionally, the error correction circuits are shared to a large extent even though the error correction techniques in PE and RLL mode are quite different. Pointer circuits 197 are used both for RLL and Pe as has been described. FIG. 21 shows in simplified form selected circuit connections for processing PE signals through the readback system shown for RLL in FIG. 12. The remaining connections are illustrated in the other figures. From examination of the table below, it is seen that there are certain similarities between the PE and Rll formats.

Format Comparisons

| | | | | |
|---|---|---|---|---|
| 000 | 0001D | D 10000 | 000 | PE |
| 111 | 1110D' | D'01111 | 111 | PE' |
| 101011 | 111 00111 D | D 11100 111 | 1110101 | RLL |

It is seen that the preamble and postamble of PE are the inverse of a portion of the RLL preamble and postamble; that is, PE has strings of O's, while RLL has strings of 1's (plus alternating 1's and 0's). Accordingly, by inverting or complementing the PE signals between sense gate and detect circuits 56A (all of the circuitry between transducer 51 and detector 56 of FIG. 12), and decoder 60 to PE, the same controls based on Rll 1's are usable for PE' 1's (PE 0's). Hence, format detection and controls are shared. The PE' portion of the readback circuits is labeled in FIG. 21 wherein the format PE' in the above table represents the signals in this portion. This inversion or complementation enables using the gated step RIC circuit 175 of FIG. 14 without modification for both PE and RLL readback. This coordination between the two different formats enables a greater reliability in that the processes involved for RLL are designed for a higher recording density than for PE, enhancing readback of PE signals. The transfer of PE signals (PE' is changed to PE in decoder 60) between decoder 60 and main buffer 43 includes imposing PE controls over the ECC circuits in the buffers for ensuring that one byte of data is transferred and error corrected in the same manner as contemplated for PE readback circuits specially designed for that mode. Additionally, buffer 185 is treated quite differently in order to transfer one byte of data to decoder 60 each time SKB 57 reads out one byte as opposed to waiting until a group of five bytes has been transferred. The additional circuitry associated with buffer 185 and SKB 57 is included in dash box 700 along with buffer 185. Conversion from PE to PE' format is accomplished by the simple circuitry included in dash box 701 interposed between sense gate and detect 56A and SKB 57. The above description assumes that the track widths and spacing on media 25 are the same for RLL as they are for PE. In this manner, the same transducer 51 may be used for recording and reading back both RLL and PE recording. Because of the difference in density, the requirements for transducer 51 to accommodate both PE and RLL encoded data on media 25 will be more stringent than that found in those transducers used only with PE recording. Known design techniques for making heads and readback amplifiers for such wider-band usage is beyond the scope of the present invention and is not described for that reason.

The operation of detector in 56A, between RLL and PE recording, is a simple control well known in the art and not further described. The PE encoded data can be treated as NRZI. In this regard, the commonly assigned copending patent application, Ser. No. 197,906, filed Nov. 11, 1971, abandoned, illustrates the conversion of detector operation between PE and NRZI. Those tehcniques are applicable to the present detector 56A.

The conversion between PE and PE' data format is accomplished by circuits 701. In the RLL Mode, the format is not inverted; rather, it is transferred through AND's 702 which are opened by the RLL read mode signal on line 313. The detected 1's signals are transferred through AND's 702, thence OR's 703 to SKB 57 as shown in the documents incorporated by reference. During the PE mode, AND's 702 are disabled while AND's 704 are opened by the PE read signal received from processor 38 over line 192A. AND's 704 respectively for each track receive the inverted PE readback signals from inverters 705, pass them through OR's 703 to SKB 57. All the 0's in the PE mode will then appear as 1's between inverters 705 and decode 60. As previously described with respect to gated step RIC 175, a string of ten 1's will indicate that a preamble, postamble, or synchronization pattern has been read. In addition, sense gate and detect circuits 56A will detect a long wavelength characterizing beginning of data as has been done for several years in PE recorders.

The deskewed RLL signals from SKB 57 are processed as described with respect to FIG. 12. In the case of PE, the PE' signals are assembled in SKB 57 in the same manner as for RLL. Whenever a byte is assembled, and buffer 185 is empty, that byte is transferred in parallel basis along with the pointers from sense gate detector 56A to buffer 185. During the initial readback portion, five bytes of PE' data are assembled in buffer 185 yielding a buffer-full signal traveling over line 706 to set BF (buffer full) latch 707. This action removes an activating signal from line 708 informing SKB 57 to transfer no more data signals. The assembled five bytes of data in buffer 185 travel over cable 224 to decode 60. The lines in cable 224 receive the input signals from a highest number buffer register, i.e., the register containing the first received data byte from SKB 57, to form cable 224A for transferring PE' signals to inverter-gate circuit 709. The lines in cable 224 including those lines from the other four registers of buffer 185 are applied to format circuit 710 and RLL decode circuits 711. The latter circuits are also shown in FIG. 13. Because of the PE mode signal on line 192A and the absence of the activating RLL mode signal on line 313, RLL decode 711 and the RLL portion of fromat circuit 710 are inactive. The PE portion of format circuit 710 senses for all 1's in buffer 185 in the same manner that the end of data signal for RLL was sensed. That is, the postamble consists of all 0's and appears in buffer 185 as PE' signals of all 1's. When there are four registers of all 1's, together with the first register containing all 0's, end of data is signaled for PE mode by format circuits 710. The beginning data mask is indicated by all 1's in four registers and all 0's in the register receiving signals from SKB 57. Other criteria for indicating end of data may be used. Circuits 710 may contain several registers (not shown) and sensed for all 1's in addition to registers in GB 185. For example, circuits 710 may contain six registers requiring an all-0's mask plus ten 1's — the same criteria for detecting beginning of record. The exact criteria is a design choice.

The only portion of decode 60 operating for data transfer during the PE readback mode is IG 709 which inverts the PE' signals back to PE for transmittal through AND gates 712 and cable 189. The PE signal on line 192A opens AND gates 712 to pass received PE signals on a byte-by-byte basis through OR circuits to register 191. The activating RLL mode signal on line 313 is absent thereby degating signals received over cable 190.

Once the first byte of data has been transferred from buffer 185 through IG 709, a buffer-empty signal is generated in BF 707. To this end, AND circuit 714 is jointly responsive to the PE signal on line 192A and the signal from SKB 57 traveling over line 715 signifying that a read ROC cycle has been accomplished and to the signal from format circuits 230 indicating "PE mode and data transfer" to set BF 707 to the active condition. This removes the activating signal from line 708 thereby degating further transfers from SKB 57 until the completion of the next A cycle. This action limits transfers to one byte at a time, rather than in groups of five bytes.

Initiation of the A cycle illustrated in FIG. 21A results from buffer 185 full signal and the buffer 201 empty signal (201 full inactive) which occurs during 34 of each A cycle. Refer to FIG. 18 and associated description for operation thereof. The A cycle signal signifies to the FIG. 20 illustrated apparatus that an A cycle is to be performed.

The 201 read pulse, which transfers a byte of data from segment buffer 201 through Exclusive-OR's 202, resets the buffer 201 full indicator (not shown), releasing buffer 185 to receive one more byte of of data. Buffer 185 being full will transfer one byte of data through IG 709 to register 191 during the 201 write pulses during the subsequent A cycle. As soon as 185 full signal is removed, BF 707 is reset enabling SKB 57 to transfer one more byte of data to buffer 185.

Buffer 185 preferably consists of nine five-bit shift registers, one shift register for each of the tracks, the five bit positions corresponding to the five bit positions of storage code groups. As soon as SKB 57 transfers a nine-bit byte, all of the data in the shift registers is shifted one digit position, as is well known in the art.

FIG. 21A is abbreviated for a one-byte data record. In the section entitled BOD (beginning of data), the A cycle transfers the all-1's mark of PE signifying beginning of data. The all-1's byte is transferred from buffer 185 during the data byte A cycle. The data byte is transferred to segment buffer 201 during A cycle EOD (end of data). At this time, the ending all-1's mark is transferred from SKB 57 to buffer 185; that is, buffer 185 has received this data and is ready to transmit it through IG 709. MB 43 write signal, occurring during period 2 of EOD A cycle, transfers the one byte of data in this record through register 204, hence A–O's 462, as described with respect to FIG. 17.

Examination of the FIG. 21 illustrated timing chart, together with the previous description of FIG. 20, will show the timing relationships between SKB 57, buffer 185, decode 60, register 191, segment buffer 201, ECC circuits, and MB 43.

Error correction of PE uses the same error correction circuits as used for RLL. The S1 computer is used for generating parity, while the S2 computer (FIG. 16) is inhibited by the PE signal on line 192A. Generally, the S1 computer relates to error conditions across the tape while the S2 computer has a relationship of the tracks in error. By forcing the S2 computer to a reference state, preferably all 0's, it appears to the error correction circuits 196, 200, that the S1 syndrome from S1 computer will determine which byte is to be corrected, the track or bit is selected by a pointer signal from pointer circuits 197. Pointer circuits 197 act in the same manner that deadtracking error indicators act as described in the Miller patent, supra, with respect to a deadtrack control. A–O 361 A1 input portion (FIG. 16) passes decode 360 output signals during RLL mode (line 313) to skip AB 353 and error circuit 365. Decode 360 decodes S2 and S1 to ascertain S1=Sz=0, S1 ≠ S2, etc., for indicating error conditions. During PE readback, the A2 input portion of A–O 361 passes all 0's for forcing a maximum one TIE indication, it being remembered only one TIE can be corrected. Multiple track errors can be detected via count pointer circuit 391 indicating more than one TIE over line 397.

Since one byte of data is transferred through all of the circuits between register 191 and register 204 during a given A cycle, special controls are needed to accommodate this change from transferring eight bytes to transferring one byte. To this end, A–O 718 normally passes the ABC pulses under influence of the RLL signal on line 313 to control the addressing of segment buffer 201, as well as the S1 computer. The A2 portion of A–O 718 passes the A2 pulses from FIG. 20 illustrated apparatus activated by the PE signal on line 719 as will be described. The effect of the PE control is to force all bytes from register 191 into register 2 of segment buffer 201. The addresses held are not incremented. Accordingly, when buffer 201 is read out, only register 2 is read into Exclusive-OR's 202. In a similar manner, S1 computer is activated only for the register 2 which corresponds one-for-one in the S1 computer with the segment buffer 201 registers. That is, there is one parity generator in S1 computer for ach of the registers in the PE mode. Only the parity generator for register 2 is utilized. This parity signal is supplied to ECC circuits 195, 200 in the same manner as heretofore used with respect to PE recorders. The pointer circuits supply a pointer as above referred to with respect to FIG. 15; that is, selected pointers are utilized for error correction purposes. The corrected data signals on a byte-by-byte basis are transferred through register 204 to main buffer 43. The selected pointers may be the valid pointers, hardware pointers, persistent pointers, or a gated sequence of same in accordance with PE error rates at the time the pointers are being gated.

The format control 230 is very simple for the PE mode. It merely distinguishes between the data times and the postamble times when format circuits 710 and decode 60 detect the first all-1's byte, that is, the beginning of data marker, the PEM (phase-encoded mark) 720 is set to the active condition and supplies its activating signal to AND 714 for operating BF 707 as previously described. PEM activating signal is also supplied to set PED (phase-encoded data) latch 721 to the active condition during the A5 A cycle time. Remember, detection of the format group activates the A cycle as previously mentioned. In this regard, AND's 722 are jointly responsive to the A5 signal and the PEM signal to set PED. PED signal opens the A2 portion of A–O's 462 for passing the PE data to MB 43. Additionally, the active signal, jointly with signals A2 and the PE signal on line 192A, activates AND 723 to initiate an MB 43 write as shown on FIG. 21A.

When PE EOD is detected by format 710 and decode 60, the activating signal on line 725 resets PEM latch 720. This resetting is delayed by one A cycle to allow the transfer of the last data byte during the EOD A cycle to MD 43. AND 726 is jointly responsive to the A5 cycle during EOD A cycle and PEM inactive to reset PED thereby terminating all data transfers in the PE mode.

Detector 56A can be selectively operated to emit a "one" signal for representing either ones (RLL) or zeroes (PE' signals) as shown by Fiorino, supra. In a practical embodiment, it would be preferred to substitute a modified circuit detector operation rather than interleave circuits 701 between detector 56A and SKB 57. Also, any form of detection may be used with the output signals being selectively complemented in the PE mode as above described.

TWO-FORMAT CONTROLS — FIG. 21

While format controls 230 have been described with respect to FIGS. 13 and 13A, a more detailed discussion of a circuit arrangement used in both PE and RLL modes illustrates the commonality and utilization of electronic circuits for both modes with respect to record format detection and control. Referring back to FIG. 13, that portion in the upper righthand corner of format controls 230, including 1's group latch 254, for use with both PE and RLL, includes the circuitry shown in FIG. 22 in simplified diagrammatic form. First, the PE mode format detection and control operation will be described; this includes detecting the beginning of data and then the end of data (EOD). This description is followed by a description of the RLL mode format detection and control operation wherein the beginning of data is detected, resynchronization burst are detected, and, finally, the endof data indicating all-1's group is detected followed by detection of the mark-2 signal and the postamble.

PE FORMAT OPERATIONS

In PE recording format, while reading in either direction, a string of 40 0's in each of the nine tracks is followed by an all-1's mark. The all-1's marker signal, which is also a valid data character (as will be later discussed), denotes beginning of data. In the preferred form, the detected PE all-1's marker signals are supplied from read circuits 63 (FIG. 12) to register 204. From register 204, all of the signals are supplied to the PE 1's circuit 750, which detects the all-1's byte (1's in each of the nine tracks). Circuit 750, upon detecting an all-1's byte, emits an activating signal to the A2 input portion of A–O 751. The PE mode indicating signal on line 192A gates this signal through A–O 751 to set begin-mark (BGN MK) latch 752. This denotes beginning of data in the PE mode. Begin-mark latch 752 supplies its activating signal to AND 753 for setting in-data latch 757. AND 753 responds to the begin-mark latch 752 active signal, the signal indicating PE mode, and the reset signal from latch 754 (later described) to set in-data latch 757 via AND 755. AND 755 passes the latch 766 reset signal only after BGN MK 752 is set to the active condition. In-data latch 757 replaces the PED latch 724 of FIG. 21. The active output signal from latch 757 can be applied to AND 723 for initiating an MB 43 write signal (FIG. 21).

Detecting end of data in the PE mode requires detection of the all-1's mark or byte followed by a series of all-0'o's bytes which are either in the postamble or preamble. In the FIG. 22 illustrated apparatus, this is done in three cycles.

Cycle 1: Detect all-1's byte in register 204. Detect all PE 0's in GB 185. (0's in PE' are all 1's)

Cycle 2: Detect all PE 0's in GB 185. (Six PE all 0's are detected)

Cycle 3: Detect all PE 0's in GB 185. (Seven PE all-0 bytes in a row have been detected)

Upon completion of the above-described three cycles, end of data (EOD) is detected. It must be remembered that circuit 701 (FIG. 21) inverts the PE signals from 0's to 1's (PE') before supplying same to SKB 57. Also, remember that SKB 57 supplies one byte at a time to GB 185. The data patterns in register 204 and group buffer 185 are set forth in the chart below. Time is increasing from the top to bottom of the chart, and data is shifted from right to left.

PE — Detect End of Data

| TIME | REG 204 PE | Group Buffer 185 PE' Signals | | | | |
|---|---|---|---|---|---|---|
| Data | D | 0 | 1 | 1 | 1 | 1 |
| End 1's | 1* | 1 | 1 | 1 | 1 | 1 |
| Postamble | 0 | 1 | 1 | 1 | 1 | 1 |
| Postamble | 0 | 1 | 1 | 1 | 1 | 1 |

The letter D indicates data byte, and the 0's and 1's indicate, respectively, all-0's or all-1's preamble or postamble bytes. Note that in the GB 185 there are PE' signals which are the complement of the actual PE signals being transferred. For example, in the second line of the chart, the 1* in register 204 is represented as a 0 in GB 185 when the last data byte is in register 204.

The circuit action which accomplishes the detection of the PE EOD is initiated by PE 1's circuit 750 supplying its activating signal to AND 760. AND 760 is activated by the in-data latch 757 active signal and the PE mode signal on line 192A, plus the circuit 750 active signal. AND 760 then sets end-1's latch 761 signifying that an all-1's PE byte has been detected after begin-mark latch 752 has been set; i.e., end of data may be occurring. End-1's latch supplies its activating signal to the A2 input portion of A–O 762 where it is passed as EOD whenever an all-1's group signal from AND 248 of FIG. 13 is received. From the above chart, note that with PE all 1's in register 204, group buffer 185 is filled with all-1's bytes of PE' signals.

For detecting EOD, A–O 762 supplies its active signal through the A1 input portion of A–O 763 where it is gated by the PE mode signal on line 192A for setting the five-1's latch 754. Setting latch 754 deactivates AND 773, but provides no further action.

Additionally, A–O 762 active output signal enables AND 765 pass the begin-mark latch 752 active signal to set resync latch 766. Resync latch 766 is used primarily for RLL mode, but receives dual usage during the PE mode EOD detection. Resync latch 766 being set, resets in-data latch 757 and simultaneously partially enables AND 770 of the EOD indicator circuits, later described.

At this time, if there are not all 1's of PE' signals in all five nine-bit registers of group buffer 185, no active signal is supplied in the 1's group line from FIG. 13 and 248. Hence, A2 input portion of A–O 762 is enabled; and the five-1's latch 754 will not be set. Accordingly, if the 1's group signal is not present for three cycles, it is not EOD. In this case, latch 754 remaining reset partially enables AND 773. When main buffer 43 (FIG. 17–2) acknowledges a write request over line 511, the MB43WR signal, AND 773 supplies an activating signal through OR 774 resetting end-1's latch 761. This signifies that the all-1's byte detected by circuit 750 is a data byte and not a format byte.

When there is an actual EOD, the 1's group signal from AND 248 of FIG. 13 is repeatedly active. Then, A2 portion of A–O 762 passes the end-1's signal from latch 761 through A–O 763 to set latch 754. The next step is to count the number of cycles or bytes of all 0's. Group buffer 185 has all 1's in PE' signals corresponding to all-0 bytes in the PE postamble or preamble portion of the data format. In this regard, resync latch 766 being set has partially enabled AND 770. Each 1's group signal from AND 248 (FIG. 13) for each cycle of readback, i.e., as described previously for FIG. 21, passes through AND 770 to increment counter 771. By definition, when counter 771 has reached a count of K=3, EOD is signified by setting EOD latch 772. Referring to the chart above, the first EOD detection cycle corresponds to the second line from the top wherein group buffer 185 has five all-1's bytes. At the end of that cycle, the all-1's byte on the left is shifted into register 204 as a PE all-0's byte via the error correction circuits shown in FIG. 21. SKB 57 supplies an additional all-1's byte in the rightmost position of the chart. This is done three times for testing seven consecutive all-0's bytes following detection of the all-1's byte in register 204 for signifying EOD. EOD 772 output signal is sent to microprocessor 38 for its action.

RLL FORMAT OPERATIONS

In the RLL mode, similar operations occur. In addition, resynchronization bursts must be accommodated. Accordingly, the description of the RLL mode will include the start-up procedure, i.e., detect beginning of data by the mark-1 signal of the RLL format, detection of beginning and end of the resynchronization burst, and finally detection of EOD which is signified by the EOD all-1's group plus residual and CRC segments followed by a mark-2 signal group. To detect beginning of data, the FIG. 13 illustrated circuits detect the mark-1 signal which signifies RLL beginning of data. The mark-1 signal from AND 246 of FIG. 13 passes through the A1 input portion of A–O 751 as enabled by the RLL read mode signal on line 313. A–O 751 signal sets begin-mark (BGN MK) latch 752 as was done in the PE mode. Additionally, when the A–O 751 signal is active, OR circuit 767 supplies a resetting signal to resync latch 766. This action resets resync latch 766 which, in turn, sets in-data latch 757 via AND 755. It must be remembered that when reading backward, mark-2 signal groups are read as mark-1's and vice versa; i.e., the marker groups are symmetrical.

Detection of EOD in backward RLL read is done in similar fashion. Caution must be exercised in handling the end of data all-1's group in that the first encountered resynchronization burst could indicate EOD. In this regard, during backward read RLL, the EOD all-1's group is ignored with EOD indicated solely by a mark-2 format signal group followed by three all-1's groups. For purposes of simplicity, detection of EOD in the forward direction only is described.

A resynchronization burst is signified in the forward direction by a mark-2 signal followed by a burst of two groups of all 1's. In this regard, the mark-2 signal from AND 247 of FIG. 13 is gated by the RLL mode signal on line 313 through the A1 input portion of A–O 762 to set resync latch 766. AND 765 passes the A–O 762 signal after begin-mark latch 752 has been set. This action resets in-data latch 757. AND circuit 770 and counter 771 are now activated to count the number of all-1's groups as indicated by the 1's group signal from AND 248 of FIG. 13. In case of resynchronization, two such 1's groups are detected making counter 771 group tally equal to two. Then, a mark-1 signal is received signifying beginning of data. Then, the action follows the above description for A–O 751, begin-mark latch 752, resetting resync latch 766 which, in turn, sets in-data latch 757. This action supplies an activating signal through OR 775 resetting counter 771 to zero. This action prepares the just-described circuits for detecting a mark-2 signal and determining whether or not a resynchronization burst or EOD is being encountered.

EOD in the forward read RLL mode is signified by detection of the EOD 1's group, the residual and CRC segments which do not enter into format operation, followed by a mark-2 and the postamble portion of all 1's. In this regard, the 1's group signal from AND 248 travels to A2 input portion of A–O 763. Latch 757 indicates data is being read and line 313 signal signifies the RLL mode. With these conditions, A2 input portion of A–O 763 detects that the EOD all-1's group is being encountered. A–O 763 then supplies its activating signal to set latch 754. This removes the activating signal from AND 753, and the latch being set signifies that the terminator portion of the RLL format is being processed.

After processing the residual and CRC segments, format circuits 230 supply the mark-2 signal via AND 247 signifying beginning of the EOD detection. A–O 762 then sets resync latch 766 as previously described. This action resets in-data latch 757. Resync latch 766 being set partially enables AND 770 as described for the PE mode. Following this partial enablement, three 1's groups of data are detected in group buffer 185, incrementing counter 771 to three. When counter 771 has reached a count of three, three postamble groups each having five all-1's bytes have been processed through SKB 57 to group buffer 185 and detected by format circuits 710, all in FIG. 21, and as shown in detail in FIG.

13. At this time, the K=3 active signal from counter 771 sets EOD latch 772 signifying EOD has been reached.

Transfer of RLL encoded signals from SKB 57 to GB 185 is preferably on a byte-by-byte basis. When GB 185 has received five bytes, it generates a GB 185 full signal in a known manner. This signal holds SKB 57 from transferring more signals until decode 60 has processed all of the GB 185 contained signals.

It should be noted that when the tape subsystem is being initialized, the signal not TAPE OP on line 749 resets all of the latches to the reset or reference signal state. OR 780 passes either not TAPE OP signal or the resync latch 766 active signal to reset the in-data latch 757.

The data signal handling circuits are conveniently gated and degated when the encoder-decoder of Irwin U.S. Pat. No. 3,624,637 is used. For RLL mode, the encoding and decoding is accomplished in accordance with that patent. Other circuit portions handle either four or five bit signal groups per channel. For PE mode or any other single byte per cycle transferring the decoder, encoder and all other circuits are degated (inactivated), except for those portions corresponding to five-bit group digit positions C and position 4 of the four-bit groups. These bit signals are exchanged through the encoders and decodes without change; and, hence, enables single signal transfers through signal group oriented circuits with minimum control circuits.

The above description is a greatly simplified version of how two formats can be processed by essentially one set of circuits for two radially different signal formats.

While the invention has been particularly shown and described with reference to preferred embodiments thereof, it will be understood by those skilled in the art that various changes in form and detail may be made therein without departing from the spirit and scope of the invention.

What is claimed is:

1. A readback system for a multitrack record member, means for sensing recorded indicia in each of said tracks and supplying readback signals, each record on said member arranged in segments and groups of plural signals, and a pair of count fields, first means for detecting said readback signals and arranging said readback signals in bytes;

the improved system including in combination:

second means grouping said arranged signals into record segments and groups;

first counting means counting the signal bytes in each of said segments;

second counting means having a modulus greater than said segment modulus for counting said bytes during readback;

means reading said count fields from said record corresponding to said counts respectively in said counting means upon completion of reading a record;

means comparing, respectively, said count fields to counts in said counting means for indicating quality of readback; and one of said counting means counting to an odd total and another counting means to an even total.

2. The readback system set forth in claim 1 including means detecting an end of data mark in said readback signal;

means responsive to said end of data mark to process one record signal segment including one of said count fields indicative of the number of data bytes in said one segment plus a second of said count fields having a modulus different from said one segment count field; and means in said comparison means responsive to said count fields and to said odd/even count totals to indicate a format error condition.

3. The readback system set forth in claim 2 capable of reading in forward and backward directions of relative tape motion with respect to a sensing transducer, including buffering means having a reference register and a buffer counter and receiving said bytes of data and having a modulus which is an integral multiple of said second count field such that the second count field indicates a number of registers filled in a forward direction in said buffer upon detection of said end of data mark and a buffer address of the first byte when reading in backward direction such that the last data byte resides in said reference register of said buffer.

4. The readback system of claim 3 wherein said buffer size is equal to the modulus of said second count field such that said count fields establish a buffer address for the last recorded data byte in each record.

5. The readback system set forth in claim 4 further including resync means, and means in said resync means to momentarily inhibit both said counting means, and means in said first detecting means responsive to said resync means to realign said readback signals from the individual tracks for ensuring proper byte assembly.

6. The readback system set forth in claim 5 wherein said buffer counter has a modulus smaller than the number of registers in said buffer, and said count field indicating the number of empty registers to the given modulus, and means in said readback means for indicating other registers which contain data.

7. The readback system set forth in claim 1 further including mode set means between block codes and byte codes, and means operative with said second means for transferring one byte of byte-coded data corresponding to one group of block-coded data.

8. The system set forth in claim 1 wherein said first count field is to a modulus seven representative of seven bytes in each data segment and the second count field is modulus 32, means combining said count fields for indicating an appropriate indeterminate record length.

9. The method of transferring a record of indeterminate length as a plurality of fixed-length code segments, each code segment containing a predetermined number of bits with the total number of bits to be transferred capable of being other than an integral multiple of the number of bits in said code segments, including the steps of:

first counting the number of bits in each code segment as transferred;

establishing a second count of a modulus greater than one of said code segments and arranged with the code segment count such that successive ones of said code segments yield a total of said counts that is alternately odd and even;

transferring all of said code segments until the remaining data to be transferred is less than said predetermined number of bits (residual data) and then transferring a residual code segment having less than said predetermined number of bits of residual data bits, then filling out said residual code segment with other bits until said predetermined number of bits equals the sum of residual data bits and said other bits;

imposing an eeror detection and correction scheme on the transferring of signals by transferring check bits with each of said code segments which are check bits independent of each and every other code segment and, while transferring the signals, generating cyclic redundancy for the data bits independently of said code segment checking; and after transferring said residual segment, transferring a check bit code segment including a number of said cyclic redundancy check bits and checking the cyclic redundancy checks with said code segment check system as used for the data bits.

10. The method set forth in claim 9 further including establishing storage coded values representing a given number of data processing coded values in each of said fixed-length code segments and exchanging same with a magnetic record member, and while so exchanging the signals, establishing first and second counts each of different modulus and comparing the counts at least once during a signal transfer for verifying proper fixed-length code segment transfers.

11. The method set forth in claim 10 wherein said first count field has a first modulus not greater than said given number and said second count field having a second modulus greater than said given number.

12. The method set forth in claim 11 including checking the total of said counts in the count fields during each transfer of each code segment and requiring that the totals be alternately odd and even for indicating error-free transfer of data signals.

13. The method set forth in claim 12 further supplying first and second counts at one end of a record transfer in a predetermined relationship with said check bit code segment including converting said counts into said storage coded values and checking and correcting same by said error detection and correction scheme.

14. The method set forth in claim 9 further including monitoring said signal transfer of each of said fixed-length code segments and establishing signals indicative of the quality of signal transfer for each of said respective segments, memorizing for a given number of said segments when one of said segments has a low-quality signal, monitoring said error correction scheme and combining indications of errors indicated by said correction scheme with said quality signals to further memorize an error condition, tallying, for a limited number of segments, the number of successive segments in error and establishing a persistent error condition for a given number of said segments upon said limited number being exceeded.

15. The method set forth in claim 14 further encoding said data bits into fixed-length storage code group values and, during the transfer, monitoring the validity of said code group values and generating an error indicating signal in response to an invalid code value, and combining said indicated invalid code value with said low-quality signal for indicating an error condition.

16. The method of terminating a record block for a multitrack magnetic tape system for recording a record of indeterminate length into a record having a plurality of record segments of fixed number of code elements wherein the number of code elements in a record block may or may not be an integral multiple of said fixed number, including the steps of:

determining when the remaining code elements in said record of indeterminate length are less than said fixed number;

automatically recording a marker signal group indicating the last full record segment has been recorded and designating remaining code elements as residual data;

automatically generating and recording a residual record segment including generating a first signal code element, automatically recording error detection and correction bits on said residual data and said first signal code element, automatically recording said first signal code element in a record segment having a preset geometric relationship on the tape to said recorded residual code elements, automatically filling in said residual record segment with other code elements up to said fixed number of code elements;

automatically generating a check bit record segment including a set of cyclic redundancy check bits for said data bits in said record block, automatically recording error detection and correction bits based upon said cyclic check bits; and automatically recording said check bit record segment including said checking bits for checking the cyclic redundancy check bits.

17. The method set forth in claim 16 further including automatically counting said code elements for establishing a residual count having a modulus greater than said fixed number and then automatically recording said residual count with said first signal code element; and automatically establishing signal transferring operations including buffering operations and automatically comparing a residual count of said buffering operations with said recorded residual count for verifying proper operation of said buffering.

18. The method of generating blocks of data bits for an indeterminate length record with the record being coded in fixed-length record segments, each record segment including error detection check bits and a fixed number of other code elements including said data bits which may include some of said check bits, the improvement including the steps of:

automatically sequentially generating signal record segments with check bits of fixed number of bits until the remainder of said other code elements is less than said fixed number;

automatically generating a marker code group signal indicating the last full record segment has been generated; and automatically generating a residual signal record segment including all of said remaining code elements less than required for constituting a full record segment, automatically generating a count field signal indicating the number of code elements in the residual record segment, automatically generating check bit signals for the residual data signals and for said count field signal, and supplying said residual record segment signal adjacent said marker code group signals together with said count field signals and last-mentioned check bits.

19. A readback system for a digital multitrack record member;

means for sensing recorded indicia in each of said tracks supplying readback signals representative of such recorded indicia, each record on said member arranged in segments in groups of plural recorded digital signals;

first and second count field signals recorded with said records, said first count field having a modulus less than a fixed number of code elements recordable in each of said segments, and said second count field having a modulus of a second fixed number which is greater than the first-mentioned fixed number;

first means for detecting said readback signals and arranging said readback signals into said groups and segments;

the improved readback system including in combination:

buffer means receiving signals from said first means and having a number of registers for storing a plurality of digital signals and further including counting means capable of exhibiting a count representative of said first and second count fields recorded with said digital readback signals and also simultaneously indicating a register within said buffer means corresponding either to a first-received signal or a last-received signal and comparison means receiving said recorded second count field and said second count from said counting means for verifying said readback operation.

20. The readback system set forth in claim 19 wherein said buffer means has a plurality of registers and said recorded count designates the last register to contain a code element during readback in a first direction and a first register to contain a code element during readback in the opposite direction of relative media motion.

21. The readback system set forth in claim 20 wherein said system has multiple track record media substantially simultaneously sensing signals recorded thereon, each code element being one set of signals being recorded substantially transversely across the media, one bit element of each code element being seven of said code elements representing digital data signals and an eighth code element representing error detection and correction check bits, said code elements being further encoded into a run-length limited code lying along the respective tracks wherein four of said elements are respectively represented on the media by five bit positions in the respective tracks; and said buffer means having 32 buffer registers and counting means the modulus of 32.

22. The readback system set forth in claim 19 wherein a first one of said segments includes a number of said code elements indicated by said first count field signals, the improvement further including signal transfer control means responsive to said first count field as read back from said media for causing said buffer means to discard signals in said one segment other than said number of code elements.

23. The readback system set forth in claim 22 wherein said first one and a second one of said record segments respectively contain check bit field signals and including said first and second count field signals, error correction means responsive to recorded check bits in said first and second record segments to error correct said first and second count fields, and means comparing one of said count fields with a count field generated in said readback system by said buffer means for indicating proper operation of said readback system including said error correction means.

24. A digital recorder having transducing means for exchanging signals, including data signals, with a record member, the improvement including in combination:

first means allocating a fixed given number of data signals to a set of signals for being serially exchanged with said record member;

second means indicating less than said fixed given number of said data signals;

third means altering operation of said recorder in accordance with said second means indication for exchanging one set of said fixed given number of signals with said record member, including less than said fixed given number of said data signals; and connection means operative with said first, second and third means to exchange data signals therewith.

25. The digital recorder set forth in claim 24 further including fourth means operatively connecting said second means to said transducing means for generating and exchanging control signals therebetween representative of said indication; and timing means in said fourth means establishing a fixed timed relationship between said control signals and said less than the fixed given number of data signals.

26. The digital recorder set forth in claim 25 further including:

data signal exchange control means tallying signal exchanges between said transducing means and said connection means up to a modulus greater than said fixed given number;

means exchanging a second number representative of said tally with said transducing means in accordance with said timing means in a fixed time relation to said control signal exchange; and said third means further responsive to said second number to control operation of said connection means in accordance with the magnitude of said second number.

27. A system for generating error detecting code bits for a data block, including the combination:

error checking means for generating a check bit residue;

means for dividing the data block into fixed length record segments, each record segment having a first number of data bits with the number of bits represented by a first count;

means for establishing a second count having a modulus other than said first count, and said second count having a relationship with respect to said first count such that the count totals alternate between odd and even sums in successive occurring record segments; and means responsive to a last one of said record segment sums being odd or even and to the data in said record segments within said block to generate a check bit record segment having first or second signal characteristics irrespective of checking functions performed thereby and in accordance with said last sum being odd or even.

28. The system set forth in claim 27 further including parity checking apparatus, said error checking means for generating a check bit residue independent of said parity checking apparatus;

means in said responsive means to establish said first signal characteristic as a first-state parity bit and said second signal characteristic as a second-state parity bit; and means interposed between said responsive means and said error checking means to convert said signal characteristics to error checking bits in accordance with said odd/even sum whereby said parity checking apparatus parity checks said check bit residue while said error checking means operates independently thereof.

29. The system set forth in claim 27 further including parity check bit means generating parity in accordance with a given rule;

said responsive means including means repeating said check bit residue an odd or even number of times in said check bit record segment respectively as said first and second signal characteristic.

30. The system set forth in claim 29 further including extra signal means to insert an extra signal in said check bit record segment as a part of said first signal characteristic; and said error checking means being responsive to said data and said extra signal to generate parity in its residue in accordance with said given rule.

31. A signal processing system for use with a multitrack magnetic digital recorder and for selectively transferring signals in groups of such signals or singularly;

the improvement including in combination:

first buffer means for receiving and assembling such signals to a group size;

decoder means for converting an assembled group of signals from said buffer to a second group of signals;

signal processing circuits including buffer means and error correction means for processing signals from said decoder as groups of signals (a group basis);

timing means for supplying timing pulses in cycles to said first buffer means, said decoder, and said signal processing circuits for timing the operations thereof on a group basis, one cycle per operation on a signal group;

control means selectively actuating said timing means for controlling the operations to process signals as groups of signals; and byte control means in said control means selectively actuating said first buffer means, said decoder, and said signal processing circuits for processing signals on a single signal basis including assembling a group of such single signals in said first-mentioned buffer and operating said signal processing circuits in a selected buffer register position of said signal processing means buffer means for transferring one signal for each of said timing cycles.

32. The system set forth in claim 31 further including first and second gating means each having signal complementing means and noncomplementing means;

input means;

said first gating means connecting said input means to said first buffer means;

said second gating means being in said decoder means, said second noncomplementing means selectively coupling said first buffer means to said decoder means for conversion of said signal groups, said second complementing means selectively coupling said first buffer means to said signal processing means for bypassing said decoder means; and said byte control means selectively actuating said gating means in accordance with single signal processing or group signal processing.

33. The system set forth in claim 32 further including format recognition means responsive to a predetermined code to actuate said signal processing circuits; and said first gating means supplying signals to said recognition means.

34. A readback system for a digital data recorder including transducing means for sensing signals recorded on a media, detection means for serially receiving signals from said transducing means and supplying digital signals detected from said readback signals;

the improvement including in combination:

control means for establishing and indicating first and second modes of operation;

first gating means responsive to said first mode of operation to pass signals serially received from said detector, and second gating means including signal inverting means responsive to said second mode for inverting and passing inverted signals from said detecting means, combining means combining said gated signals into a common signal path;

first buffer means receiving signals from said common signal path and responsive to said first mode to transfer signals in groups of signals and responsive to said second mode to transfer one signal at a time;

decoding means receiving signals from said first buffer means and responsive to said first mode to convert a received group of signals to a data group of signals and further responsive to said second mode to invert signals received from said first buffer means;

gating means receiving said decoded signals and responsive to said first and second mode signals to respectively and selectively pass either said group signals as first signals or said single signals as second signals;

error detection and correction means receiving said first gated signals and including buffer means for storing at least one group of such signals, said error correction means being responsive to said first mode for performing error correction operations on said received signals on a group of signals and supplying corrected signals as a group of signals and supplying corrected signals as a group of signals and responsive to said second mode to detect and correct errors on one signal; and means for receiving said corrected signals.

35. The system set forth in claim 34 including start-up means responsive to signals on said common path for indicating a given signal condition of a group of said received signals for indicating beginning of a set of data signals and operative to supply said indication irrespective of the mode of operation.

36. The apparatus set forth in claim 34 further including said recorder constituting a multi-track digital recorder wherein said transducing means simultaneously scans a plurality of parallel tracks on a record member subject to time perturbations or skew in signals read from the record member, said detector, said gating means, said buffer, said decoder, and said error correction circuits operating substantially simultaneously on signals from the respective tracks as supplied from said transducer means on a parallel basis;

the improvement further including in combination:

deskewing means electrically interposed between said common path and said first buffer for realigning signals received from the various tracks into sets of data signals, one set of said data signals corresponding to a single signal in each of the respective tracks, and a group of said signals in the respective tracks corresponding to groups of said sets of signals; and said decoder means receiving the group of sets of signals for converting into a corresponding group of data signals and being responsive to said second mode to receive only signals from one set in the stored group for converting same to a complementary form, and means in said first buffer means responsive to said second mode for indicating to said deskewing means that a signal transfer operation is complete for each signal set received.

37. The system set forth in claim 36 further including in combination:

error signal pointing means generating a plurality of error pointer signals for each of the respective tracks, each pointer representing a different error status;

gating means responsive to said control means mode indications to establish first and second sequences of pointer signals for each of said tracks, respectively; and said error detection and correction means receiving said sequenced pointer signals and responding thereto in the same manner for both said first and second modes.

38. The system set forth in claim 36 further including in combination:

first pointer generating means in said error signal pointing means for each said tracks for pointing to first error conditions to supply first error pointer signals;

second pointer generating means in said error signal pointing means for each said tracks responsive to said first pointer generating means pointing to predetermined first error conditions to supply second error pointer signals;

means receiving signals from said transducer means to generate a signal indicating data signals are being transferred; and said gating means being jointly responsive to said data signal indication and to said control means mode indication to selectively supply said first and second error pointer signals to said error detection and correction means during said modes, respectively.

39. The system set forth in claim 37 further including in combination:

deadtrack means for selectively inhibiting data signal transfers from selected ones of said tracks;

means in said deskewing means indicating a marginal error condition without indicating any track in error; and DT gating means responsive to said gated error pointer signals and said marginal error condition to actuate said deadtrack means to inhibit signal transfers from a track associated with said gated pointer signal and including additional means responsive to one of said mode signals and a selected error pointer signal to actuate said deadtrack means.

40. An error control system for a readback portion of a multitrack digital signal recorder, the improvement including in combination:

first means indicating quality of signal readback from the respective tracks;

second means indicating error correction operations with respect to said respective tracks;

third means indicating repeated error correction operation on signals from said respective tracks;

fourth means indicating the type of signals being read back associated with said first, second, and third means respective indications;

gating means responsive to said fourth means to selectively gate said indicating signals from said first, second, or third means; and utilization means selectively receiving said gated indicating signals for selectively altering operation of the readback portion in accordance with said gated indicating signals.

41. The error control system of claim 40 further including in combination:

MP means in said fourth means indicating first and second signal formats;

FMT means in said fourth means indicating format signals or data signals in each said signal format; and said gating means responsive to said MP means to select first and second gating sequences for said first through third means and further responsive to said FMT means to step said sequences in accordance therewith.

42. The error control system set forth in claim 41 further including in combination:

error detection and correction apparatus capable of operating in first and second modes using first and second error detection and correction coding, respectively, of different error correcting capability, said first coding affording a greater correction capability than said second coding;

said first error pointer signals pointing to error conditions that may result in errors in accordance with a first probability;

said second error pointer signals pointing to error conditions that may result in errors in accordance with a probability greater than said first probability; and said gating means supplying said first error pointing signals during said first mode and said second error pointing signals during said second mode.

43. The error control system set forth in claim 42 further including in combination:

said error detection and correction apparatus indicating need for error pointer signals; and hardware means in said gating means to supply said first means quality signals in response to said need indication.

44. The error control system set forth in claim 43 further including said hardware means being responsive to said MP means indicating said first signal format to supply said first means quality signals during said need indication.

45. An enhanced readback sytem for a digital magnetic recorder having intrarecord resynchronization means and clocking means responsive to readback signals;

error detection means for detecting errors and error conditions and indicating detected signal error conditions;

the improvement including in combination:

means tallying the number of successive detected error conditions;

means including signal storage circuits responsive to absence of an error condition to reset said tally;

means responsive to said tally reaching a predetermined count to memorize by signal storage that a certain error condition occurred and supplying a certain error condition signal; and means jointly responsive to said resynchronization means and said memory means indicating said certain error condition to perform a function relating to synchronizing said clocking means to said readback signal.

46. The readback system set forth in claim 45 further including deadtracking means;

the improvement further including means in said deadtracking means responsive to said memorized certain error condition to actuate said deadtracking means and said jointly responsive means being independent of deadtrack initiating means.

47. The readback system set forth in claim 46 further including in combination:

pointer bus means for selectively supplying said memorized certain error condition to said deadtrack means and said jointly responsive means;

gating means including mode control means selectively coupling said indicated signal error condition or said memorized certain error condition to said pointer bus means; and additional means in said deadtrack means jointly responsive to said mode control means and said pointer bus means to selectively actuate said deadtracking means.

48. The readback system set forth in claim 45 for a multitrack digital recorder, each said means including a means portion for each track in the multitrack digital recorder, the improvement further including in combination:

means portions for supplying pointers indicating a possible error condition in signals from the respective tracks;

pointer memory means portions for each track memorizing that a pointer signal has been supplied and including counting means portions in the respective pointer memory means portions totaling the number of successive tally resets and operative upon said total reaching a predetermined count to supply a pointer-free indication, respectively, for each signal from the respective tracks;

VPL means portions for each track memorizing said detected error conditions and responsive to said pointer-free indication to erase such memorization, respectively; and said VPL means supplying memorized detected error conditions to said error detection means.

49. The readback system set forth in claim 48 further including in combination:

gating means interposed between said jointly responsive means and said tally means receiving said VPL means memorized signals and said certain error condition signal;

mode control means selectively actuating said gating means to pass said received signals to said jointly responsive means; and means establishing first and second modes for actuating said mode control to selectively actuate said gating means.

50. An error indicator control for a multichannel magnetic record readback system, means for monitoring readback signal quality and generating momentary quality pointer signals in accordance therewith;

error detection means processing said readback signals for detecting and indicating errors therein;

means memorizing said pointer signals;

a counter indicating the number of signals recently processed since an error was detected by said error detection means and indicating a time of occurrence relationship with said pointer signals;

means responsive to said error detection means indicating an error-free indication to reset said memory means and actuate said counter and responsive to an error indication to set said counter to a reference condition;

ECC gating means interposed between said monitoring means, sai memorizing means and said error detection means;

said ECC gating means supplying said memorized pointer signals to said error detection means; and said error detection means selectively supplying an actuating signal to said gating means to supply said monitoring means supplied momentary pointer signals in addition to said memorized pointer signals.

51. The control set forth in claim 50 further including error pointer memory means memorizing said error indications; and format means detecting and indicating format errors and actuating said error pointer memory means to memorize an error.

52. The control set forth in claim 51 further including ECC pointer means supplying error pointers to said error detection means; and control means selectively actuating said ECC gating means to pass said error pointer indications and said memorized pointer signals.

53. A digital data signal transfer system having improved error detecting and correcting capabilities, including in combination:

first means for arranging digital data signals into successive segments, each segment having a given number of bit positions;

second means operable with said first means for generating separate first code check bit digital signals in accordance with digital data signals in each segment, such code bits being transferred with the respective data signals as a part of each said segment;

third means operable with said first and second means to generate second code check bit digital signals based on all said digital data signals and associating said second code check bit digital signals with said digital data signals;

first and second counter means respectively having odd and even moduli for counting said data and check bit digital signals;

odd/even means responsive to both said counter means indicating whether the number of segments is odd or even;

means for supplying padding digital signals; and means responsive to said odd/even means for adjusting said third means operation to selectively include padding digital signals in generation of said second code check bit digital signals.

54. A readback system for a digital recorder having record sensing means supplying plural signals from plural record tracks in plural readback channels, and having means indicating either a first type of readback signal characterized by established informational relationships among a fixed number of signals from each of the plural tracks and a second type of readback signal characterized by established informational relationships between but one signal from each of the plural tracks, the improvement including in combination:

deskewing and buffer apparatus receiving said readback signals and deskewing same along a single set of signal paths, one path per record track, each path having a number of buffer signal storage positions related to said fixed number;

digital signal processing circuit apparatus including error detection and correction circuits receiving deskewed signals from said deskewing and buffer apparatus for selectively error correcting said deskewed signals, one path respectively for each record track in said error correction circuits, each path having said fixed number of signal storage positions; and a plurality of control circuits in each said apparatus responsive to said indications for controlling said signal storage positions, said control circuits responsive to said first indication to fill all storage positions with readback signals before actuating operation of said apparatus, respectively, and responsive to said second indication to actuate operation of said respective apparatus when a given one of said storage positions in each path contains a readback signal.

55. The readback system set forth in claim 54 further including signal complementing means in said deskewing and buffer apparatus selectively responsive to said indications for inverting signals of one of said types and restoring same to original form before supplying same to said circuit apparatus.

56. An improved article for use with a record processing machine, comprising:

an elongate member having one sensible indicia-bearing surface with plural machine sensible indicia disposed along plural parallel tracks extending along the member length;

said sensible indicia arranged in successive and contiguous indicia groups in each track and corresponding successive fixed-size sets of such groups in all said parallel tracks;

plural coded symmetrical marker indicia sets recorded in said parallel tracks demarking sections of plural sets of said sensible indicia;

terminator sensible indicia including a residual set portion of said sensible indicia, and length count sensible indicia indicating a number of valid sensible indicia in said residual set; and one of said marker indicia sets separating said terminator sensible indicia from other sets of said sensible indicia.

57. The article set forth in claim 56 further including repeated error checking indicia in a set of sensible indicia disposed in said residual set portion wherein the longitudinal repetitive sequence of said error checking indicia varies in accordance with said length count whereby all said sensible indicia can be sensed in opposing directions of relative movement of said article with respect to sensing means.

58. The article set forth in claim 57 further including plural unique sensible indicia disposed in same relative locations in all said parallel tracks at spaced-apart locations along all said tracks for facilitating identifying longitudinal positions along said tracks whereby sets of indicia in said tracks can be identified.

59. The method of enhancing error detection and correction in a signal transfer system;

establishing first and second residual counts in accordance with transfer of certain signals, each count having a different modulus while indicating the same number of transferred signals;

establishing check signals based upon said certain signals;

modifying said check signals and selected ones of said certain signals in accordance with both said residual counts; and transferring both said residual counts with said check signals and said certain signals.

60. A readback system for a digital recorder having a readback transducer, the improvement including in combination:

a digital signal detector receiving digital signals from said transducer and supplying detected signals representative of said received digital signals;

first and second control means respectively indicating first and second possible data representation schemes of said digital signals;

signal processing means having a single path for processing said detected signals and including timed cyclable circuit portions;

input signal selecting means interposed between said detector and said signal processing means and responsive to said indications to selectively alter said detected signals in accordance therewith; and signal control means operatively controlling said signal processing means and responsive to said indications to adjust said timed cyclable circuit portion operation to one of two different cycle sequences.

61. The readback system set forth in claim 60 for reading back signals having a data portion, and ending mark portion, and an ending postamble portion in all of said data representation schemes, the improvement further including in combination:

group buffer means in said signal processing means for storing a set of a given number of detected signals;

format means receiving said stored signals and responsive to said ending mark portions and at least a part of said postamble portion to indicate end of data; and said signal control means operative with said first or second indication to actuate said format means to analyze said stored signals in a small number of sets of stored signals, buffer control means in said signal control means responsive to said first indication to transfer one group of detected signals from said group buffer means as a set of detected signals and responsive to said second indication to transfer one signal as a group of detected signals while shifting all other signals in said group buffer means toward an output position of said group buffer means such that said second indication sets of stored signals constitute successively shifted single signal groups.

* * * * *

050
1)

UNITED STATES PATENT OFFICE
CERTIFICATE OF CORRECTION ent No. 3,821,703 Dated June 28, 1974 entor(s) E. W. Devore, P. H. Hall, and J. W. Irwin

It is certified that error appears in the above-identified patent that said Letters Patent are hereby corrected as shown below:

Column 67, line 10, "eeror" should read --error--.
line 16, "pendently" should read --pendent--.

Column 72, line 67, delete the entire line.

Column 73, line 1, delete "nals".

Column 76, line 43, change "sai" to --said--.

Signed and sealed this 17th day of December 1974.

EAL)
test:

COY M. GIBSON JR.
testing Officer

C. MARSHALL DANN
Commissioner of Patents